US011368296B2

(12) United States Patent
Becher et al.

(10) Patent No.: US 11,368,296 B2
(45) Date of Patent: *Jun. 21, 2022

(54) COMMUNICATION-EFFICIENT SECRET SHUFFLE PROTOCOL FOR ENCRYPTED DATA BASED ON HOMOMORPHIC ENCRYPTION AND OBLIVIOUS TRANSFER

(71) Applicant: SAP SE, Walldorf (DE)

(72) Inventors: Kilian Becher, Dresden (DE); Axel Schroepfer, Borthen (DE); Mirko Schaefer, Dresden (DE)

(73) Assignee: SAP SE, Walldorf (DE)

(*) Notice: Subject to any disclaimer, the term of this patent is extended or adjusted under 35 U.S.C. 154(b) by 100 days.

This patent is subject to a terminal disclaimer.

(21) Appl. No.: 16/848,963

(22) Filed: Apr. 15, 2020

(65) Prior Publication Data

US 2021/0344489 A1 Nov. 4, 2021

(51) Int. Cl.
*H04L 9/08* (2006.01)
*H04L 67/01* (2022.01)
*H04L 9/06* (2006.01)

(52) U.S. Cl.
CPC .......... *H04L 9/0869* (2013.01); *H04L 9/0643* (2013.01); *H04L 9/0819* (2013.01); *H04L 67/42* (2013.01)

(58) Field of Classification Search
CPC ..... H04L 9/0869; H04L 9/0819; H04L 67/42; H04L 9/0643; H04L 2209/46;
(Continued)

(56) References Cited

U.S. PATENT DOCUMENTS 9,003,204 B2  4/2015  Haerterich et al.
9,009,089 B1*  4/2015  El Defrawy .......... G06F 21/602
                                            706/18
(Continued)

OTHER PUBLICATIONS

Kilian Becher et al. "An Enhanced Approach to Cloud-based Privacy-preserving Benchmarking (Long Version)", arxiv.org, Cornell University Library, Oct. 11, 2018 (Oct. 11, 2018), XP080923947 (Year: 2018).*

(Continued)

*Primary Examiner* — Sanchit K Sarker
(74) *Attorney, Agent, or Firm* — Fish & Richardson P.C.

(57) ABSTRACT

The present disclosure involves systems, software, and computer implemented methods for a communication-efficient secret shuffle protocol for encrypted data based on homomorphic encryption and oblivious transfer. A service provider and multiple clients participate in a secret shuffle protocol of randomly shuffling encrypted client-specific secret input values. The protocol includes generation and exchange of random numbers, random permutations and different blinding values, including use of an oblivious transfer mechanism. A last protocol step includes using homomorphism, for each client, to perform computations on intermediate encrypted data to homomorphically remove a first blinding value and a second blinding value, to generate a client-specific rerandomized encrypted secret input value. As a result, the client-specific rerandomized encrypted secret input values are generated in an order that is unmapped to an order of receipt, at the service provider, of the encrypted secret input values.

20 Claims, 39 Drawing Sheets

(58) Field of Classification Search
CPC ... H04L 2209/50; H04L 9/0825; H04L 9/085; H04L 9/008
USPC .......................................................... 713/189
See application file for complete search history.

(56) References Cited

U.S. PATENT DOCUMENTS

| | | | |
|---|---|---|---|
| 9,342,707 B1 | 5/2016 | Kerschbaum et al. | |
| 9,537,838 B2 | 1/2017 | Hang et al. | |
| 9,547,720 B2 | 1/2017 | Hang et al. | |
| 9,607,161 B2 | 3/2017 | Haerterich et al. | |
| 10,162,858 B2 | 12/2018 | Kerschbaum et al. | |
| 10,630,468 B1 | 4/2020 | Wang et al. | |
| 11,133,922 B1* | 9/2021 | Becher | H04L 9/0891 |
| 2008/0144832 A1* | 6/2008 | Kerschbaum | H04L 9/30 380/277 |
| 2013/0216044 A1* | 8/2013 | Gentry | H04L 9/008 380/277 |
| 2014/0007250 A1 | 1/2014 | Stefanov et al. | |
| 2015/0341174 A1* | 11/2015 | Mandal | H04L 9/14 713/155 |
| 2016/0359617 A1* | 12/2016 | Patel | H04L 9/14 |
| 2017/0012970 A1* | 1/2017 | Mandal | G06F 21/32 |
| 2017/0085382 A1* | 3/2017 | Kamakari | H04L 9/3073 |
| 2017/0142109 A1* | 5/2017 | Mandal | H04L 63/06 |
| 2018/0205707 A1 | 7/2018 | Bellala et al. | |
| 2019/0296896 A1* | 9/2019 | Resch | H04L 63/062 |
| 2019/0296897 A1 | 9/2019 | Resch et al. | |
| 2019/0297064 A1 | 9/2019 | Resch et al. | |
| 2019/0356475 A1 | 11/2019 | Resch et al. | |
| 2020/0021568 A1* | 1/2020 | Becher | H04L 9/008 |
| 2020/0067699 A1 | 2/2020 | Resch et al. | |
| 2020/0067707 A1 | 2/2020 | Resch et al. | |
| 2020/0092094 A1 | 3/2020 | Resch et al. | |
| 2020/0151356 A1* | 5/2020 | Rohloff | G06F 21/6227 |
| 2020/0177364 A1 | 6/2020 | Zhou et al. | |
| 2020/0401726 A1* | 12/2020 | Lim | H04L 9/0822 |
| 2021/0328762 A1 | 10/2021 | Becher et al. | |
| 2021/0328778 A1 | 10/2021 | Becher et al. | |
| 2021/0336764 A1 | 10/2021 | Becher et al. | |
| 2021/0336778 A1 | 10/2021 | Becher et al. | |

OTHER PUBLICATIONS

Becher et al., "Efficient Cloud-based Secret Shuffling via Homomorphic Encryption." arXiv preprint arXiv:2002.05231, Feb. 12, 2020, 11 pages.

Non-Final Office Action issued in U.S. Appl. No. 16/848,982 dated Sep. 14, 2021, 26 pages.

* cited by examiner

| Protocol Name | Technologies | Inputs | Steps / Rounds | Verifiability | Communication Complexity | Computation Complexity | Crypto-Systems | Participants |
|---|---|---|---|---|---|---|---|---|
| Communication-Efficient Secret Shuffle for Encrypted Data Based on Homomorphic Encryption, With Oblivious Transfer 202 | Homomorphic Encryption, Oblivious Transfer 216 | Provided by the clients 214 | 12 steps 2 rounds | No | $O(n)$ | Service: $O(n^2)$ 248 Clients: $O(n)$ 250 | $2 \, M_2 \subseteq M_1$ | $n+1$ 262 |
| Verifiable Secret Shuffle for Encrypted Data Based on Homomorphic Encryption and Secret Sharing 204 | Homomorphic Encryption, Secret Sharing 220 | Provided by the clients | 9 steps 3 rounds 232 | Yes 236 | $O(n^2)$ | Service: $O(n^2)$ Clients: $O(n)$ | 1 254 | $n+1$ |
| Computation-Efficient Secret Shuffle for Encrypted Data Based on Homomorphic Encryption 206 | Homomorphic Encryption | Provided by the clients 224 | 12 steps 2 rounds | No | $O(n^2)$ 242 | Service: $O(n)$ Clients: $O(n)$ | $2 \, M_2 \subseteq M_1$ 258 | $n+1$ |
| Efficient Distributed Secret Shuffle for Encrypted Database Entries using Dependent Shufflers 208 | Homomorphic Encryption | In the service's database, previously provided by a set of clients of which the shufflers are a subset 226 | 12 steps 2 rounds | No | $O(n)$ 240 | $O(n)$ 246 | $2 \, M_2 \subseteq M_1$ | $m+1$ |
| Efficient Distributed Secret Shuffle for Encrypted Database Entries using Independent Shufflers 210 | Homomorphic Encryption | In the service's database, previously provided by a set of independent clients | 10 steps 2 rounds 230 | No | $O(n)$ | Service: $O(n) \to O(1)$ Shufflers: $O(n)$ | 2 256 (No Restrictions) | $m+1$ 264 |

FIG. 2

$CS = (G, E, D)$ — 303 Cryptosystem

302 304 306 308

$G(\kappa) = (pk, sk)$ — 309 Key Generation

310 312 314

$x \in M$ Plaintext

316 318

320 — $y = E(x, pk) \in C$ — 315 Encryption

324 — $x = D(y, sk) \in M$ — 322 Decryption

328 330

326 — $D(E(x_1) \cdot E(x_2)) = x_1 + x_2$ Homomorphic Addition

332 334

338 340

336 — $E(x) \cdot E(0) = E(x + 0) = E'(x)$ Rerandomization

Oblivious Transfer
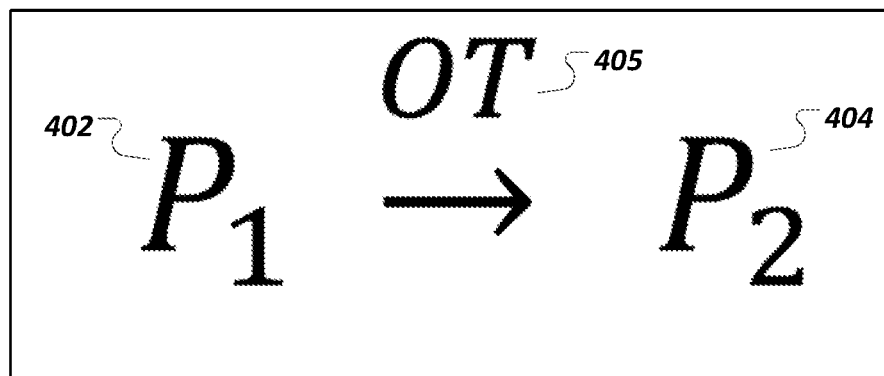
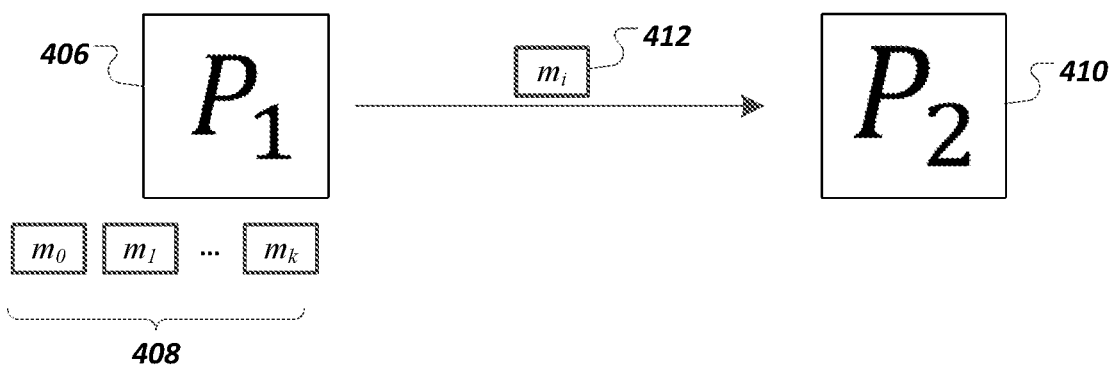
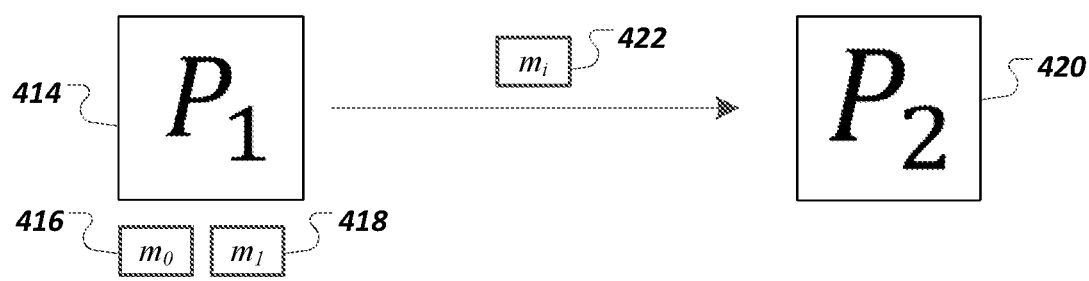
FIG. 4

| Protocol Name | Communication-Efficient Secret Shuffle for Encrypted Data Based on Homomorphic Encryption, With Oblivious Transfer 502 |
|---|---|
| Protocol Technologies | Homomorphic Encryption, Oblivious Transfer |
| Inputs | Provided by the clients 508 504  506 |
| Communication Complexity | $O(n)$ 510 514  512 |
| Computation Complexity | Service Provider: $O(n^2)$  Clients: $O(n)$ |
| Steps | 12 in 2 rounds 516 |
| Verifiability | No 518 |
| Crypto Systems  520<br>522 | 2 524  526 530 532 534  550<br>528  536<br>$CS_1(G_1, E_1, D_1)$   $CS_2(G_2, E_2, D_2)$    $(M_2 \subseteq M_1)$<br>$G_1(\kappa_1) = (pk_1, sk_1)$   $G_2(\kappa_2) = (pk_2, sk_2)$<br>538  540  542  544  546  548 |
| Participants | $n + 1: P_1, \cdots, P_n$ and $P_S$<br>552  554  556 |
| Key knowledge  558<br>560<br>562<br>564 | $pk_1$: Known to service provider $P_S$ and players $P_i$.<br>$sk_1$: Known only to players $P_i$.<br>$pk_2$: Known to service provider $P_S$ and players $P_i$.<br>$sk_2$: Known only to the service provider $P_S$. |
| Other prerequisites 566<br>568<br>570<br>572 | $\pi$       Random permutation, chosen by and known to $P_S$.<br>$h(\cdot)$   Cryptographic hash function<br>$sort(S)$   Sort function<br>$position(S, s_i)$ Output a position in a sequence |

FIG. 5A

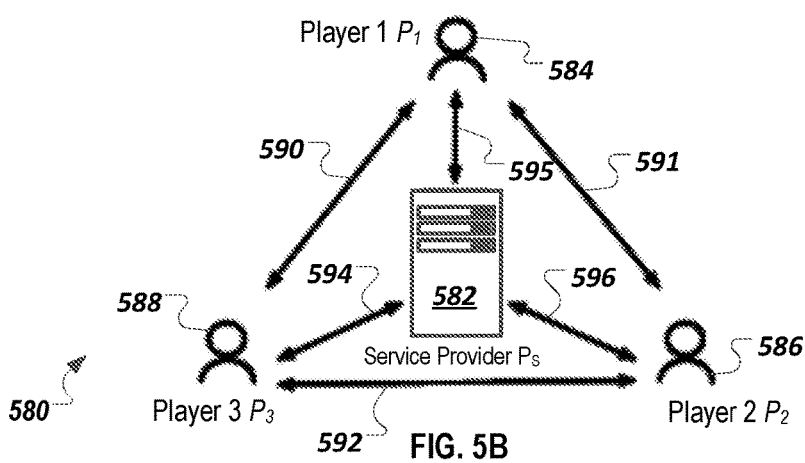

FIG. 5B

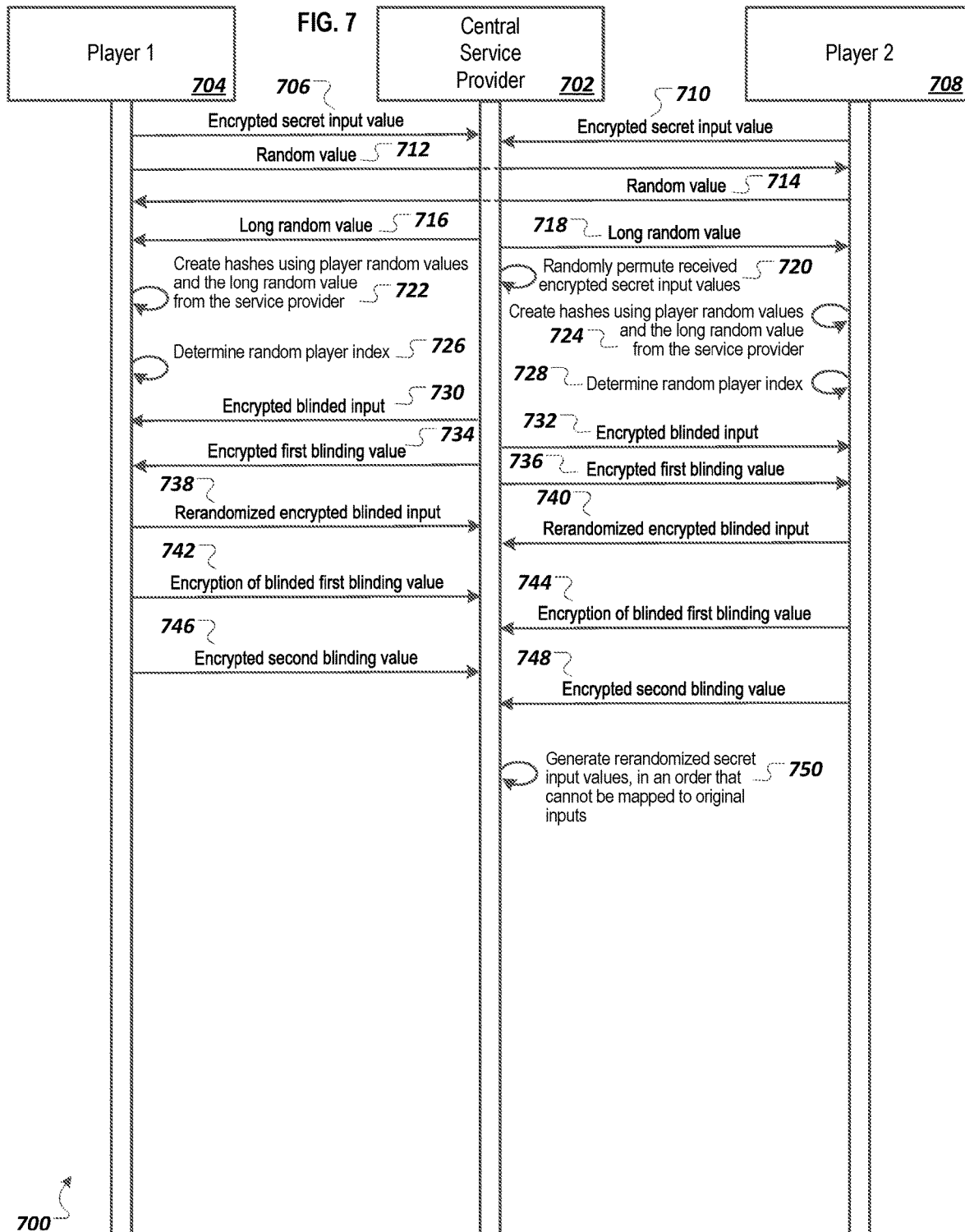

| Protocol Name | Verifiable Secret Shuffle for Encrypted Data Based on Homomorphic Encryption and Secret Sharing 1002 |
|---|---|
| Protocol Technologies | Homomorphic Encryption, Secret Sharing |
| Inputs | Provided by the clients 1008  1004   1006 |
| Communication Complexity | $O(n^2)$ 1010    1014  1012 |
| Computation Complexity | Service Provider: $O(n^2)$   Clients: $O(n)$ |
| Steps | 9 in 3 rounds 1016 |
| Verifiability | Yes 1018 |
| Crypto Systems    1020<br>                   1022 | 1   1024  1026  1030   1032  1034<br>                    1028<br>$CS(G, E, D)$   $G(\kappa) = (pk, sk)$<br>           1038 |
| Participants     1036 | $n + 1$: $P_1, \dots, P_n$ and $P_S$   1040 |
| Key Knowledge    1042<br>                   1044 | $pk$:   Known to service provider $P_S$ and players $P_i$.<br>$sk$:   Known only to players $P_i$. |
| Random Permutations<br>              1046<br>              1046 | $\pi_1$:   Chosen by and known to $P_S$.<br>$\pi_2$:   Generated by and known to players $P_i$. |
| Additive Secret Sharing | $$[s]_n = s - \sum_{i=1}^{n-1} [s]_i$$<br>                   1048 |

FIG. 10A                                           1000

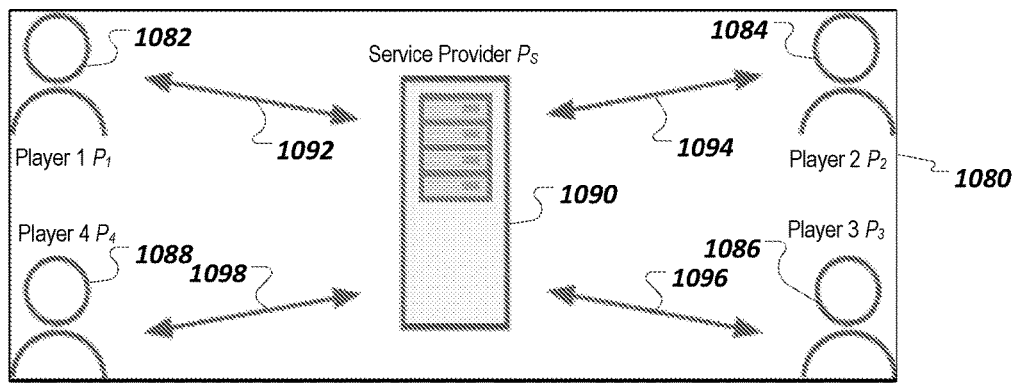

FIG. 10B

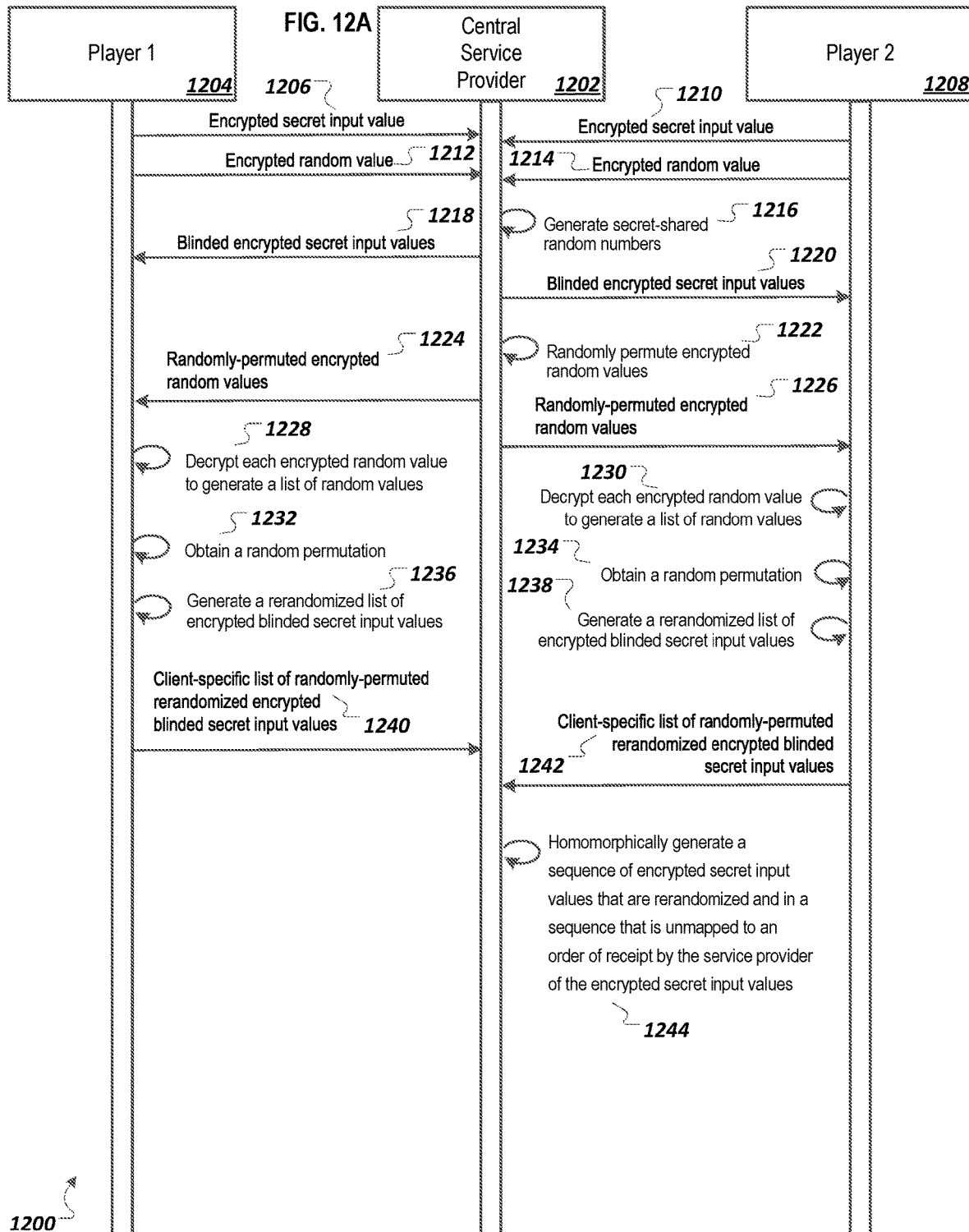

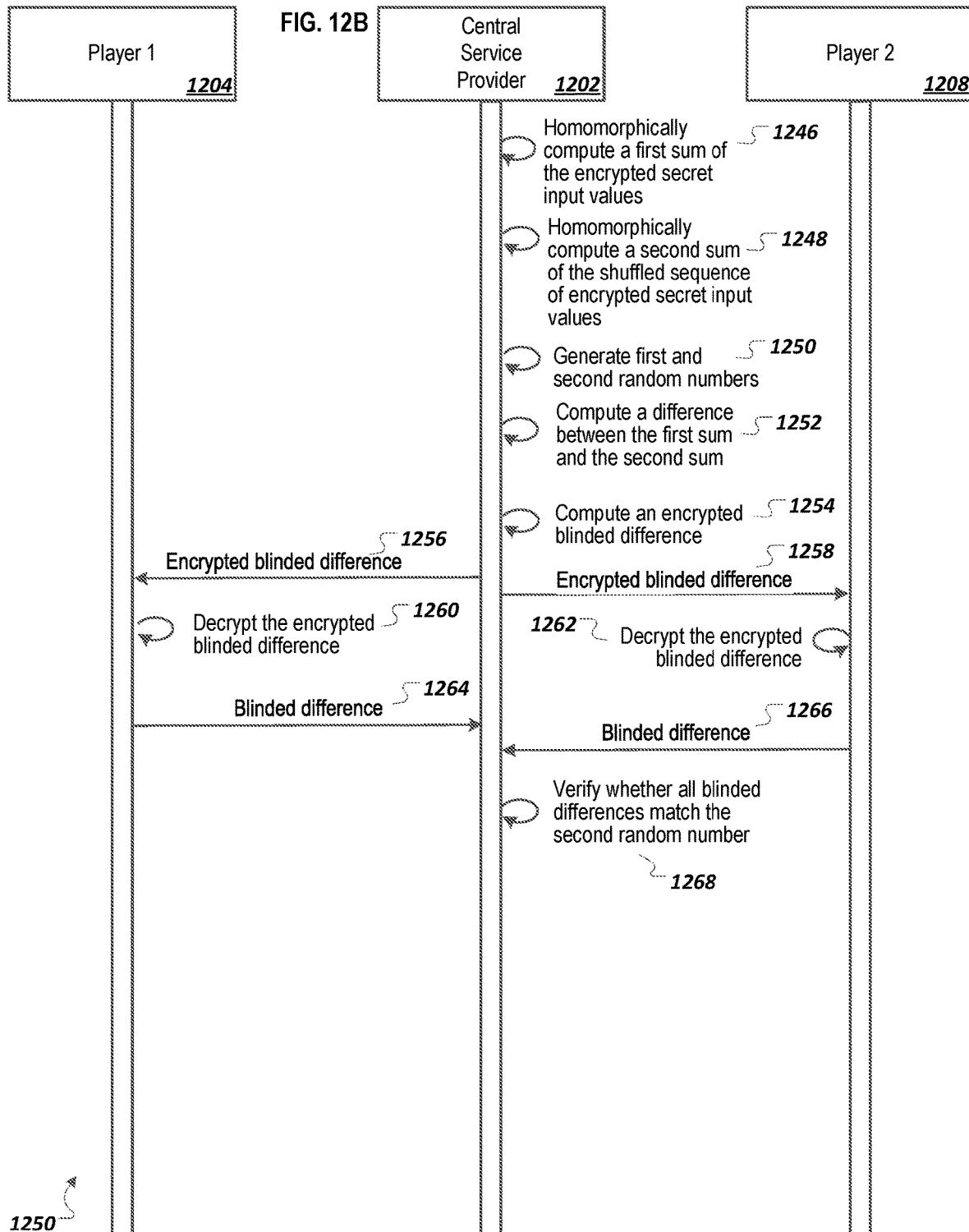

| | |
|---|---|
| Protocol Name | Computation-Efficient Secret Shuffle for Encrypted Data Based on Homomorphic Encryption 1502 |
| Protocol Technologies | Homomorphic Encryption 1504 |
| Inputs | Provided by the clients 1506 |
| Communication Complexity | $O(n^2)$ 1508     1512     1510 |
| Computation Complexity | Service Provider: $O(n)$    Clients: $O(n)$ |
| Steps | 10 in 2 rounds 1514 |
| Verifiability | No 1516 |
| Crypto Systems 1518 <br> 1520 | 2  1522  1524 1528  1530  1532 <br>                 1526            1534 <br> $CS_1(G_1, E_1, D_1)$    $CS_2(G_2, E_2, D_2)$    $(M_2 \subseteq M_1)$ <br> $G_1(\kappa_1) = (pk_1, sk_1)$    $G_2(\kappa_2) = (pk_2, sk_2)$    1548 <br> 1536  1538     1540 1542   1544    1546 |
| Participants | $n + 1: P_1, ..., P_n$ and $P_S$ <br> 1550         1552 1554 |
| Key knowledge 1556 <br> 1558 <br> 1560 <br> 1562 | $pk_1$: Known to service provider $P_S$ and players $P_i$. <br> $sk_1$: Known only to players $P_i$. <br> $pk_2$: Known to service provider $P_S$ and players $P_i$. <br> $sk_2$: Known only to the service provider $P_S$. |
| Other prerequisites 1564 <br> 1568 <br> 1570 <br> 1572 | $\pi_1, \pi_2$          Chosen by and known to $P_S$ <br>            1566 <br> $h(\cdot)$          Cryptographic hash function <br> $sort(S)$          Sort function <br> $position(S, s_i)$ Output a position in a sequence |

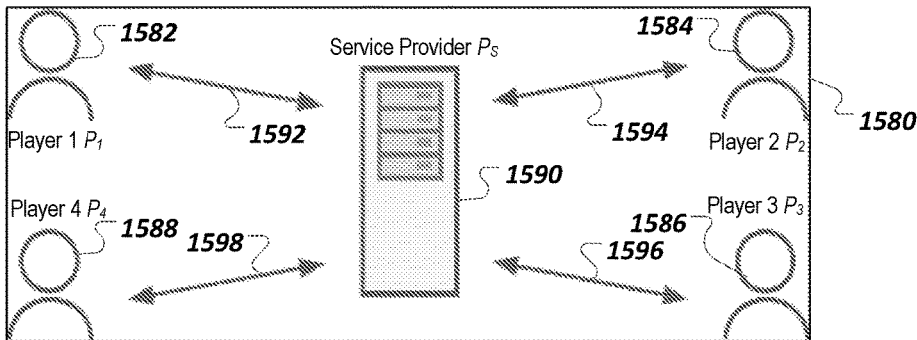

FIG. 15B

Computation-Efficient Secret Shuffle for Encrypted Data Based on Homomorphic Encryption — 1602

Protocol specification

Input — 1604

1.1 $P_j \to P_S: E(x_j)$ — 1608

1.2 $P_j \to P_S: E_1(r_{1j})$ — 1610

Secure multi-party input order shuffling — 1606

2.1 $P_S \to P_j: R_1' = (..., E_1(r_{1j}') = E_1(r_{1\pi_2(j)}), ...)$ — 1612

2.2 $P_S \to P_j: X' = (..., E_1(x_j' + r_{2j}) = E_1(x_{\pi_2(j)} + r_{2j}) = E_1(x_{\pi_2(j)}) \cdot E_1(r_{2j}), ...)$ — 1614

2.3 $P_S \to P_j: R_2 = (..., E_2(r_{2j}), ...)$ — 1616

2.4 $P_S \to P_j: r_{1S}$ — 1618

2.5 $P_j: H = (..., h_j = h(r_{1j}' \| r_{1S}), ...)$ — 1620

2.6 $P_j: \rho_j = position(H' = sort(H), h_j)$ — 1622

2.7 $P_j \to P_S: E_1(x_{\rho_j}' + r_{2\rho_j} + 0) = E_1(x_{\rho_j}' + r_{2\rho_j}) \cdot E_1(0)$ — 1624

2.8 $P_j \to P_S: E_2(r_{2\rho_j} + r_{3j}) = E_2(r_{2\rho_j}) \cdot E_2(r_{3j})$ — 1626

2.9 $P_j \to P_S: E_1(r_{3j})$ — 1628

2.10 $P_S: \mathcal{X} = (..., E_1(x_{\rho_j}') = E_1(x_{\rho_j}' + r_{2\rho_j}) \cdot E_1((-1) \cdot D_2(E_2(r_{2\rho_j} + r_{3j}))) \cdot E_1(r_{3j}), ...)$ — 1630

FIG. 16

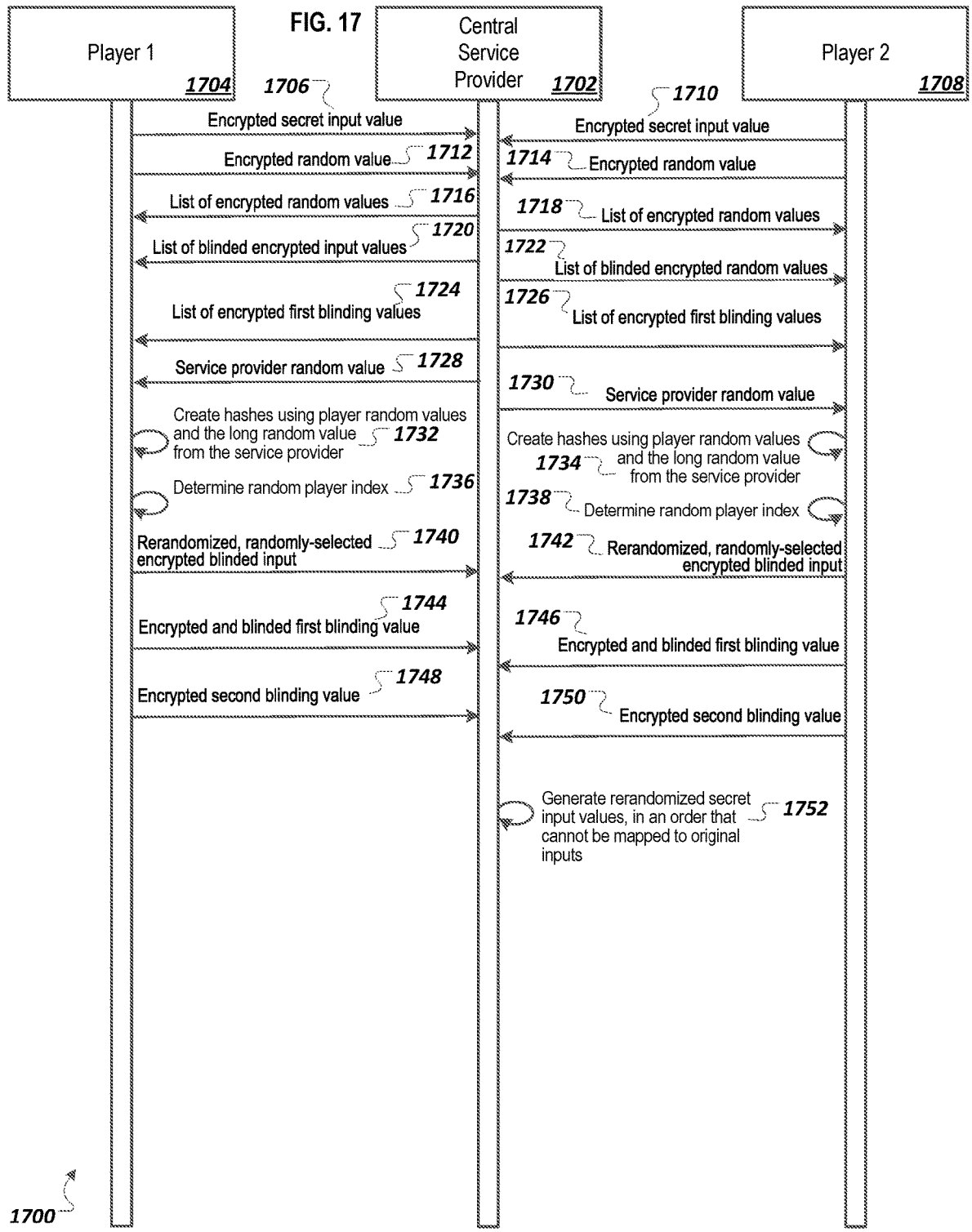

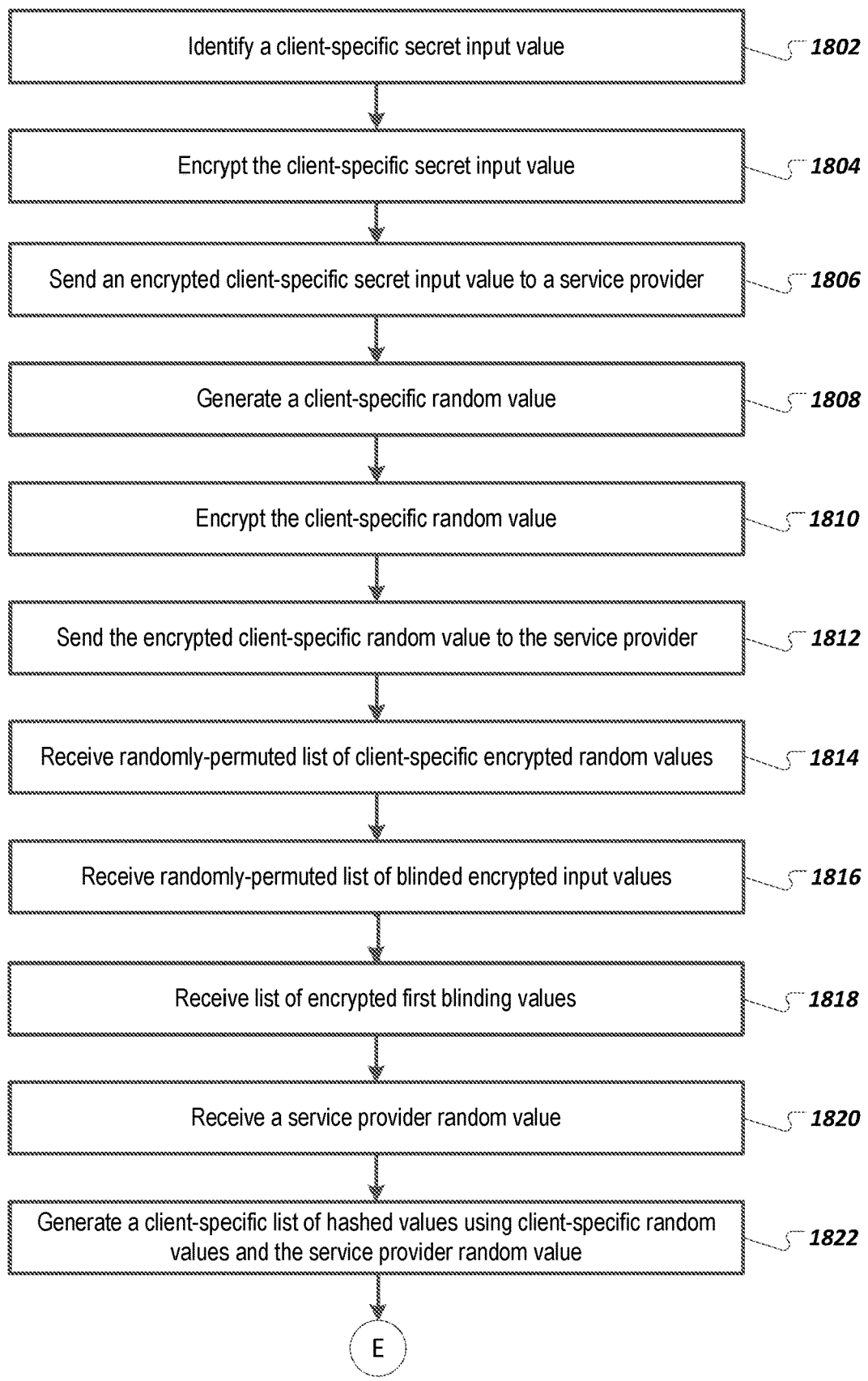
FIG. 18A *1800*

| Protocol Name | Efficient Distributed Secret Shuffle for Encrypted Database Entries using Dependent Shufflers 2002 |
|---|---|
| Protocol Technologies | Homomorphic Encryption 2004 |
| Inputs | In the service's database, previously provided by a set of clients of which the shufflers are a subset. 2006 |
| Communication Complexity | $O(n)$ 2008   2010   2012 |
| Computation Complexity | Service Provider: $O(n)$   Clients: $O(n)$ |
| Steps | 12 in 2 rounds 2014 |
| Verifiability 2106 | No |
| Database Entries 2117 | $n$ encrypted entries provided by $n$ players $P_1, \ldots, P_n$ |
| Crypto Systems 2018<br>2020 | 2 2022  2024 2028 2030  2032<br>           2026          2034<br>$CS_1(G_1, E_1, D_1)$   $CS_2(G_2, E_2, D_2)$   $(M_2 \subseteq M_1)$<br>$G_1(\kappa_1) = (pk_1, sk_1)$   $G_2(\kappa_2) = (pk_2, sk_2)$   2048<br>2036  2038    2040 2042  2044    2046<br>                    2052 |
| Protocol Participants 2050 | $m + 1$ 2054   $P_S$ and $m$ shufflers $S_k$, $m \leq n$   ($m \mid n$) |
| Key knowledge 2056<br>2058<br>2060<br>2062 | $pk_1$:    Known to service provider $P_S$ and shufflers $S_k$.<br>$sk_1$:    Known only to shufflers $S_k$ and not to $P_S$.<br>$pk_2$:    Known to service provider $P_S$ and shufflers $S_k$.<br>$sk_2$:    Known only to the service provider $P_S$. |
| Random Permutations 2064<br>2067 | $\pi_1, \pi_2$  2066  Chosen by and known to $P_S$.<br>$\pi_{3_k}$           Chosen by and known to each shuffler $S_k$. |
| Other prerequisites 2068<br>2070<br>2072 | $h(\cdot)$        Cryptographic hash function<br>$sort(S)$    Sort function<br>$position(S, s_i)$  Output a position in a sequence |

FIG. 20A

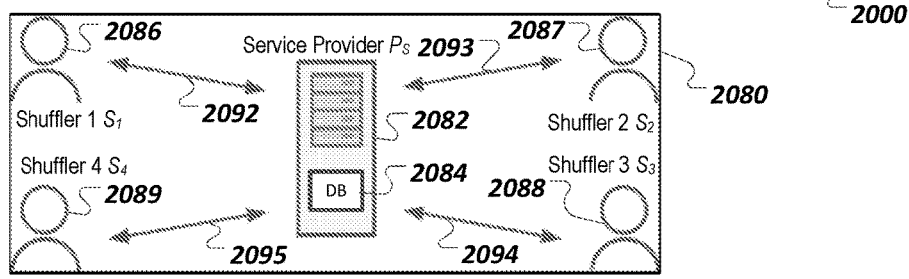

FIG. 20B

Efficient Distributed Secret Shuffle for Encrypted Database Entries using Dependent Shufflers

Protocol specification

Submission of random values 1.1 $P_S \rightarrow S_K: n, m$ 1.2 $S_k \rightarrow P_S: (E_1(r_1), ..., E_1(r_m))$ Secure multi-party input order shuffling 2.1 $P_S \rightarrow S_k: R_1' = (..., E_1(r_{\pi_1(i)}), ...) = \pi_1(..., E_1(r_i'), ...)$ 2.2 $P_S \rightarrow S_k: X' = (..., E_1(x_i' + r_{2_i}) = E_1(x_{\pi_1(i)} + r_{2_i}) = E_1(x_{\pi_1(i)}) \cdot E_1(r_{2_i}), ...)$ 2.3 $P_S \rightarrow S_k: R_2 = (..., E_2(r_{2_i}), ...)$ 2.4 $P_S \rightarrow S_k: r_{1_c}$ 2.5 $S_k: H = (..., h_j = h(r_{1_j} \| r_{1_c}), ...)$ 2.6 $S_k: (..., \rho_j = position(H' = sort(H), h_j), ...)$ 2.7 $S_k \rightarrow P_S: \pi_{3_k} (..., E_1(x_{\rho_i}' + r_{2_{\rho_i}}) = E_1(x_{\rho_i}' + r_{2_{\rho_i}} + 0) = E_1(x_{\rho_i}' + r_{2_{\rho_i}}) \cdot E_1(0), ...)$ 2.8 $S_k \rightarrow P_S: \pi_{3_k} (..., E_2(r_{2_{\rho_i}} + r_{3_i}) = E_2(r_{2_{\rho_i}}) \cdot E_2(r_{3_i}), ...)$ 2.9 $S_k \rightarrow P_S: \pi_{3_k} (..., E_1(r_{3_i}), ...)$ 2.10 $P_S: X = (..., E_1(x_{\rho_i}') = E_1(x_{\rho_i}' + r_{2_{\rho_i}}) \cdot E_1((-1) \cdot D_2(E_2(r_{2_{\rho_i}} + r_{3_i}))) \cdot E_1(r_{3_i}), ...)$

FIG. 21

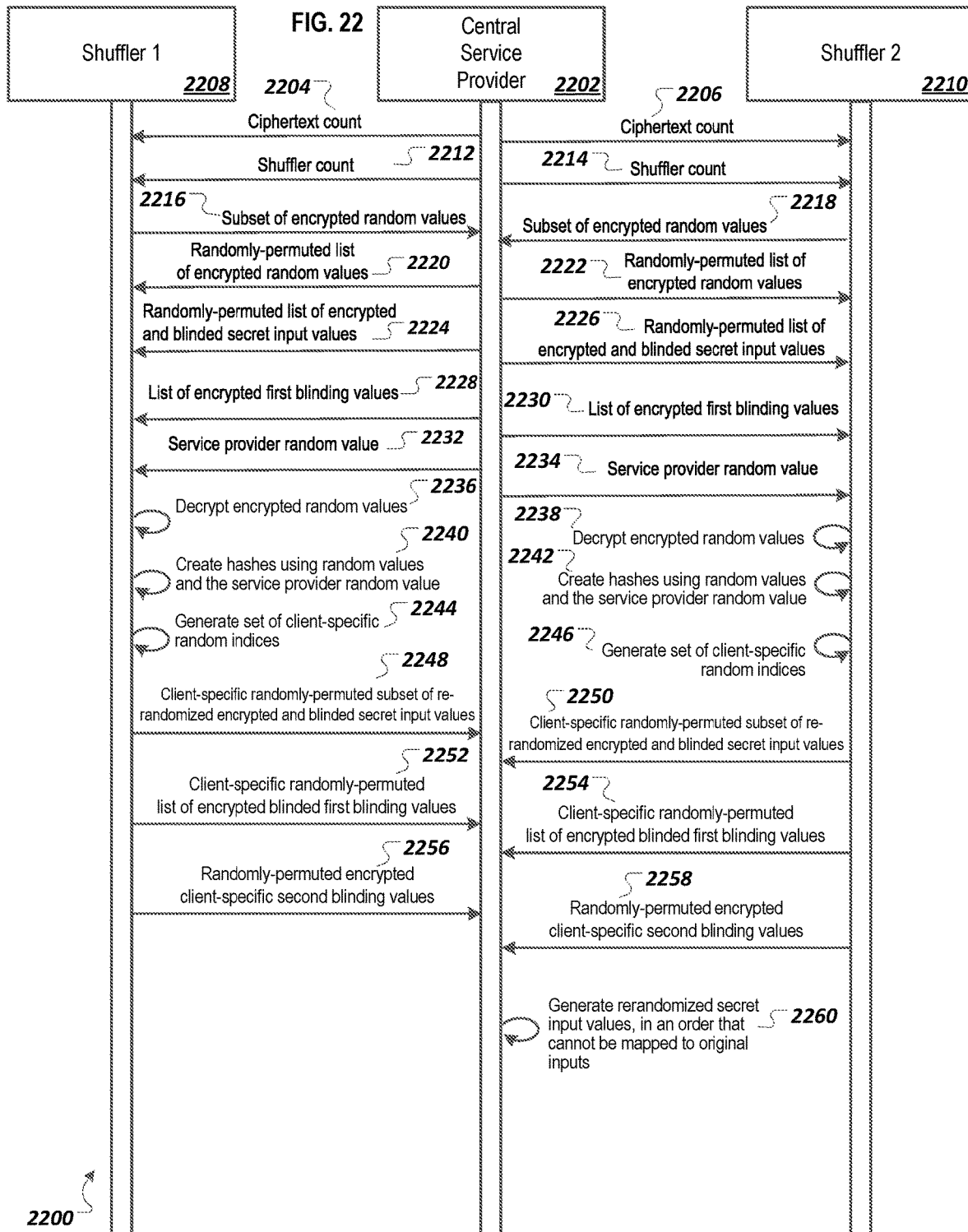

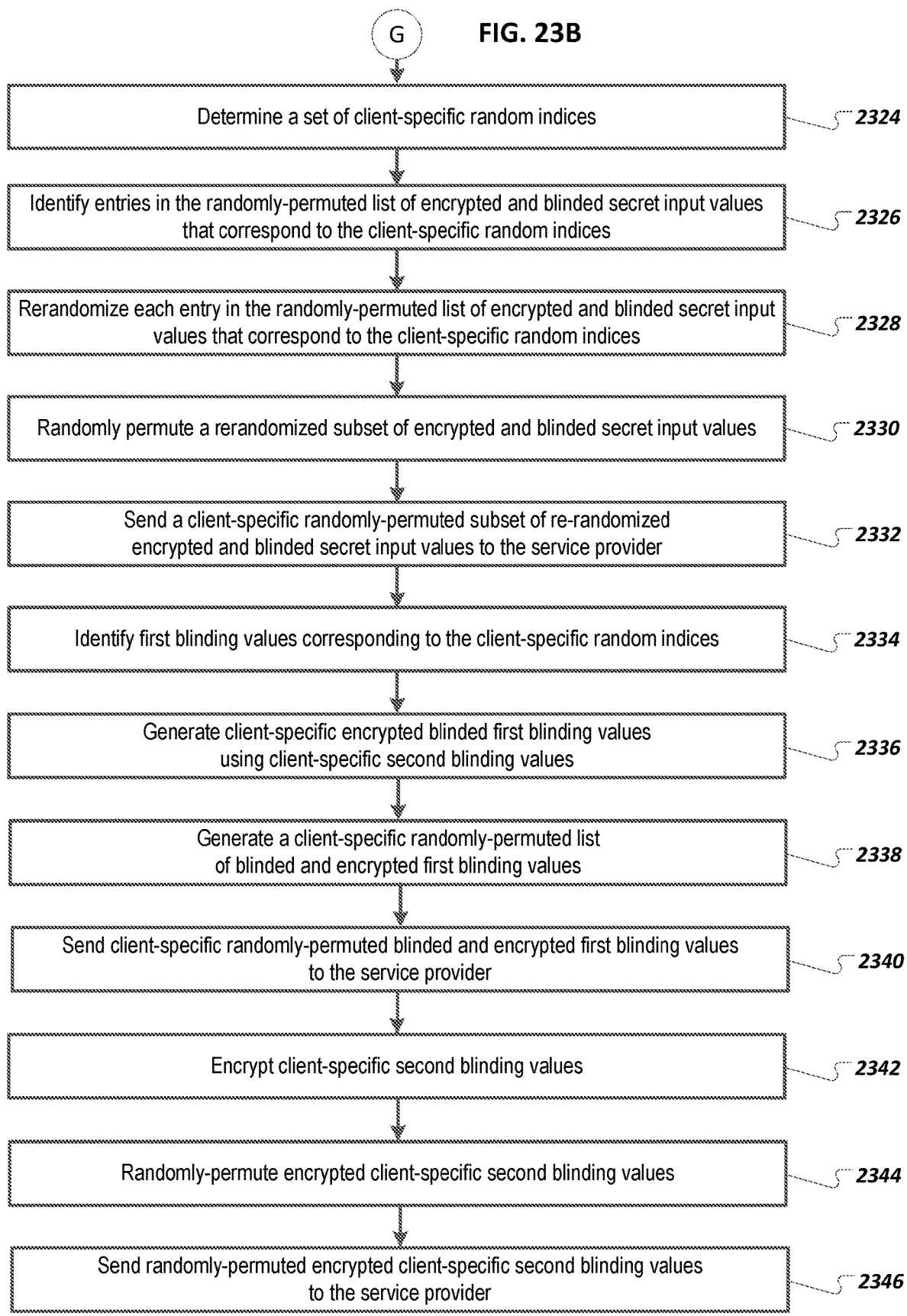

| Protocol Name | Efficient Distributed Secret Shuffle for Encrypted Database Entries using Independent Shufflers 2502 |
|---|---|
| Protocol Technologies | Homomorphic Encryption 2504 |
| Inputs | In the service's database, previously provided by a set of independent clients 2506 |
| Communication Complexity | $O(n)$ 2508   2512   2510 |
| Computation Complexity | Service: $O(n) \to O(1)$   Shufflers: $O(n)$ |
| Steps | 10 in 2 rounds 2514 |
| Verifiability 2516 | No |
| Database Entries 2518 | $n$ encrypted entries provided by $n$ players $P_1, \ldots, P_n$ |
| Crypto Systems 2520  2522 | 2 2524   2526 2530   2532   2534   2528   2536 $CS_1(G_1, E_1, D_1)$   $CS_2(G_2, E_2, D_2)$ $G_1(\kappa_1) = (pk_1, sk_1)$   $G_2(\kappa_2) = (pk_2, sk_2)$ 2538  2540   2542  2544   2546   2548   2554 |
| Protocol Participants 2552 | $m+1$: 2556  $P_S$ and $m$ shufflers $S_k$, $m <= n$ ($m|n$) |
| Key knowledge 2558   2560   2562   2564 | $pk_1$:   Known to service provider $P_S$ and shufflers $S_k$. $sk_1$:   Known only to players $P_i$ and not to $S_k$ or $P_S$. $pk_2$:   Known to service provider $P_S$ and shufflers $S_k$. $sk_2$:   Known only to the shufflers $S_k$. |
| Random Permutations 2566   2567 | $\pi_1$   Chosen by and known to $P_S$. $\pi_{2_k}$   Chosen by and known to each shuffler $S_k$. |
| Other prerequisites 2568   2570   2572 | $h(\cdot)$   Cryptographic hash function $sort(S)$   Sort function $position(S, s_i)$ Output a position in a sequence |

FIG. 25A

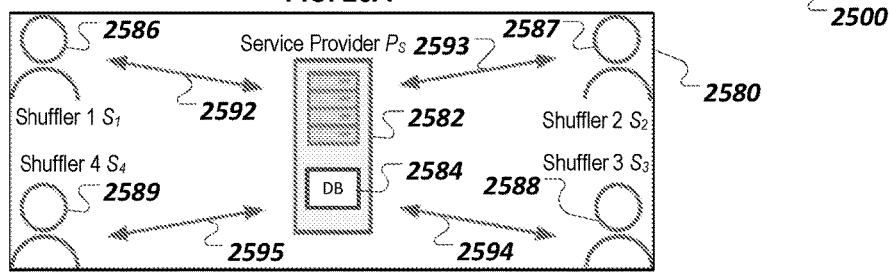

FIG. 25B

Efficient Distributed Secret Shuffle for Encrypted Database Entries using Independent Shufflers

Protocol specification

Submission of random values 1.1 $P_S \to S_k: n, m$ 1.2 $S_k \to P_S: (E_2(r_{1_1}), \ldots, E_2(r_{1_m}))$ Secure multi-party input order shuffling 2.1 $P_S \to S_k: R'_1 = (\ldots, E_2(r'_{1_j}) = E_2(r_{1_{\pi_k(j)}}), \ldots)$ 2.2 $P_S \to S_k: X = (E_1(x_1), \ldots, E_1(x_n))$ 2.3 $P_S \to S_k: r_{1_S}$ 2.4 $S_k: H = (\ldots, h_j = h(r'_{1_j} || r_{1_S}), \ldots)$ 2.5 $S_k: (\ldots, p_j = position(H' = sort(H), h_j), \ldots)$ 2.6 $S_k: (\ldots, E'_1(x'_j) = E_1(x_{p_j} + 0) = E_1(x_{p_j}) \cdot E_1(0), \ldots)$ 2.7 $S_k \to P_S: (\ldots, E'_1(x'_{\pi_k(j)}), \ldots)$ 2.8 $P_S: \mathcal{X} = (\ldots, E'_1(x'_j) = E'_1(x'_{\pi_k(j)}), \ldots)$

FIG. 26

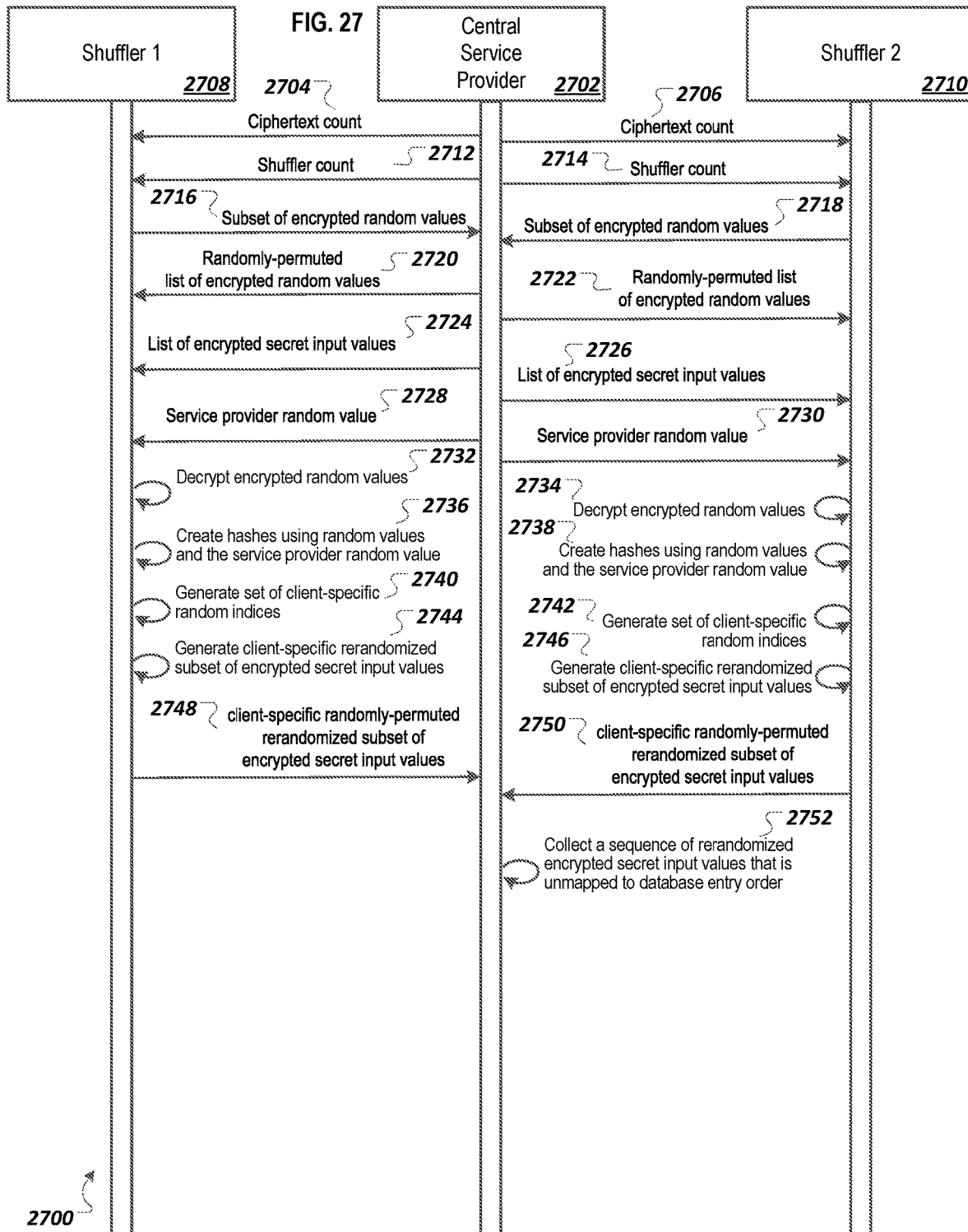

COMMUNICATION-EFFICIENT SECRET SHUFFLE PROTOCOL FOR ENCRYPTED DATA BASED ON HOMOMORPHIC ENCRYPTION AND OBLIVIOUS TRANSFER

TECHNICAL FIELD

The present disclosure relates to computer-implemented methods, software, and systems for secret shuffle protocols using homomorphic encryption.

BACKGROUND

An organization may gather data related to the organization and use the data to generate one or more KPIs (Key Performance Indicators). KPIs can be used as performance measurements to measure success or progress of various activities of an organization. For example, for an accounting organization, a KPI can be a percentage of overdue invoices. As another example, for a manufacturing organization, a KPI can be an availability metric that measure production run time divided by total available time.

SUMMARY

The present disclosure involves systems, software, and computer implemented methods for secret shuffle protocols using homomorphic encryption. An example method includes: receiving, from each of multiple clients, an encrypted client-specific secret input value; selecting a service provider random value; sending the service provider random value to each of the clients; randomly permuting the received encrypted client-specific secret input values using a random permutation; providing, to each client, a randomly-determined encrypted blinded input from the received encrypted client-specific secret input values, wherein each randomly-determined encrypted blinded input is selected for a client based on a random index of the client; providing, to each client, a client-specific encrypted first blinding value, wherein the client-specific encrypted first blinding value is an encryption of a client-specific first blinding value included in the randomly-determined encrypted blinded input received by the client; receiving, from each client, a client-specific rerandomized encrypted blinded input, wherein the client-specific rerandomized encrypted blinded input is a rerandomization of the randomly-determined encrypted blinded input provided to the client; receiving, from each client, a client-specific encrypted and blinded first blinding value, wherein the client-specific encrypted and blinded first blinding value encrypts a blinded first blinding value that is blinded by a client-specific second blinding value; receiving, from each client, a client-specific encrypted second blinding value; decrypting each client-specific encrypted and blinded first blinding value to generate a first client-specific intermediate plaintext for each client; multiplying each first client-specific intermediate plaintext by negative one to generate a second client-specific intermediate plaintext for each client; encrypting each second client-specific intermediate plaintext to generate a client-specific intermediate ciphertext for each client; and multiplying, for each client, the intermediate ciphertext by the client-specific rerandomized encrypted blinded input and the client-specific encrypted second blinding value, to homomorphically remove the first blinding value and the second blinding value, to generate a client-specific rerandomized encrypted secret input value, wherein the client-specific rerandomized encrypted secret input values are generated in an order that is unmapped to an order of receipt, at the service provider, of the encrypted secret input values.

While generally described as computer-implemented software embodied on tangible media that processes and transforms the respective data, some or all of the aspects may be computer-implemented methods or further included in respective systems or other devices for performing this described functionality. The details of these and other aspects and embodiments of the present disclosure are set forth in the accompanying drawings and the description below. Other features, objects, and advantages of the disclosure will be apparent from the description and drawings, and from the claims.

DESCRIPTION OF DRAWINGS

FIG. 2 is an overview table that includes details regarding secret-shuffle protocols.

FIG. 3 illustrates mathematical constructs for homomorphic encryption and rerandomization.

FIG. 4 illustrates an example of a system for oblivious transfer of messages between protocol participants.

FIG. 5A is a table that provides information describing a communication-efficient secret shuffle protocol based on homomorphic encryption and oblivious transfer.

FIG. 5B illustrates a communication scenario for a communication-efficient secret shuffle protocol based on homomorphic encryption and oblivious transfer.

FIG. 7 illustrates a swim lane diagram for a communication-efficient secret shuffle protocol for encrypted data based on homomorphic encryption and oblivious transfer.

FIG. 10A is a table that provides information describing a verifiable secret shuffle protocol for encrypted data based on homomorphic encryption and secret sharing.

FIG. 10B illustrates a communication scenario for a verifiable secret shuffle protocol for encrypted data based on homomorphic encryption and secret sharing.

FIGS. 12A-B are swims lane diagrams for a verifiable secret shuffle protocol for encrypted data based on homomorphic encryption and secret sharing.

FIG. 15A is a table that provides information describing a communication-efficient secret shuffle protocol based on homomorphic encryption.

FIG. 15B illustrates a communication scenario for a communication-efficient secret shuffle protocol based on homomorphic encryption.

FIG. 16 illustrates a protocol specification for a communication-efficient secret shuffle protocol for encrypted data based on homomorphic encryption.

FIG. 17 illustrates a swim lane diagram for a communication-efficient secret shuffle protocol for encrypted data based on homomorphic encryption.

FIGS. 18A-B illustrate a flowchart of a participant method for a communication-efficient secret shuffle protocol for encrypted data based on homomorphic encryption.

FIG. 20A is a table that provides information describing an efficient distributed secret shuffle protocol for encrypted database entries using dependent shufflers.

FIG. 20B illustrates a communication scenario for an efficient distributed secret shuffle protocol for encrypted database entries using dependent shufflers.

FIG. 21 illustrates a protocol specification for an efficient distributed secret shuffle protocol for encrypted database entries using dependent shufflers.

FIG. 22 illustrates a swim lane diagram for an efficient distributed secret shuffle protocol for encrypted database entries using dependent shufflers.

FIGS. 23A-B illustrate a flowchart of a shuffler method for an efficient distributed secret shuffle protocol for encrypted database entries using dependent shufflers.

FIG. 25A is a table that provides information describing an efficient distributed secret shuffle protocol for encrypted database entries using independent shufflers.

FIG. 25B illustrates a communication scenario for an efficient distributed secret shuffle protocol for encrypted database entries using independent shufflers.

FIG. 26 illustrates a protocol specification for an efficient distributed secret shuffle protocol for encrypted database entries using independent shufflers.

FIG. 27 illustrates a swim lane diagram for an efficient distributed secret shuffle protocol for encrypted database entries using independent shufflers.

DETAILED DESCRIPTION

Figure 1:
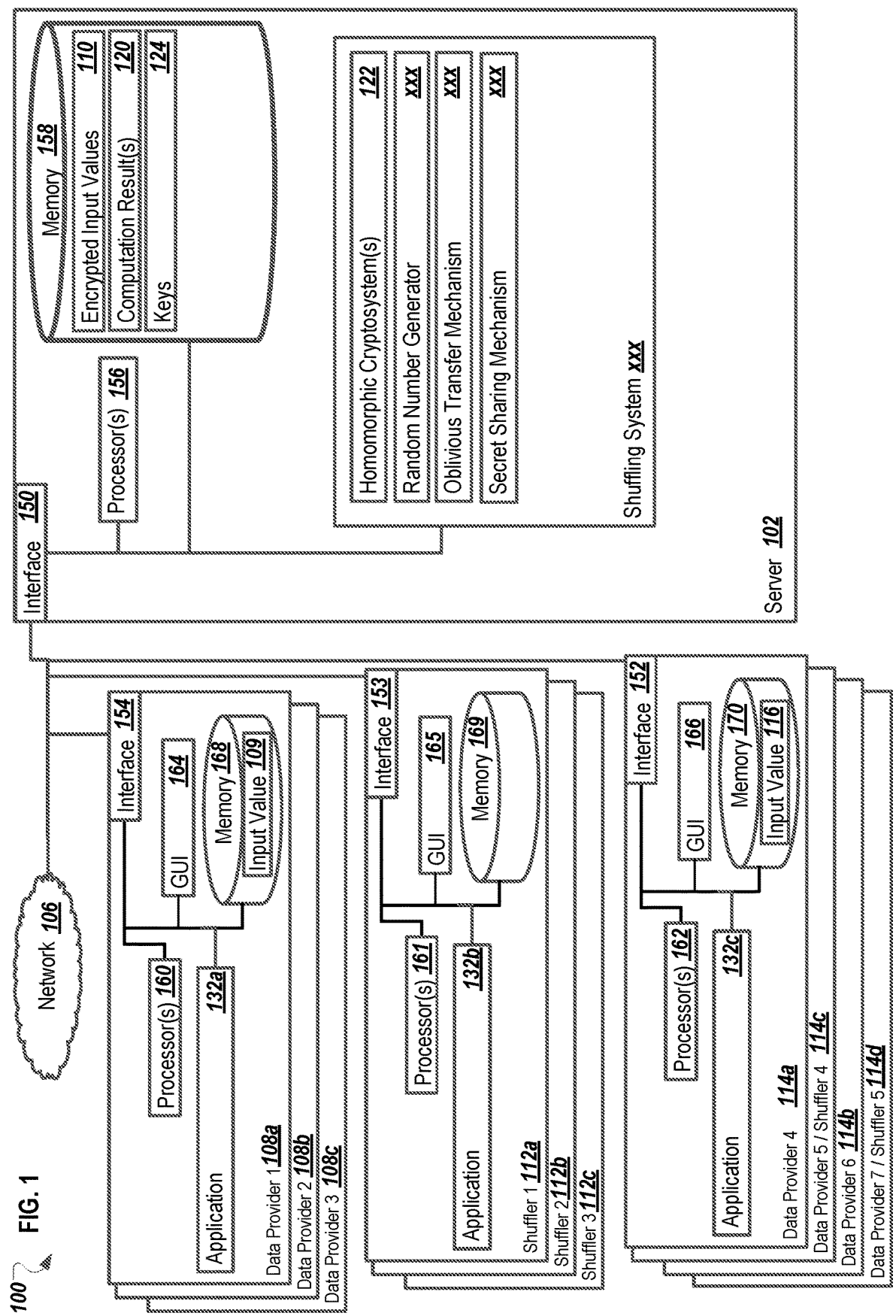
FIG. 1 is a block diagram illustrating an example system for using secret shuffle protocols using homomorphic encryption.

In an industrial context, security against dishonest or semi-honest adversaries can be important for companies, since companies typically have a financial and legal interest in the correct execution of processes. Proactive misbehavior or negligent data handling can lead to a loss of reputation or legal consequences, for example. When working with joint collections of confidential data from multiple sources, e.g., in cloud-based multi-party computation scenarios, ownership relation between data providers and their inputs can be considered to be confidential information.

One widely-used measure for companies to determine their performance relatively to their peer group is cross-company benchmarking. In cross-company benchmarking, companies compare their KPI, e.g., return on investment, to those of other companies of the same industry. As benchmark results, companies can obtain statistical measures, such as quartiles and mean. To compute rank-based statistical measures like quartiles, sorting KPIs typically is an important aspect of benchmarking. However, as the companies' performances are confidential, no company should learn another company's KPIs. Instead, benchmark results should only help them determine how they perform relatively to their overall peer group.

Computations could be performed by a trusted third party. However, finding such a trusted third party that every single one of (potentially) mutually distrusting participants trusts might not be possible. As another solution, computations can be performed using secure multi-party communication (MPC). MPC scenarios can include parties each contributing confidential inputs and jointly evaluate the target function with a service provider.

With, for example, a centralized privacy-preserving benchmarking protocol, encrypted KPIs may be sorted according to their underlying plaintexts. However, sorting may enable the service provider to learn the order of the confidential KPIs, that is, how a particular company performs relatively to another particular company. Even if the service provider is assumed to not misuse this information proactively, a data breach could leak this confidential performance information.

To reduce the risk of benchmarks leaking confidential data and relative performance information, efficient privacy-preserving secret shuffle protocols based on MPC can ensure anonymity in the sense that no observer can infer ownership relations between companies and their encrypted KPIs. A secret shuffle can be defined as a function that randomizes the order of a sequence of encrypted inputs such that no observer can map elements in the original sequence to their corresponding elements in the shuffled sequence with probability better than guessing. Preventing such a mapping also implies a need, met by the secret shuffle protocols, for changing the ciphertexts without affecting the underlying plaintexts.

Besides privacy-preserving benchmarking, secret shuffle protocols can be applied to any scenario where participants (e.g., called players) send encrypted inputs to a central service provider, e.g., a cloud service, and want to shuffle the resulting data collection in order to ensure anonymity. Other applications include use cases such as anonymous surveys, polls, and voting, for example.

FIG. 1 is a block diagram illustrating an example system 100 for using secret shuffle protocols using homomorphic encryption. Specifically, the illustrated system 100 includes or is communicably coupled with a server 102, various data provider and shuffler computing devices as described below, and a network 106. Although shown separately, in some implementations, functionality of two or more systems or servers may be provided by a single system or server. In some implementations, the functionality of one illustrated system, server, or component may be provided by multiple systems, servers, or components, respectively.

As mentioned, when a service provider (e.g., the server 102) works with collections of confidential data from multiple data owners, e.g., in cloud-based multi-party computation scenarios, the position of an entry can leak confidential information such as ownership. When sorting a list of encrypted inputs according to their underlying plaintexts, for instance, the position of an entry in the sorted list of ciphertexts leaks the rank of a data owner's input. Secret shuffling can be performed to eliminate such leakage. Secret shuffling protocols can be, for example, secure multi-party computation protocols for shuffling encrypted data items in a privacy-preserving manner based on an (e.g., additively) homomorphic cryptosystem. Multiple protocols are described.

Each of the protocols can be particularly tailed for particular use case(s) or specific setup(s) that introduce particular requirements. The protocols can be used separately and independently and for different applications. Different protocol settings and mechanisms have different advantages and disadvantages and make different assumptions (e.g., independent shufflers are available or are not available, computational power of the shufflers is very limited or not, data provider is known or is not, data provider is a single instance or multiple providers).

Protocols can involve data providers, which may or may not be involved in shuffling operations. For instance, some protocol(s) may involve data providers 108a, 108b, and 108c that provide encrypted input data (e.g., an input data value 109) and also participate in shuffling (e.g., in combination with the server 102). As another example, for some protocol(s), the data providers 108a, 108b, 108c provide data to be stored as encrypted input data 110, but do not participate in shuffling. Rather, shufflers 112a, 112b, and 112c, for example, can participate in shuffling, with the server 102, using the encrypted input data 110 provided by the data providers 108a, 108b, and 108c. As yet another example, for some protocol(s) and for a set of data providers, some but not all of the data providers participate in shuffling. For example, data providers 114a and 114b may provide data (e.g., an input data value 116) but may not perform shuffling, whereas data provider/shufflers 114c and 114d may both provide data and perform shuffling.

As described below, the server 102 (and in some cases, a shuffling client or data provider) can include various components for performing shuffling operations. For instance, the server 102 includes one or more homomorphic cryptosystems 122, with corresponding keys 124. The server 102 can also include a random number generator 126, an oblivious transfer mechanism 128, and a secret-sharing mechanism 130. Other components can be included.

Each data provider or shuffler can include an application (e.g., an application 132a, 132b, or 132c) that can be used for performing shuffling operations and/or for viewing computation results 120 (e.g., aggregate metrics). Shuffling participants can include different cryptosystems and keys (or other components). Data providers and shufflers (or participants that are both data providers and shufflers) can be collectively referred to as clients.

As used in the present disclosure, the term "computer" is intended to encompass any suitable processing device. For example, although FIG. 1 illustrates a single server 102, and example data providers and shufflers, the system 100 can include two or more servers 102, or various numbers of data providers or shufflers. Indeed, the server 102 and the shuffler and data provider devices may be any computer or processing device such as, for example, a blade server, general-purpose personal computer (PC), Mac®, workstation, UNIX-based workstation, or any other suitable device. In other words, the present disclosure contemplates computers other than general purpose computers, as well as computers without conventional operating systems. Further, the server 102 and the client devices may be adapted to execute any operating system, including Linux, UNIX, Windows, Mac OS®, Java™, Android™, iOS or any other suitable operating system. According to one implementation, the server 102 may also include or be communicably coupled with an e-mail server, a Web server, a caching server, a streaming data server, and/or other suitable server.

Interfaces 150, 152, 153, and 154 are used by the server 102, and exemplarily, by the data provider 114a, the shuffler 112a, and the data provider 108a, respectively, for communicating with other systems in a distributed environment—including within the system 100—connected to the network 106. Generally, the interfaces 150, 152, 153, and 154 (and other interfaces) each comprise logic encoded in software and/or hardware in a suitable combination and operable to communicate with the network 106. More specifically, the interfaces 150, 152, 153, and 154 (and other interfaces) may each comprise software supporting one or more communication protocols associated with communications such that the network 106 or interface's hardware is operable to communicate physical signals within and outside of the illustrated system 100.

The server 102 includes one or more processors 156. Each processor 156 may be a central processing unit (CPU), a blade, an application specific integrated circuit (ASIC), a field-programmable gate array (FPGA), or another suitable component. Generally, each processor 156 executes instructions and manipulates data to perform the operations of the server 102. Specifically, each processor 156 executes the functionality required to receive and respond to requests from the end-user client device 104, for example.

Regardless of the particular implementation, "software" may include computer-readable instructions, firmware, wired and/or programmed hardware, or any combination thereof on a tangible medium (transitory or non-transitory, as appropriate) operable when executed to perform at least the processes and operations described herein. Indeed, each software component may be fully or partially written or described in any appropriate computer language including C, C++, Java™, JavaScript®, Visual Basic, assembler, Perl®, any suitable version of 4GL, as well as others. While portions of the software illustrated in FIG. 1 are shown as individual modules that implement the various features and functionality through various objects, methods, or other processes, the software may instead include a number of sub-modules, third-party services, components, libraries, and such, as appropriate. Conversely, the features and functionality of various components can be combined into single components as appropriate.

The server 102 includes memory 158. In some implementations, the server 102 includes multiple memories. The memory 158 may include any type of memory or database module and may take the form of volatile and/or non-volatile memory including, without limitation, magnetic media, optical media, random access memory (RAM), read-only memory (ROM), removable media, or any other suitable local or remote memory component. The memory 158 may store various objects or data, including caches, classes, frameworks, applications, backup data, business objects, jobs, web pages, web page templates, database tables, database queries, repositories storing business and/or dynamic information, and any other appropriate information including any parameters, variables, algorithms, instructions, rules, constraints, or references thereto associated with the purposes of the server 102.

The illustrated shufflers and data providers may each generally be any computing device operable to connect to or communicate with the server 102 via the network 106 using a wireline or wireless connection. In general, the shufflers and data providers each comprise an electronic computer device operable to receive, transmit, process, and store any appropriate data associated with the system 100 of FIG. 1.

The shufflers and data providers can each include one or more applications, including the application 132a, 132b, or 132c, respectively. In some implementations, an application on a shuffler or data provider can use parameters, metadata, and other information received at launch to access a particular set of data from the server 102. In some instances, an application may be a client application that is an agent or client-side version of the one or more enterprise applications running on an enterprise server (not shown).

Each shuffler or data provider can include one or more processors. For example, the data provider 118a, the shuffler 112, and the data provider 114a include processor(s) 160, 161, 162, respectively. Each processor 160, 161, or 162 may be a central processing unit (CPU), an application specific integrated circuit (ASIC), a field-programmable gate array (FPGA), or another suitable component. Generally, each processor 160, 161, or 162 executes instructions and manipulates data to perform the operations of the respective device. Specifically, each processor 160, 161, or 162 included executes the functionality required to send requests to the server 102 and to receive and process responses from the server 102.

Each shuffler or data provider is generally intended to encompass any computing device such as a laptop/notebook computer, wireless data port, smart phone, server computing device, personal data assistant (PDA), tablet computing device, one or more processors within these devices, or any other suitable processing device. For example, a client may comprise a computer that includes an input device, such as a keypad, touch screen, or other device that can accept user information, and an output device that conveys information associated with the operation of the server 102, or the respective device itself, including digital data, visual information, or a GUI 164, 165, or 166, respectively.

The GUIs 164, 165, and 166 interface with at least a portion of the system 100 for any suitable purpose, including generating a visual representation of the application 132a, 132b, or 132c, respectively. In particular, the GUI 164, 165 or 166 may be used to view and navigate various Web pages. Generally, the GUI 164, 165, and 166 provide a respective user with an efficient and user-friendly presentation of business data provided by or communicated within the system. The GUI 164, 165, and 166 may each comprise a plurality of customizable frames or views having interactive fields, pull-down lists, and buttons operated by the user. The GUI 164, 165, and 166 each contemplate any suitable graphical user interface, such as a combination of a generic web browser, intelligent engine, and command line interface (CLI) that processes information and efficiently presents the results to the user visually.

Memory 168, 169, and 170 exemplarily included in the data provider 108a, the shuffler 112a, or the data provider 114a, respectively, may each include any memory or database module and may take the form of volatile or non-volatile memory including, without limitation, magnetic media, optical media, random access memory (RAM), read-only memory (ROM), removable media, or any other suitable local or remote memory component. The memory 168, 169, 170 may each store various objects or data, including user selections, caches, classes, frameworks, applications, backup data, business objects, jobs, web pages, web page templates, database tables, repositories storing business and/or dynamic information, and any other appropriate information including any parameters, variables, algorithms, instructions, rules, constraints, or references thereto associated with the purposes of the associated client device.

There may be any number of data providers and/or shufflers associated with, or external to, the system 100. Additionally, there may also be one or more additional client or other types of devices external to the illustrated portion of system 100 that are capable of interacting with the system 100 via the network 106. Further, the term "client", "client device" and "user" may be used interchangeably as appropriate without departing from the scope of this disclosure. Moreover, while devices may be described in terms of being used by a single user, this disclosure contemplates that many users may use one computer, or that one user may use multiple computers.

FIG. 2 is an overview table 200 that includes details regarding secret-shuffle protocols 202, 204, 206, 208, and 210. The protocol 202 is a communication-efficient secret shuffle protocol for encrypted data, based on homomorphic encryption, with oblivious transfer. The protocol 204 is a verifiable secret shuffle protocol for encrypted data, based on homomorphic encryption and secret sharing. The protocol 206 is a computation-efficient secret shuffle for encrypted data, based on homomorphic encryption. The protocol 208 is an efficient, distributed secret shuffle protocol for encrypted database entries using dependent shufflers. The protocol 210 is an efficient, distributed secret shuffle protocol for encrypted database entries using independent shufflers.

The overview table 200 includes information on technologies 212 used by the protocols 202, 204, 206, 208, and 210. As described below with respect to detailed descriptions of particular protocols, each protocol can have different or unique technologies, characteristics, mechanisms, or requirements from other protocols. Some characteristics, requirements or mechanisms may be inconsistent or incompatible with other requirements, characteristics, or mechanisms and may therefore not be combined in a given single protocol. Accordingly, different and separate mechanisms and protocols can be provided and used for different and separate applications. Some protocols may be suited for strong client computation, strong server computation, or a strong network, for example. Specific examples are discussed below.

In further detail, each of the described protocols can be tailored for a specific type of application. To enable different applications, different protocols and mechanisms are provided that use different technologies (e.g., Homomorphic Encryption, Homomorphic Encryption+Secret Sharing, Homomorphic Encryption+Oblivious Transfer). The different protocols and mechanisms have different complexities (steps, communication, computation) and generally make different assumptions (e.g., about mobile scenarios, computational resources, data ownership, etc.). None of the protocols requires one of the other protocols to exist.

Regarding examples of particular technologies, the protocol 202 uses homomorphic encryption 214 and oblivious transfer 216. As another example, the protocol 204 uses homomorphic encryption 218 and secret sharing 220.

The overview table 200 also includes information on inputs 222 received or used by the protocols 202, 204, 206, 208, and 210. For instance, the protocol 206 uses inputs 224 provided by clients. As another example, the protocol 208 uses inputs 226 that are included in a service provider's database that were previously provided by a set of clients of which shufflers are a subset.

The overview table 200 includes an indication of how many steps and rounds 228 each protocol 202, 204, 206, 208, and 210 includes. For example, the protocol 210 includes ten steps in two rounds 230. As another example, the protocol 204 includes nine steps in three rounds 232.

A verifiability indication 234 is included for each protocol 202, 204, 206, 208, and 210. For instance, the protocol 204 is marked as verifiable 236. Other protocols are not marked as verifiable.

Each protocol 202, 204, 206, 208, and 210 has an indication of communication complexity 238 (e.g., between participants). For example, the protocol 208 has a communication complexity 240 of O(n). As another example, the protocol 206 has a communication complexity 242 of $O(n^2)$.

The overview table 200 also includes a computation complexity 244 for each protocol 202, 204, 206, 208, and 210. For example, the protocol 208 has a computation complexity 246 of O(n). Some protocols have different computation complexities for a service provider than for clients. For example, the protocol 202 has a computation complexity 248 of $O(n^2)$ for the service provider and a computation complexity 250 of O(n) for clients.

Each protocol 202, 204, 206, 208, and 210 can use one or more cryptosystems 252. The overview table 200 lists a count of used cryptosystems and whether conditions between cryptosystems exist. For instance, the protocol 204 uses one cryptosystem 254 and the protocol 210 uses two cryptosystems 256 (with no restrictions between the two cryptosystems). As another example, the protocol 208 uses two cryptosystems 258, with a plaintext space $M_2$ of a first cryptosystem $CS_2$ being a subset of a plaintext space $M_1$ of a second cryptosystem $CS_1$.

The overview table 200 includes a description of a number of participants 260, for each protocol 202, 204, 206, 208, and 210. For example, the protocol 202 has n+1 participants 262 (with n indicating a number of clients (and with the other participant being the service provider)). As another example, the protocol 210 includes m+1 participants 264, with m being a number of shufflers (and m being a subset of the number of clients), with the other participant again being the service provider). Each protocol and its technologies and characteristics is discussed separately, in detail, below.

FIG. 3 illustrates mathematical constructs 300 for homomorphic encryption and rerandomization. Shuffling protocols can use one or more asymmetric cryptosystems. An asymmetric cryptosystem CS 302 can be defined as a tuple (G, E, D) 303 that includes three polynomial-time algorithms, including a probabilistic key-generation algorithm G 304, a probabilistic encryption algorithm E 306, and a decryption algorithm D 308.

As illustrated in an equation 309, the probabilistic key-generation algorithm G 304 can accept as input a security parameter κ 310 and output a key pair (pk, sk) that includes a public encryption key pk 312 and a secret decryption key sk 314. As illustrated in an equation 315, the probabilistic encryption algorithm E 306 can accept as input a plaintext x 316, where the plaintext x 316 is included in a plaintext space M 318 (e.g., x∈M). The probabilistic encryption algorithm E 306 can also accept as input the public encryption key pk 312. The probabilistic encryption algorithm E 306 can output a ciphertext y 320, with y=E(x, pk)∈C, where C denotes a ciphertext space. As illustrated in an equation 322, the decryption algorithm D 308 can accept as input a ciphertext y∈C and the secret key sk 314. The decryption algorithm D 308 can output a plaintext x 324, with x=D(y, sk)∈M. For simplification purposes, an encryption of x∈M under a cryptosystem CS=(G, E, D) for pk can be denoted by y=E(x). Similarly, a decryption of y∈C for sk can be denoted by x=D(y).

An equation 326 illustrates additive homomorphic properties. Additive homomorphism can be used in the protocols described herein. In general, homomorphic cryptosystems enable encryption of data and computations on the encrypted data. In some additive homomorphic systems, such as Paillier cryptosystems, if both a first plaintext $x_1$ 328 and a second plaintext $x_2$ 330 are encrypted with a same public key, and the encryptions multiplied (e.g., to form a product 332), then a decryption of the product 332 is equal to a sum 334 of the two plaintexts. Other homomorphic systems can use other approaches, such as using addition of ciphertexts.

An additive homomorphic system can enable, for example, outsourcing of certain computations. For example, rather than summing two confidential values by a first entity, the first entity can, instead, encrypt the two data points and send the encrypted data points to a second, different entity. The second entity (e.g., a cloud provider) can, for example, multiply the two ciphertexts and provide the product to the first entity (or one or more other entities). For an entity such as the first entity that knows a secret key, the entity can decrypt the product to determine the sum of the two data points.

An equation 336 illustrates rerandomization. A homomorphic cryptosystem can enable rerandomization. Rerandomization can be used in the protocols described herein. Given a public key pk and a ciphertext E(x) of a plaintext x, rerandomization is an operation that allows for computation of a second valid ciphertext E'(x) 340 for x without the necessity of decryption. With high probability, E(x)≠E'(x) is ensured such that the output distributions of rerandomization and encryption are computationally indistinguishable. For example, rerandomization of E(x) 338 can be performed, e.g., in a Pallier cryptosystem, by multiplying E(x) 338 with an encrypted identity element 0 342 (e.g., E(0)). Rerandomization using a product 342 can enable creation of the second ciphertext 340, which can be equivalent to changing the ciphertext E(x) (e.g., into E'(x), without affecting the underlying plaintext x. In other words, rerandomization can enable changing the way encrypted data looks without changing what it encrypts.

FIG. 4 illustrates an example of a system 400 for oblivious transfer of messages between protocol participants. As an example, the protocol 202 (and possibly other protocols) can use oblivious transfer. Oblivious Transfer (OT) is a protocol between two participants that enables the participants to transfer a message in one direction obliviously. For example, a participant $P_1$ 402 can obliviously send a message to a participant $P_2$ 404, as indicated by a symbol 405. More formally, a participant $P_1$ 406 may have k secret messages $m_1, \ldots, m_k$ 408 with k≥2. A participant $P_2$ 410 may want to select and receive a message mL 412 without the participant $P_1$ 406 learning the value i. Furthermore, the participant $P_1$ 406 may not want the participant $P_2$ 410 to learn any message apart from the message $m_i$ 412.

An OT protocol for k messages is called 1-out-of-k OT. A particular version of OT is 1-out-of-2 OT, where, for example, a participant $P_1$ 414 has as input two messages $m_0$ 416 and $m_1$ 418, and a participant $P_2$ 420 is to receive either the message 416 or the message 418 (as a message 422), without the participant $P_1$ 414 learning which message was sent, and with the participant $P_2$ 420 receiving only one of the two messages.

FIG. 5A is a table 500 that provides information describing a communication-efficient secret shuffle protocol 502 based on homomorphic encryption and oblivious transfer. For instance, the protocol 502 can be the protocol 202 introduced above with respect to FIG. 2. The protocol 502 uses homomorphic encryption 504 and oblivious transfer 506, among other technologies. Inputs 508 are provided by clients. Clients can be referred to as players, that communicate with a service provider. Communication complexity 510 between participants is of an order O(n). Computation complexity 512 for clients is also of an order O(n), while computation complexity 514 for the service provider is of an order O($n^2$). The protocol 502 can be completed in twelve steps in two rounds 516. While some protocols (e.g., the protocol 204) can provide verifiable outputs, in some implementations, the protocol 502 yields unverifiable outputs 518.

The protocol 502 can use two cryptosystems 520. For example, a first cryptosystem $CS_1$ 522 can include a first key generation algorithm $G_1$ 524, a first encryption function $E_1$ 526, and a first decryption function $D_1$ 528. Similarly, a second cryptosystem $CS_2$ 530 can include a second key generation algorithm $G_2$ 532, a second encryption function $E_2$ 534, and a second decryption function $D_2$ 536. The first key generation algorithm 524 can, using a first security parameter $x_1$ 538 generate a first public key $pk_1$ 540 and a first secret key $sk_1$ 542. Similarly, the second key generation algorithm 532 can, using a second security parameter $\kappa_2$ 544 generate a second public key $pk_2$ 546 and a second secret key $sk_2$ 548. As indicated by a condition 550, a plaintext space $M_2$ of the second cryptosystem $CS_2$ 530 can be configured to be a subset of a plaintext space $M_1$ of the first cryptosystem $CS_1$ 522, (e.g., $M_2 \subseteq M_1$). The condition 550 can mean that any message that can be encrypted with the second public key $pk_2$ 546 can also be encrypted with the first public key $pk_1$ 540.

The protocol 502 can use n+1 participants 552, including n players $P_1, \ldots, P_n$ 554 and a service provider $P_S$ 556. As indicated by a note 558, the public key $pk_1$ 540 is known to the service provider $P_S$ 556 and the players $P_i$ 554. A note 560 indicates that the secret key $sk_1$ 542 is known only to the players $P_i$ 554. As indicated by a note 562, the public key $pk_2$ 546 is known to the service provider $P_S$ 556 and the players $P_i$ 554. A note 564 indicates that the secret key $sk_2$ 548 is only known to the service provider $P_S$ 556.

The protocol 502 can use a random permutation $\pi$ 566 that is chosen by and known to the service provider $P_S$ 556. The protocol 502 can use a cryptographic hash function h 568. The hashes of the cryptographic hash function h 568 can be uniformly distributed among a domain dom(h(•)). The protocol 502 can also use a sort function 570 that sorts a sequence and a position function 572 that outputs a position of an item in a sequence.

FIG. 5B illustrates a communication scenario 580 for the protocol 502. The protocol 502 can use a single, central service provider $P_S$ 582 and n players $P_i$. For example, a first player $P_1$ 584, a second player $P_2$ 586, and a third player $P_3$ are shown. The protocol can use various counts of players. The players 584, 586, and 588 are able to communicate with each other (as illustrated by communication links 590, 591, and 592) as well as with the central service provider $P_S$ 582 (as illustrated by communication links 594, 595, and 596). For the communication scenario 580, pairwise secure, (e.g., secret and authentic) channels between communicating participants can be used, for instance as established using Transport Layer Security (TLS).

The protocol 502 can be advantageous when the players $P_i$ want to shuffle inputs while minimizing communication. For example, the protocol 502 can be used in a mobile setting where the players $P_i$ use mobile devices and communicate primarily with a powerful central instance (e.g., the service provider 582). The protocol 502 can be particularly tailored for scenarios with limited network capacity and potentially (but not necessarily) computationally limited players, such as in mobile scenarios.

Figure 6:
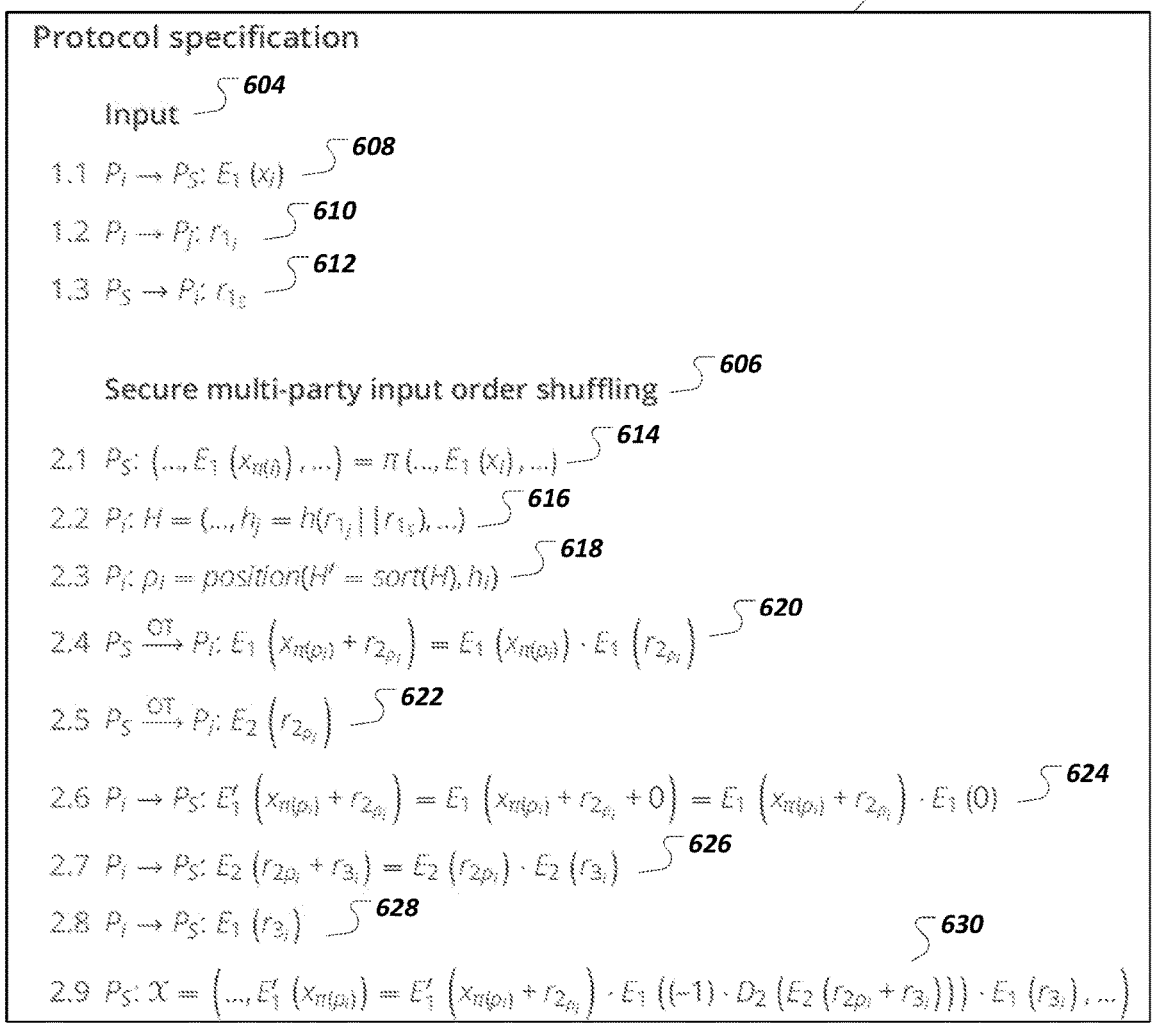
FIG. 6 illustrates a protocol specification for a communication-efficient secret shuffle protocol for encrypted data based on homomorphic encryption and oblivious transfer.

FIG. 6 illustrates a protocol specification 600 for a communication-efficient secret shuffle protocol 602 for encrypted data based on homomorphic encryption and oblivious transfer. The protocol 602 can correspond to the protocol 502, for example. The protocol 602 includes two rounds—an input round 604 and a shuffling round 606. The input round 604 includes three input steps 608, 610, and 612. The shuffling round 606 includes nine shuffling steps 614, 616, 618, 620, 622, 624, 626, 628, and 630. The steps of the protocol 602 are described in detail below with respect to FIGS. 7, 8, and 9.

FIG. 7 illustrates a swim lane diagram for a communication-efficient secret shuffle protocol 700 for encrypted data based on homomorphic encryption and oblivious transfer. It will be understood that the protocol 700 and related methods may be performed, for example, by any suitable system, environment, software, and hardware, or a combination of systems, environments, software, and hardware, as appropriate. For example, one or more of a client, a server, or other computing device can be used to execute the protocol 700 and related methods and obtain any data from the memory of a client, the server, or the other computing device. In some implementations, the protocol 700 and related methods are executed by the server 102 and one or more other components of the system 100 described above with respect to FIG. 1.

Corresponding to the input step 608 of the protocol 602 described above with respect to FIG. 6, each player $P_i$ encrypts its secret input value $x_i$ and sends the encrypted secret input value to a service provider 702. For example, a first player 704 can send a first encrypted secret input value 706 to the service provider 702 and a second player 708 can send a second encrypted secret input value 710 to the service provider 702. The secret input values can be encrypted using a first cryptosystem. The sending of the encrypted secret input values can be denoted by: $P_i \rightarrow P_S$: $E(x_i)$.

Corresponding to the input step 610 of the protocol 602, each player $P_i$ chooses a random value $r_{1_i}$ and sends it to each other player $P_j$. For example, the first player 704 can send a first random value 712 to the second player 708 and the second player 708 can send a second random value 714 to the first player 704.

Corresponding to the input step 612 of the protocol 602, the service provider 702 chooses one long random value $r_{1_S} \in M_1$, and sends the long random value to the players. For example, the service provider 702 can send a selected long random value 716 to the first player 704 and a selected long random value 718 (e.g., another copy of the same long random value) to the second player 708. The sending of the long random value can be denoted by: $P_S \rightarrow P_i$: $r_{1_S}$.

Referring again briefly to FIG. 6, in the shuffling round 606, which in more detail is a secure multi-party input order shuffling round, the players and the service provider are involved in a protocol consisting of communication in both directions between the service provider and the players. The service provider does not do shuffling independently. Rather, the service provider does shuffling with the help of the players that initially provided the encrypted data.

In further detail and corresponding to the shuffling step 614 of the protocol 602, the service provider 702, as a precomputation step, randomly permutes, at 720, the list of the players' encrypted inputs. For example, the service provider 702 can randomly permute (e.g., randomly change the order of) the encrypted secret input values collectively received from the players using a random permutation w.

The random permuting by the service provider 702 can be denoted by: $P_S$: ( . . . , $E_1$ ($x_{\pi(i)}$, . . . )=$\pi$( . . . , $E_1$ ($x_i$), . . . ).

Corresponding to the shuffling step 616 of the protocol 602, the players create hashes (at 722 and 724, respectively) using player random values and the long random value from the service provider 702. For example, each player can concatenate each random value plaintext $r_{1_j}$ received from another player with the long random value received from the service provider 702 and compute a hash of each concatenation (e.g., resulting in each of the n players creating n hashes $h_j$, which can be denoted as $P_i$: H=( . . . , $h_j$=h($r_{1_j}$||$r_{1_S}$), . . . ). Using $r_{1_S}$ as a seed of the hash function h can prevent any player $P_i$ from selecting a specific $r_{1_j}$ to obtain a desired hash $h_i$. In some implementations, before creating the n hashes, each player $P_i$ can compare the random values $r_{1_j}$ received from the other players and may abort the protocol if the random values from other players are not unique.

Corresponding to the shuffling step 618 of the protocol 602, each player determines a random index (e.g., at 726 and 728, respectively). For example, each player $P_i$ can sort the list of hashes it generated. A position $\rho_i$ can be determined in the sorted list of hashes, for a hash $h_i$=h($r_i$||$r_{P_S}$) that corresponds to the player $P_i$'s random value $r_{1_i}$. The position $\rho_i$ can be referred to as the random index of $P_i$. Accordingly, each player computes an individual, random index $\rho_i$ that is unknown to $P_S$ and not related to the rank of its input $x_i$. The random index $\rho_i$ for a player can be a value between 1 and n, assuming n players.

Corresponding to the shuffling step 620 of the protocol 602, each player receives an encrypted blinded input (e.g., at 730 and 732, respectively), from the service provider 702, using oblivious transfer. The receiving of the encrypted blinded inputs can be denoted by:

$$P_s \xrightarrow{OT} P_i : E_1(x_{\pi(\rho i)} + r_{2_{\rho_i}}) = E_1(x_{\pi(\rho i)}) \cdot E_1(r_{2_{\rho_i}}).$$

An input $x_{\pi(\rho_i)}$ in the random permutation $\pi$ at an index of the player's random index is blinded by a random value $$r_{2_{\rho_i}},$$

by the service provider, before being sent to a player $P_i$. The input is blinded, by a first blinding value, so that the player does not learn a secret input value of another player. The service provider, due to oblivious transfer, does not learn which input is blinded and sent. Homomorphically, the value $$E_1(x_{\pi(\rho i)} + r_{2_{\rho_i}})$$

is equal to the value $E_1(x_{\pi(\rho_i)})$.

$$E_1(r_{2_{\rho_i}}).$$

The blinded inputs can be encrypted by the service provider using the first cryptosystem.

Corresponding to the shuffling step 622 of the protocol 602, each player $P_i$ obtains (e.g., at 734 and 736, respectively) from the service provider 702, an encrypted first blinding value (e.g., an encrypted random value) used for blinding in the previous shuffling step, for instance as denoted by:

$$P_S \xrightarrow{OT} P_i : E_2(r_{2_{\rho_i}}).$$

The first blinding value can be encrypted by the service provider using a second cryptosystem that is different from the first cryptosystem. The second cryptosystem can be used to encrypt the first blinding value to prevent a player from decrypting the random value used for blinding and obtaining another player's secret input value using the decrypted blinding value (e.g., by subtracting the decrypted blinding value from the input received in the previous shuffling step).

Corresponding to the shuffling step 624 of the protocol 602, each player sends (e.g., at 738 and 740, respectively) a rerandomized encrypted blinded input to the service provider 702. To generate the rerandomized encrypted blinded input, the player can multiply a previously received encrypted blinded input with an encrypted zero. The sending of the rerandomized encrypted blinded input can be denoted as:

$$P_i \rightarrow P_S : E_1'(x_{\pi(\rho i)} + r_{2_{\rho_i}}) = E_1(x_{\pi(\rho i)} + r_{2_{\rho_i}} + 0) = E_1(x_{\pi(\rho i)} + r_{2_{\rho_i}}) \cdot E_1(0).$$

The rerandomized encrypted blinded input is a second encryption of the blinded input. With an additive homomorphic cryptosystem with the additive homomorphism of equation 326, multiplying an encrypted value $$(e.g., E_1(x_{\pi(\rho i)} + r_{2_{\rho_i}}))$$

by an encrypted zero results in a modified ciphertext but does not change the underling plaintext (since multiplication by an encrypted zero is equivalent to adding zero to the plaintext). Rerandomization can prevent the service provider from learning the random index of the player.

Corresponding to the shuffle step 626 of the protocol 602, each player sends an encryption of a blinded first blinding value to the service provider (e.g., at 742 and 744, respectively). The sending of the encryptions of the blinded first blinding values can be denoted as:

$$P_i \rightarrow P_S : E_2(r_{2_{\rho i}} + r_{3_i}) = E_2(r_{2_{\rho_i}}) \cdot E_2(r_{3_i}).$$

An encrypted first blinding value (e.g., $$E_2(r_{2_{\rho_i}}))$$

received by the player in the shuffling step 622 can be blinded by a second blinding value (e.g., an encrypted random value E ($r_{3_i}$)), to generate a blinded first blinding value. Blinding the encrypted first blinding value by the second blinding value can result in a product $$E_2(r_{2\rho_i}) \cdot E_2(r_{3_i}).$$

The product $$E_2(r_{2\rho_i}) \cdot E_2(r_{3_i})$$

is equivalent to $$E_2(r_{2\rho_i} + r_{3_i}),$$

due to additive homomorphism.

Corresponding to the shuffling step 628 of the protocol 602, each player sends (e.g., at 746 and 748, respectively), an encrypted second blinding value. The second blinding value can be a blinding value used by the player to blind the first blinding value in the shuffling step 626. The second blinding value can be encrypted using the first cryptosystem. The sending of the encrypted second blinding values can be denoted as: $P_i \rightarrow P_S: E_1(r_{3_i})$.

Corresponding to the shuffling step 630 of the protocol 602, the service provider, at 746, generates rerandomized encrypted secret input values based on the inputs received in the shuffling steps 624, 626, and 628. The generation of the rerandomized encrypted secret input values can be denoted by:

$$P_S : X = \\ (\ldots, E_1'(x_{\pi(\rho i)}) = E_1'(x_{\pi(\rho i)} + r_{2\rho_i}) \cdot E_1((-1) \cdot D_2(E_2(r_{2\rho_i} + r_{3_i}))) \cdot E_1(r_{3_i}), \\ \ldots ).$$

In further detail, the service provider 702 can, for each player, decrypt the encryption of the second blinding value $$E_2(r_{2\rho_i} + r_{3_i})$$

received, e.g., at 742 or 744. The service provider 702 can multiply the plaintext resulting from the decryption with −1, and encrypt the product under the first cryptosystem $CS_1$. The resulting ciphertext can be multiplied with the rerandomized encrypted blinded input $$E_1(x_{\pi(\rho_i)} + r_{2\rho_i})$$

(e.g., received at either 738 or 740) and with the encrypted second blinding value $E_1(r_{3_i})$ (e.g., received at either 746 or 748). Consequently, the random values $$r_{2\rho_i}$$

and $r_{3_i}$ can be eliminated, resulting in rerandomized ciphertexts $x_i' = E_1'(x_{\pi(\rho_i)})$. The order of the rerandomized ciphertexts $X_i$ of the input values $x_i$ depends on the input order of the inputs received by the service provider in the shuffling steps 626, 628, and 630, e.g., as received over network(s). In summary, in execution of the protocol 602, every player $P_i$ sends some $P_j$'s rerandomized, encrypted input, chosen based on the player $P_i$'s random index. The service provider 702 cannot map between the original input order and the order of X. Therefore, $P_S$'s output is a shuffled list. The players do not get an output.

Figure 8A:
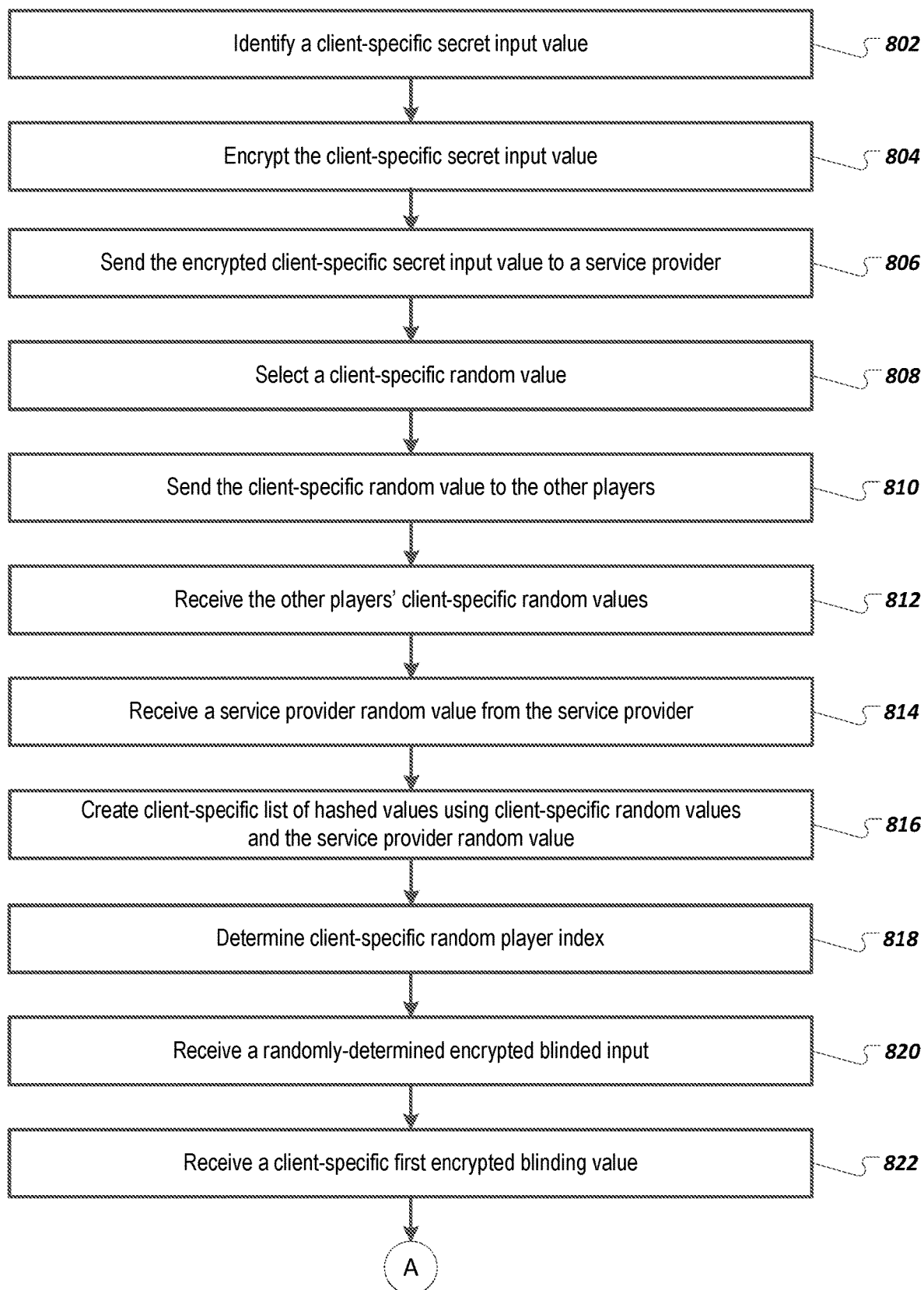
FIGS. 8A-8B illustrate a flowchart of a participant method for a communication-efficient secret shuffle protocol for encrypted data based on homomorphic encryption and oblivious transfer.
Figure 8B:
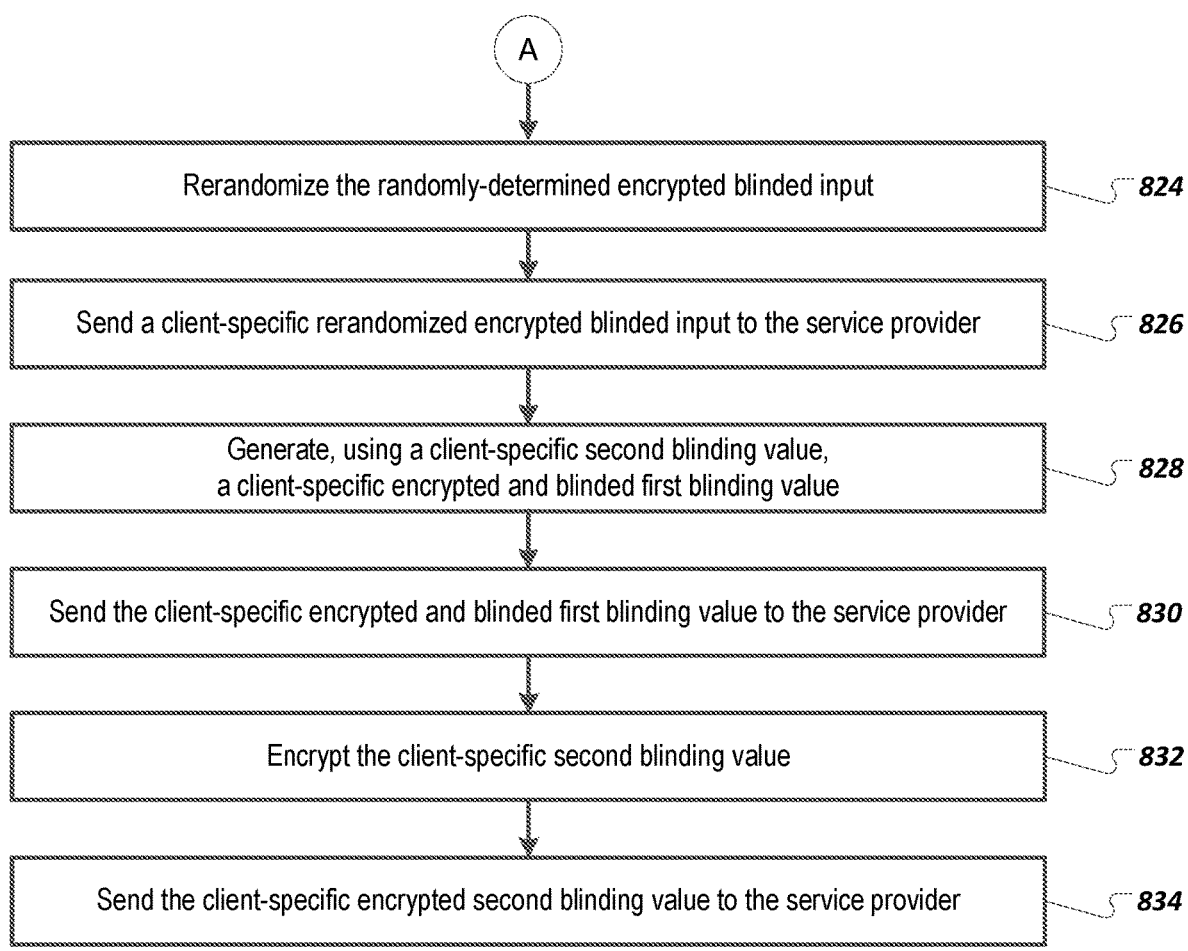

FIGS. 8A-8B illustrate a flowchart of a participant method 800 for a communication-efficient secret shuffle protocol for encrypted data based on homomorphic encryption and oblivious transfer. It will be understood that the method 800 and related methods may be performed, for example, by any suitable system, environment, software, and hardware, or a combination of systems, environments, software, and hardware, as appropriate. For example, one or more of a client, a server, or other computing device can be used to execute method 800 and related methods and obtain any data from the memory of a client, the server, or the other computing device. In some implementations, the method 800 and related methods are executed by one or more components of the system 100 described above with respect to FIG. 1. For example, the method 800 and related methods can be executed by a data provider client of FIG. 1. A player as described below can be considered a client of a service provider, and a participant in the secret shuffle protocol, for example.

At 802, the player identifies a client-specific secret input value $x_i$. The client-specific secret input value can be a value that is to be used in computation(s) with other client-specific secret input values provided by other players. At 804, the player encrypts the client-specific secret input value. The player can encrypt the client-specific secret input value using a first cryptosystem. At 806, the player sends the encrypted client-specific secret input value to a service provider. Steps 802, 804, and 806 correspond to the input step 608 of the protocol 602 described above with respect to FIG. 6.

At 808, the player selects a client-specific random value. At 810, the player sends the selected client-specific random value to each of the other players. At 812, the player receives a client-specific random value from each of the other players. Steps 808, 810, and 812 correspond to the input step 610 of the protocol 602.

At 814, the player receives a service provider random value from the service provider. Step 814 corresponds to the input step 612 of the protocol 602.

At 816, the player creates a list of client-specific hashed values using each of the client-specific random values and the service provider random value. For example, the player can concatenate each random value plaintext $r_{1_j}$ received from another player (and the player's own random value) with the service provider random value received from the service provider and compute a hash of each concatenation (e.g., resulting in creation of n hashes $h_j$, which can be denoted as $P_i: H=(\ldots, h_j=h(r_{1_j}\|r_{1_S}), \ldots)$. Using $r_{1_S}$ as a seed of the hash function h can prevent players from selecting a specific $r_{1_j}$ to obtain a desired hash $h_j$. In some implementations, before creating the n hashes, the player compares the client-specific random value and the client-specific random values $r_{1_j}$ received from the other players and aborts the protocol if the random values are not unique. Step 816 corresponds to the shuffling step 616 of the protocol 602.

At 818, the player determines a client-specific random player index. For example, the player can sort the list of hashes it generated, and a position $\rho_i$ can be determined in the sorted list of hashes, for a hash $h_i=h(r_i\|r_{P_S})$ that corresponds to the player's client-specific random value $r_{1_i}$. The position $\rho_i$ can be referred to as the client-specific random index of the player. Notably, the player computes an individual, random index $\rho_i$ that is unknown to the service provider and is not related to the rank of the player's secret input value. The client-specific random index $\rho_i$ for a player can be a value between 1 and n, assuming n players. The step 818 corresponds to the shuffling step 618 of the protocol 602.

At 820, the player receives a randomly-determined encrypted blinded input from the service provider. For instance, the player can receive (or select), using an oblivious transfer, a particular encrypted blinded input, from the service provider. A particular blinded input can be encrypted using the first cryptosystem, for example. The input can be identified from a random permutation using the player's random index. The input can be blinded with a first blinding value (e.g., a random number), before being encrypted. The input can be blinded so that the player does not learn a secret input value of another player. Oblivious transfer can mean, in this context, that the player receives one encrypted blinded input (and not any other information for other inputs in the random permutation) and that the service provider does not learn which input has been blinded, encrypted, and sent to the player. The step 820 corresponds to the shuffling step 620 of the protocol 602.

At 822, the player receives a client-specific first encrypted blinding value, from the service provider. For instance, the player can receive (or select) the client-specific first encrypted blinding value, using an oblivious transfer. The first blinding value can be a random value used for blinding the randomly-determined encrypted blinded input, and can be encrypted using a second cryptosystem that is different from the first cryptosystem. The second cryptosystem can be used to encrypt the first blinding value to prevent the player from decrypting the random value used for blinding (e.g., with the first cryptosystem) and obtaining another player's secret input value using the decrypted blinding value (e.g., by subtracting the decrypted blinding value from the input received in the previous shuffling step). Steps 822 corresponds to the shuffling step 622 of the protocol 602.

At 824, the player rerandomizes the randomly-determined encrypted blinded input to generate a client-specific rerandomized encrypted blinded input. For example, the player can rerandomize the encrypted blinded input by multiplying the encrypted blinded input by an encrypted zero. At 826, the player sends the client-specific rerandomized encrypted blinded input to the service provider. Rerandomization can prevent the service provider from learning the random index of the player. Steps 824 and 826 correspond to the shuffling step 624 of the protocol 602.

At 828, the player blinds the client-specific first encrypted blinding value received in step 822 using a second blinding value, to create a client-specific encrypted and blinded first blinding value. The second blinding value can be a second random value generated by the player. At 830, the player sends the client-specific encrypted and blinded first blinding value to the service provider. Steps 828 and 830 correspond to the shuffling step 626 of the protocol 602.

At 832, the player encrypts the second blinding value. The second blinding value can be encrypted using the first cryptosystem. At 834, the player sends an encrypted second blinding value to the service provider. Steps 832 and 834 correspond to the shuffling step 628 of the protocol 602. A last step (e.g., 626) of the shuffling protocol 602 can be service-provider specific, in which the service provider uses the client-specific rerandomized encrypted blinded inputs, the client-specific encrypted and blinded first blinding values, and the encrypted second blinding values to homomorphically remove blinding values while creating rerandomized encrypted secret input values that the service provider cannot map to an order of originally received secret input values.

Figure 9A:
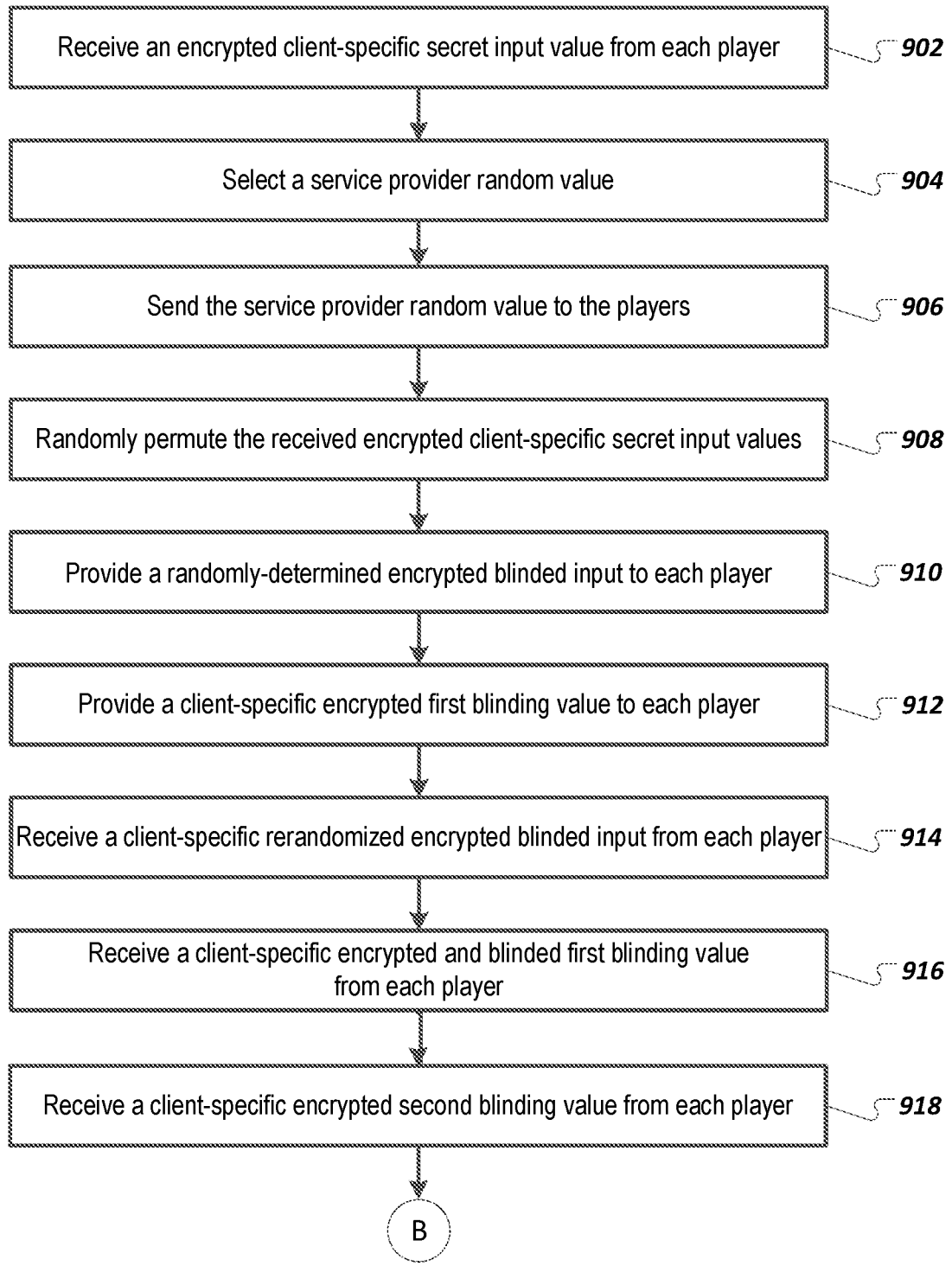
FIGS. 9A-9B illustrate a flowchart of a service provider method for a communication-efficient secret shuffle protocol for encrypted data based on homomorphic encryption and oblivious transfer.
Figure 9B:
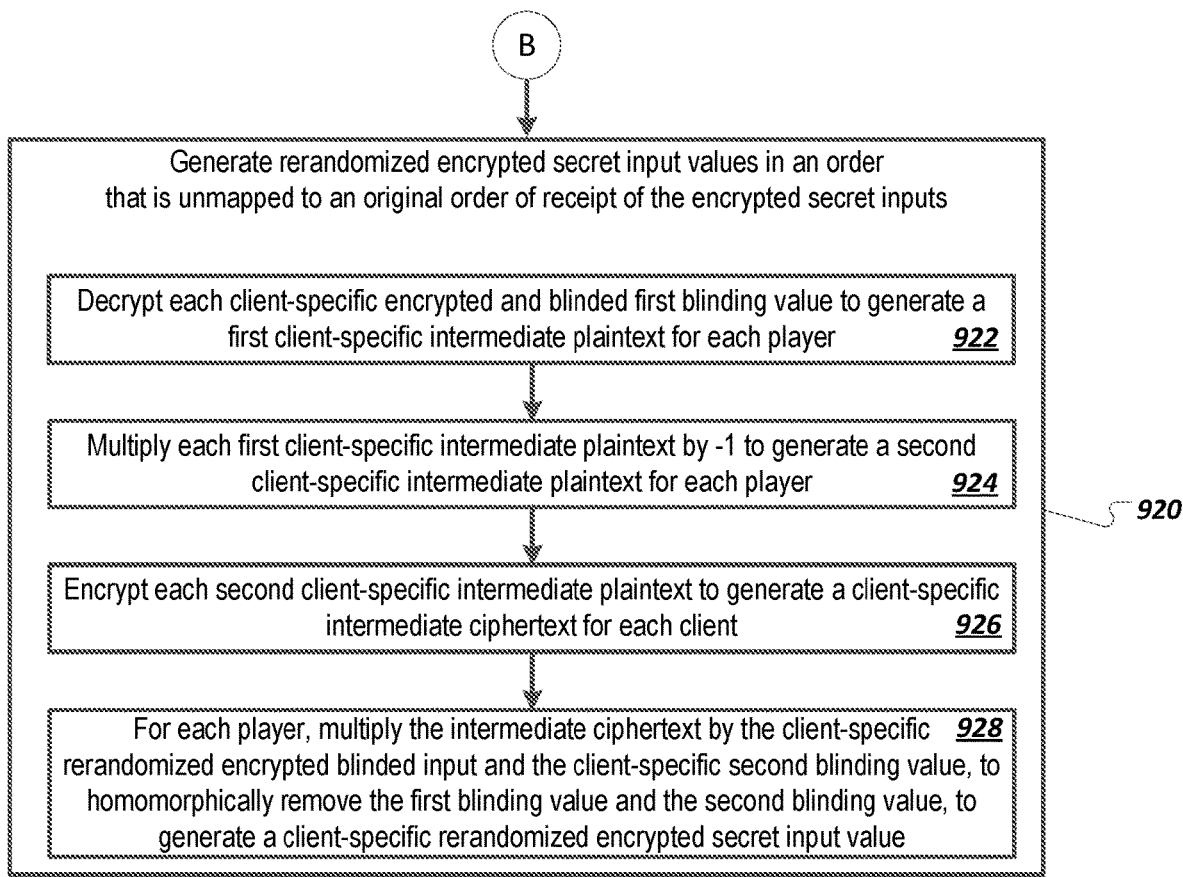

FIGS. 9A-9B illustrate a flowchart of a service provider method 900 for a communication-efficient secret shuffle protocol for encrypted data based on homomorphic encryption and oblivious transfer. It will be understood that the method 900 and related methods may be performed, for example, by any suitable system, environment, software, and hardware, or a combination of systems, environments, software, and hardware, as appropriate. For example, one or more of a client, a server, or other computing device can be used to execute method 900 and related methods and obtain any data from the memory of a client, the server, or the other computing device. In some implementations, the method 900 and related methods are executed by one or more components of the system 100 described above with respect to FIG. 1. For example, the method 900 and related methods can be executed by the server 102 of FIG. 1.

At 902, the service provider receives an encrypted client-specific secret input value from each player. The encrypted client-specific secret input values can be encrypted with an encryption function of a first cryptosystem. Step 902 corresponds to the input step 608 of the protocol 602 described above with respect to FIG. 6.

At 904, the service provider selects a service provider random value (e.g., a random value having a data type of long). The service provider random value can be in a plaintext space of the first cryptosystem. At 906, the service provider sends the selected service provider random value to each of the players. Steps 904 and 906 corresponds to the input step 612 of the protocol 602.

At 908, the service provider randomly permutes the received encrypted client-specific secret input values. The service provider can use a random permutation $\pi$ to randomly permute the received client-specific encrypted secret values, for example. Step 908 corresponds to the shuffling step 614 of the protocol 602.

At 910, the service provider provides a randomly-determined encrypted blinded input to each player. Each randomly-determined encrypted blinded input can be selected for (or by) a player based on a unique random index of the player. The randomly-determined encrypted blinded inputs can be provided using an oblivious transfer. Oblivious transfer can be implemented between the service provider and the player in various ways. Enabling oblivious transfer enables the player to receive (e.g., select) a particular value among a set of values, without learning other values, and without the service provider learning which value was selected. An encrypted blinded input selected using the enabled oblivious transfer can be generated by encrypting, using the first cryptosystem, a sum of the following: 1) an input retrieved from the random permutation using the player's random index, and 2) a blinding value (e.g., a random number). The input can be blinded with the blinding value so that the player does not learn a secret input value of another player. Oblivious transfer can mean, in this context, that the service provider does not learn which (blinded) input has been received (e.g., selected) by the player. Step 910 corresponds to the shuffling step 620 of the protocol 602.

At 912, the service provider provides a client-specific encrypted first blinding value to each player, for example using oblivious transfer. The service provider can encrypt the first blinding value using a second cryptosystem that is different than the first cryptosystem. The second cryptosystem can be used to encrypt the first blinding value to prevent the player from decrypting the random value used for blinding and obtaining another player's secret input value using the decrypted blinding value (e.g., by subtracting the decrypted blinding value from the input received in the previous shuffling step). Step 912 corresponds to the shuffling step 622 of the protocol 602.

At 914, the service provider receives a rerandomized encrypted blinded input from each player. The rerandomized encrypted blinded input can be a second encryption of the encrypted blinded input previously received by the player using oblivious transfer. Rerandomization can prevent the service provider from learning the random index of the player. Step 914 corresponds to the shuffling step 624 of the protocol 602.

At 916, the service provider receives a client-specific encrypted and blinded first blinding value from each player. The client-specific encrypted and blinded first blinding value can encrypt a blinded first blinding value that is blinded by a client-specific second blinding value. Step 924 corresponds to the shuffling step 626 of the protocol 602.

At 918, the service provider receives an encrypted second blinding value from each player. Second blinding values are used by the players to blind the first blinding values in the shuffling step 626. Step 918 corresponds to the shuffling step 628 of the protocol 602.

At 920, and corresponding to the shuffling step 628 of the protocol 602, the service provider generates rerandomized encrypted secret input values in an order that is unmapped to an original order of receipt of the encrypted secret inputs. Accordingly, the service provider has a shuffled list of original inputs that differs from the original inputs in that ciphertexts have both been reordered and rerandomized (although encrypting same plaintexts).

In further detail, at 922, the service provider decrypts each client-specific encrypted and blinded first blinding value to generate a first client-specific intermediate plaintext for each client. At 924, the service provider multiplies each first client-specific intermediate plaintext by negative one to generate a second client-specific intermediate plaintext for each client. At 926, the service provider encrypts each second client-specific intermediate plaintext to generate an intermediate ciphertext for each client. At 928, the service provider multiplies, for each client, the intermediate ciphertext by the client-specific rerandomized encrypted blinded input and the client-specific second blinding value, to homomorphically remove the first blinding value and the second blinding value, to generate a client-specific rerandomized encrypted secret input value. The client-specific rerandomized encrypted secret input values are generated in an order that is unmapped to an order of receipt, at the service provider, of the original encrypted secret input values.

FIG. 10A is a table 1000 that provides information describing a verifiable secret shuffle protocol 1102 for encrypted data based on homomorphic encryption and secret sharing. For instance, the protocol 1002 can be the protocol 204 introduced above with respect to FIG. 2. The protocol 1002 uses homomorphic encryption 1004 and secret sharing 1006, among other technologies. Inputs 1008 are provided by clients. Clients can be referred to as players, that communicate with a service provider. Communication complexity 1010 between participants is of an order $O(n^2)$. Computation complexity 1012 for clients is of an order $O(n)$, while computation complexity 1014 for the service provider is of an order $O(n^2)$. The protocol 1002 can be completed in nine steps in three rounds 1016.

The protocol 1002 provides verifiability of the outputs 1018. The protocol 1002 can be suitable, for example, when participants want to shuffle inputs and make sure that the shuffle was done correctly. The protocol 1002 can be particularly tailored for scenarios where verifiability of the shuffle is required.

The protocol 1002 can use one cryptosystem 1020. For example, a cryptosystem CS 1022 can include a key generation algorithm G 1024, an encryption function E 1026, and a decryption function D 1028. The key generation algorithm 1024 can, using a security parameter κ 1030, generate a public key pk 1032 and a secret key sk 1034. The protocol 1002 can use n+1 participants 1036, including n players $P_1, \ldots, P_n$ 1038 and a service provider $P_S$ 1040. As indicated by a note 1042, the public key pk 1032 is known to the service provider $P_S$ 1040 and the players $P_i$ 1038. A note 1044 indicates that the secret key sk 1042 is known only to the players $P_i$ 1038. A random permutation $\pi_1$ 1044 can be used that is chosen by and known to the service provider. A random permutation $\pi_2$ 1046 can be used that is generated by and known only to the players. An additive secret sharing mechanism 1048 can be used, as described in more detail below.

FIG. 10B illustrates a communication scenario 1080 for the protocol 1002. The communication scenario 1080 can use n players $P_i$. For example, a first player $P_1$ 1082, a second player $P_2$ 1084, a third player $P_3$ 1086, and a fourth player $P_4$ 1088 are illustrated. Other counts of players can be used. Each player $P_i$ can be configured to communicate with a single, central service provider $P_S$ 1090. For example, the communication scenario 1080 can include pairwise secure, (e.g., secret and authentic) channels between the players $P_i$ and the service provider $P_S$ 1090, for example as established using TLS. For instance, communication links 1092, 1094, 1096, and 1098 between respective players and the service provider $P_S$ 1090 are shown.

Figure 11:
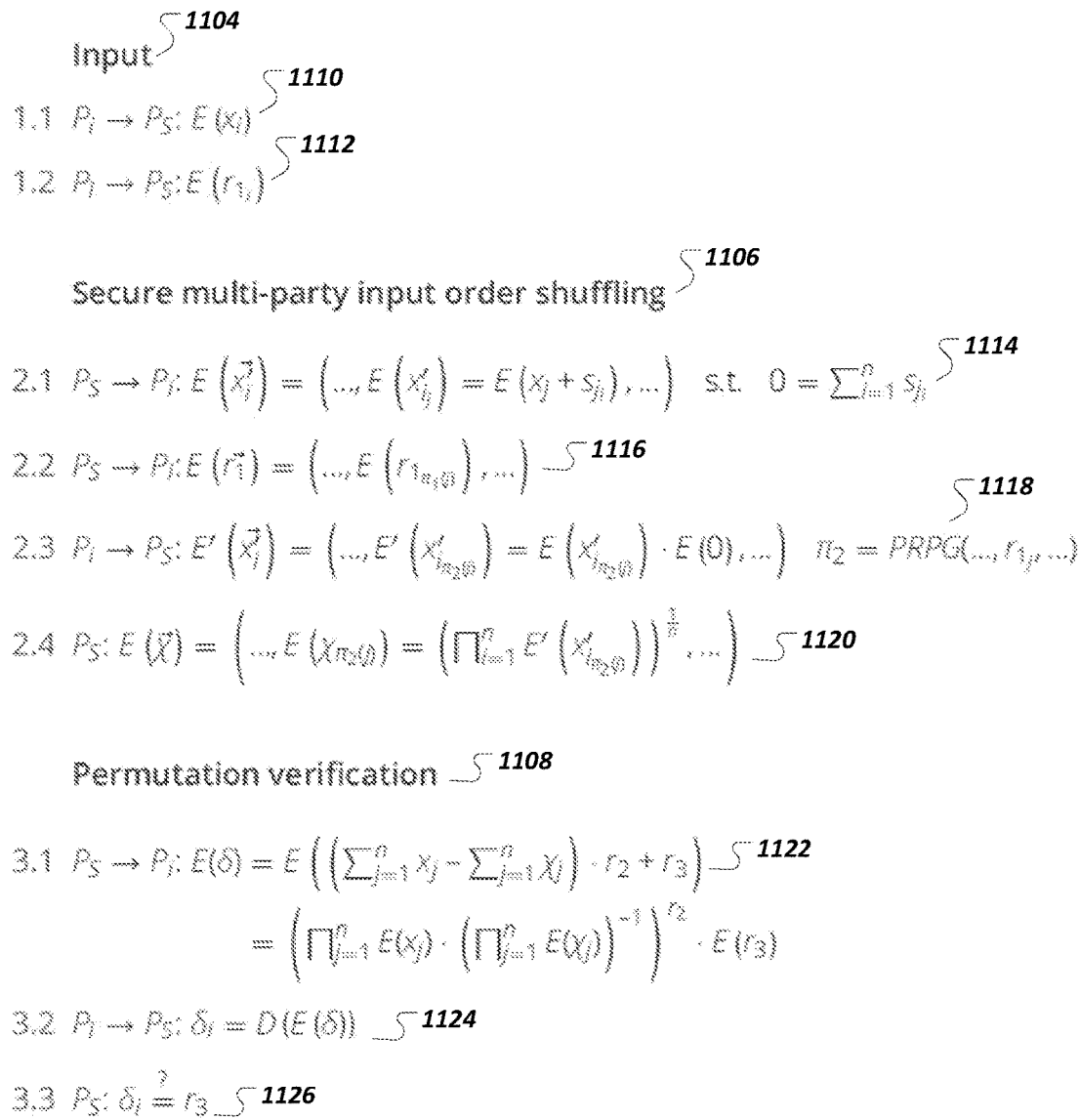
FIG. 11 is a protocol specification for a verifiable secret shuffle protocol for encrypted data based on homomorphic encryption and secret sharing.

FIG. 11 illustrates a protocol specification 1100 for a verifiable secret shuffle protocol 1102 for encrypted data based on homomorphic encryption and secret sharing. The protocol 1102 includes three rounds—an input round 1104, a shuffling round 1106, and a permutation verification round 1108. The input round 1104 includes two input steps 1110 and 1112. The shuffling round 1106 includes four shuffling steps 1114, 1116, 1118, and 1120. The permutation verification round 1108 includes three verification steps 1122, 1124, and 1126. The steps of the protocol 1102 are described in detail below with respect to FIGS. 12, 13, and 14.

FIGS. 12A-B are swim lane diagrams for a verifiable secret shuffle protocol 1200 for encrypted data based on homomorphic encryption and secret sharing. It will be understood that the protocol 1200 and related methods may be performed, for example, by any suitable system, environment, software, and hardware, or a combination of systems, environments, software, and hardware, as appropriate. For example, one or more of a client, a server, or other computing device can be used to execute the protocol 1200 and related methods and obtain any data from the memory of a client, the server, or the other computing device. In some implementations, the protocol 1200 and related methods are executed the server 102 and one or more other components of the system 100 described above with respect to FIG. 1.

Corresponding to the input step 1110 of the protocol 1102 described above with respect to FIG. 11, each player $P_i$ encrypts its secret input value $x_i$ and sends the encrypted secret input value to a service provider 1202. For example, a first player 1204 can send a first encrypted secret input value 1206 to the service provider 1202 and a second player 1208 can send a second encrypted secret input value 1210 to the service provider 1202. The sending of the encrypted input values can be denoted by: $P_i \to P_S$: $E(x_i)$.

Corresponding to the input step 1112 of the protocol 1102, each player $P_i$ generates a random value $r_{1_i}$, encrypts it, and sends the encrypted random value (e.g., at 1212 and 1214 respectively) to the service provider 1202. The sending of the encrypted random values can be denoted by: $P_i \to P_S$: $E(r_{1_i})$.

Corresponding to the shuffling step 1114 of the protocol 1102, at 1216, the service provider 1202 generates a client-specific random secret-share for each combination of client and secret input value, i.e., $n^2$ secret-shares. For each client, the service provider 1202 blinds each encrypted secret input value for the client with one of the random secret-shares for the client. The client-specific random secret-shares for one secret input value can add up to zero, for example. The service provider 1202 sends (e.g., at 1218 and 1220) a list of encrypted blinded secret input values to each client. In further detail, for each secret input value $x_j$, the service provider 1202 can secret-share 0, by creating n random shares $s_{j_i} = [\![0]\!]_i$ that add up to 0. The service provider 1202 can, using the list of the players' encrypted input values ( . . . , $E(x_j)$, . . . ), blind each encrypted input by homomorphically adding the respective random share $s_{j_i}$. The service provider 1202 can send the list of encrypted, blinded inputs to each player $P_i$. The generating and the sending of the encrypted blinded inputs can be denoted by:

$P_S \to P_i : E(\vec{x_i'}) = ( \ldots , E(x_{i_j}') = E(x_j + s_{j_i}), \ldots )$ s.t. $0 = \Sigma_{i=1}^n s_{j_i}$.

Corresponding to the shuffling step 1116 of the protocol 1102, at 1222, the service provider 1202 randomly permutes the encrypted client-specific random values received from the clients to generate a randomly-permuted list of encrypted random values (e.g., using a random permutation). The service provider 1202 sends (e.g., at 1224 and 1226, respectively) the randomly-permuted list of encrypted random values to each client. The generating and sending of the randomly-permuted encrypted random values can be denoted by:

$$P_S \to P_i : E(\vec{r_1}) = \left( \ldots , E\left(r_{1_{\pi_1(j)}}\right), \ldots \right).$$

Corresponding to the shuffling step 1118 of the protocol 1102, each player (e.g., at 1228 and 1230, respectively) decrypts each encrypted random value in the randomly-permuted list of encrypted random values to generate a list of random values. Each player (e.g., at 1232 and 1234, respectively) obtains a random permutation that is based on the list of random values. A same random permutation is obtained by each client, such as from a pseudo-random permutation generator (PRPG). Each player (e.g., at 1236 and 1238, respectively) rerandomizes (e.g., by multiplication with an encrypted zero), each encrypted blinded secret input value in the list of encrypted blinded secret input values to generate a rerandomized list of encrypted blinded secret input values.

Each player randomly-permutes the rerandomized list of encrypted blinded secret input values to generate a client-specific list of randomly-permuted rerandomized encrypted blinded secret input values and sends (e.g., at 1240 and 1242, respectively) the client-specific list of randomly-permuted rerandomized encrypted blinded secret input values to the service provider 1202. The generation and sending of the client-specific lists of randomly-permuted rerandomized encrypted blinded secret input values can be denoted by:

$$P_i \to P_S : E'(\vec{x_i'}) = \left( \ldots , E'\left(x_{i_{\pi_2(j)}}'\right) = E(x_{i_{\pi_2(j)}}') \cdot E(0), \ldots \right) \pi_2 = PRPG( \ldots , r_{1_j}, \ldots ).$$

Corresponding to the shuffling step 1120 of the protocol 1102, at 1244, the service provider 1202 homomorphically generates a sequence of encrypted secret input values that are rerandomized and in a sequence that is unmapped to an order of receipt by the service provider of the encrypted secret input values. In further detail, the service provider 1202 can compute a list of permuted, rerandomized, encrypted input values by homomorphically adding the n values with a same index. The service provider 1202 can perform the homomorphic addition n times for each of the n indices to obtain a full list of n input values. Additionally, it has to homomorphically divide each of the n sums by n. This can be done for each encrypted sum by exponentiation by the power of $$\frac{1}{n}.$$

The resulting list is the shuffled list of encrypted input values, that is unmapped to the original order of input values. The generation of the shuffled sequence can be denoted by:

$$P_S : E(\vec{x}) = \left( \ldots , E(x_{\pi_2(j)}) = \left( \prod_{i=1}^n E'\left(x_{i_{\pi_2(j)}}'\right) \right)^{\frac{1}{n}}, \ldots \right).$$

Optionally, a verification can be performed, as shown in a verification protocol 1250 in FIG. 12B. For instance, corresponding to the verification step 1122 of the protocol 1102, at 1246, the service provider 1202 homomorphically computes a first sum of the encrypted secret input values. At 1248, the service provider 1202 homomorphically computes a second sum of the shuffled list of encrypted input values. At 1250, the service provider 1202 generates first and second random numbers. At 1252, the service provider 1202 computes a difference between the first sum and the second sum. At 1254 the service provider 1202 homomorphically blinds the difference multiplicatively with the first random number using exponentiation and additively with the second random number using multiplication, to generate an encrypted blinded difference. At 1256, the service provider 1202 sends the encrypted blinded difference to each player. The generating and sending of the encrypted blinded difference can be denoted by: $P_S \rightarrow P_i$: $E(\delta) = \sum_{j=1}^n x_j - \sum_{j=1}^n \chi_j) \cdot r_2 + r_3) = (\Pi_{i=1}^n E(x_j) \cdot \Pi_{i=1}^n E(\chi_j)^{-1})^{r_2} \cdot E(r_3)$.

Corresponding to the verification step 1124 of the protocol 1102, each player decrypts (e.g., at 1260 and 1262, respectively) the encrypted blinded difference, to generate a blinded difference. Each player sends (e.g., at 1264 and 1266, respectively), a blinded difference to the service provider 1202. The generation and sending of the blinded differences can be denoted by: $P_i \rightarrow P_S: \delta_i = D(E(\delta))$.

Corresponding to the verification step 1126 of the protocol 1102, at 1268, the service provider 1202 determines whether all received blinded inputs match the second random number. If all received blinded inputs match the second random number, the shuffled sequence of encrypted secret input values is valid. If not all received blinded inputs match the second random number, the shuffled sequence can be determined to be invalid. In further detail, for each player $P_i$, the service provider 1202 can check whether its returned blinded plaintext difference $\delta_i$ equals $r_3$. If there is a mismatch, the elements in the shuffled sequence $E(\vec{\chi})$ do not equal the input elements $E(\vec{x})$. If, in turn, all the $\delta_i$ are equal to $r_3$, this implies that all the players used the same permutation $r_2$, except with negligible probability. The verification performed by the service provider 1202 can be denoted by: $P_S: \delta_i \stackrel{?}{=} r_3$ (If $\delta_i \neq r_3$, the resulting sequence $E(\vec{\chi})$ is not a shuffled version of $E(\vec{x})$).

Figure 13A:
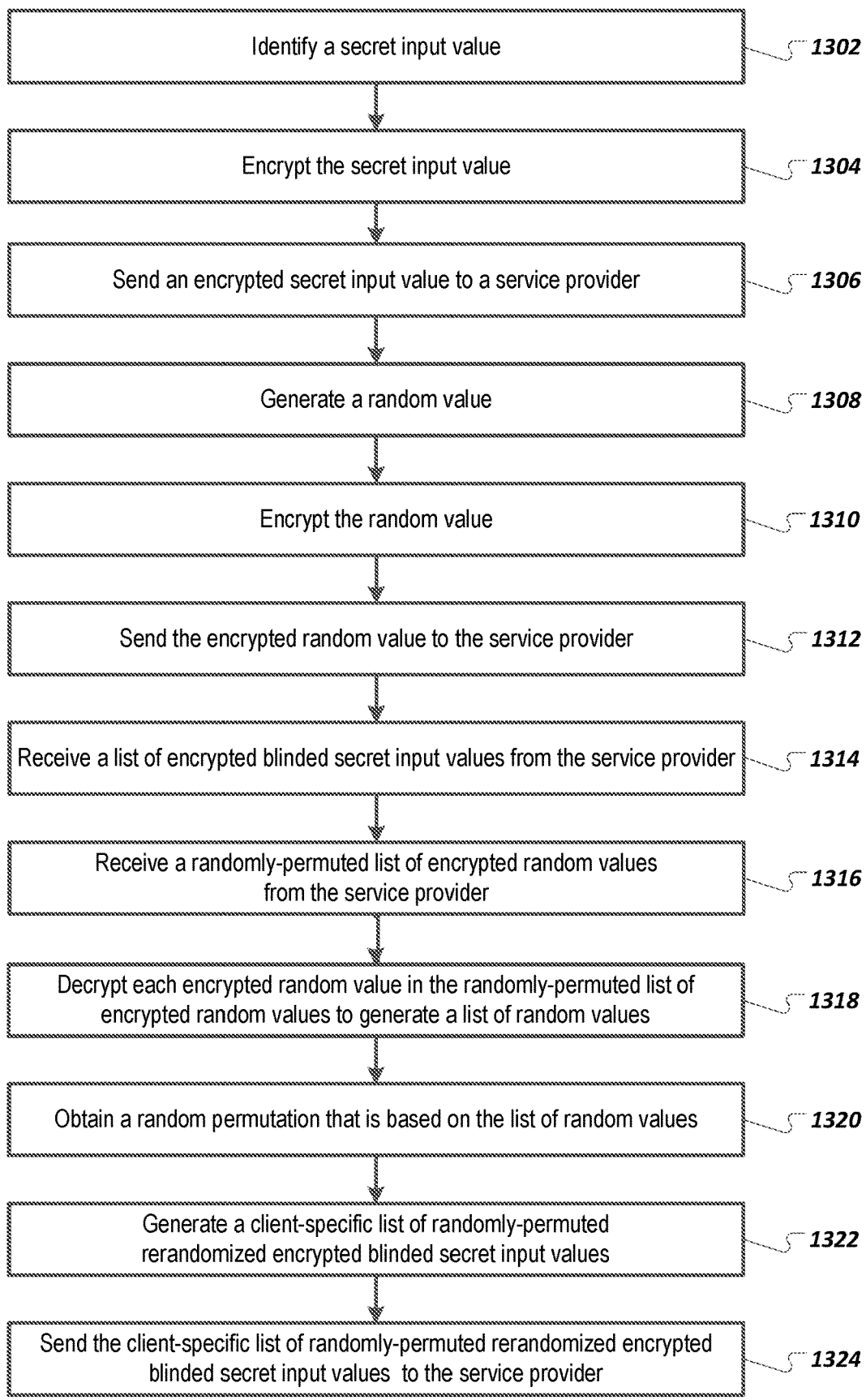
FIG. 13A-B illustrate a flowchart of a participant method for a verifiable secret shuffle protocol for encrypted data based on homomorphic encryption and secret sharing.
Figure 13B:
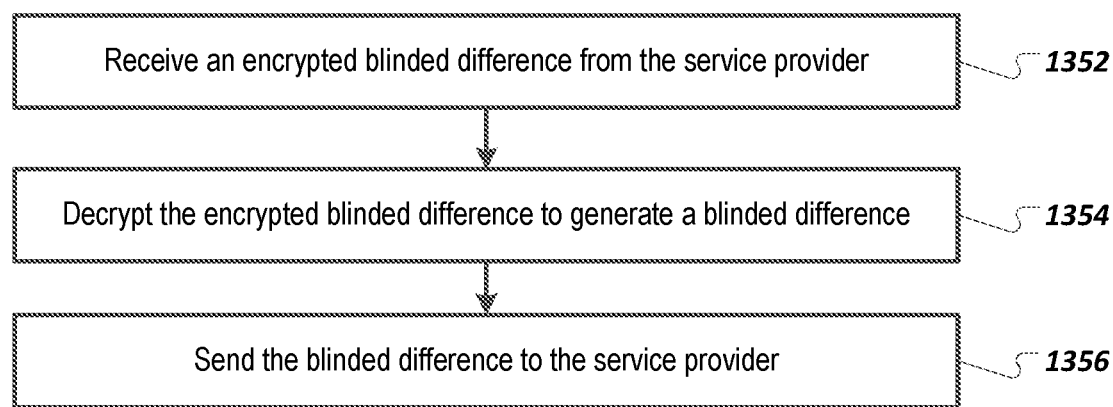

FIGS. 13A-B illustrate a flowchart of a participant method 1300 for a verifiable secret shuffle protocol for encrypted data based on homomorphic encryption and secret sharing. It will be understood that the method 1300 and related methods may be performed, for example, by any suitable system, environment, software, and hardware, or a combination of systems, environments, software, and hardware, as appropriate. For example, one or more of a client, a server, or other computing device can be used to execute method 1300 and related methods and obtain any data from the memory of a client, the server, or the other computing device. In some implementations, the method 1300 and related methods are executed by one or more components of the system 100 described above with respect to FIG. 1. For example, the method 1300 and related methods can be executed by a client of FIG. 1.

At 1302, the player identifies a secret input value $x_i$. The secret input value can be a value that is to be used in computation(s) with other secret input values provided by other players. At 1304, the player encrypts the secret input value. The player can encrypt the secret input value using a first cryptosystem. At 1306, the player sends the encrypted secret input value to a service provider. Steps 1302, 1304, and 1306 correspond to the input step 1110 of the protocol 1102 described above with respect to FIG. 11.

At 1308, the player generates a random value. At 1310, the player encrypts the random value. At 1312, the player sends the encrypted random value to the service provider. Steps 1308, 1310, and 1312 correspond to the input step 1112 of the protocol 1102.

At 1314, the client receives, from the service provider, the list of encrypted blinded secret input values. Step 1314 corresponds to the shuffling step 1114 of the protocol 1102.

At 1316, the client receives a randomly-permuted list of encrypted random values from the service provider. Step 1316 corresponds to the shuffling step 1116 of the protocol 1102.

At 1318, the client decrypts each encrypted random value in the randomly-permuted list of encrypted random values to generate a list of random values. At 1320, the client obtains a random permutation that is based on the list of random values, such as from a PRPG. A same random permutation is obtained by each client. At 1322, the client randomly-permutes, using the obtained permutation, the rerandomized list of encrypted blinded secret input values to generate a client-specific list of randomly-permuted rerandomized encrypted blinded secret input values. At 1324, the client sends the client-specific list of randomly-permuted rerandomized encrypted blinded secret input values to the service provider. Steps 1318, 1320, 1322, and 1324 correspond to the shuffling step 1118 of the protocol 1102.

The client can optionally participate in a verification portion 1350, as shown in FIG. 13B. At 1352, the player receives an encrypted blinded difference from the service provider. At 1354, the player decrypts the encrypted blinded difference to generate a blinded difference. At 1356, the player sends the blinded difference to the service provider. Steps 1352, 1354, and 1356 correspond to the verification step 1124 of the protocol 1102. Remaining verification step(s) can be performed by the service provider.

Figure 14A:
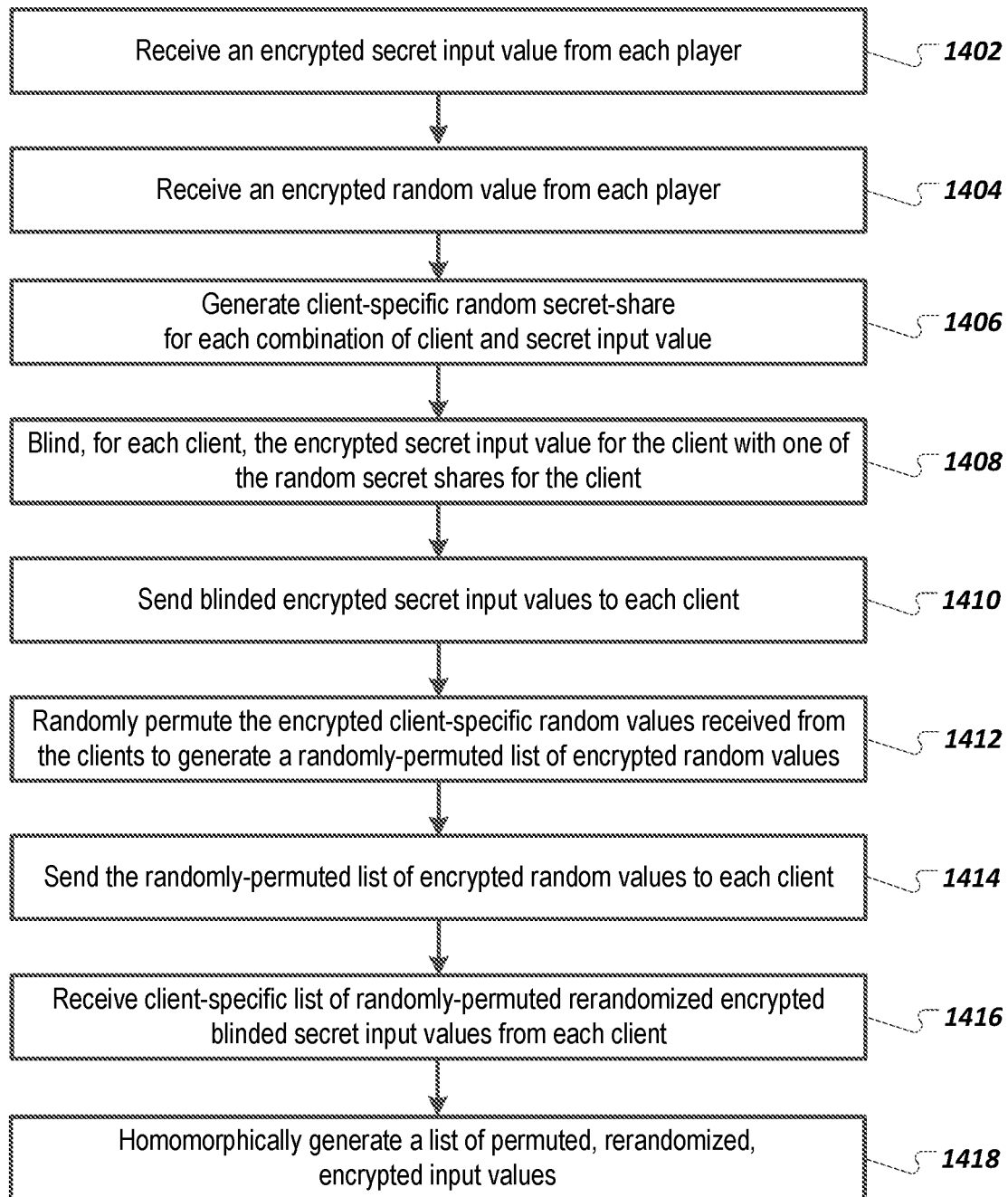
FIG. 14A-B illustrate a flowchart of a service provider method for a verifiable secret shuffle protocol for encrypted data based on homomorphic encryption and secret sharing.
Figure 14B:
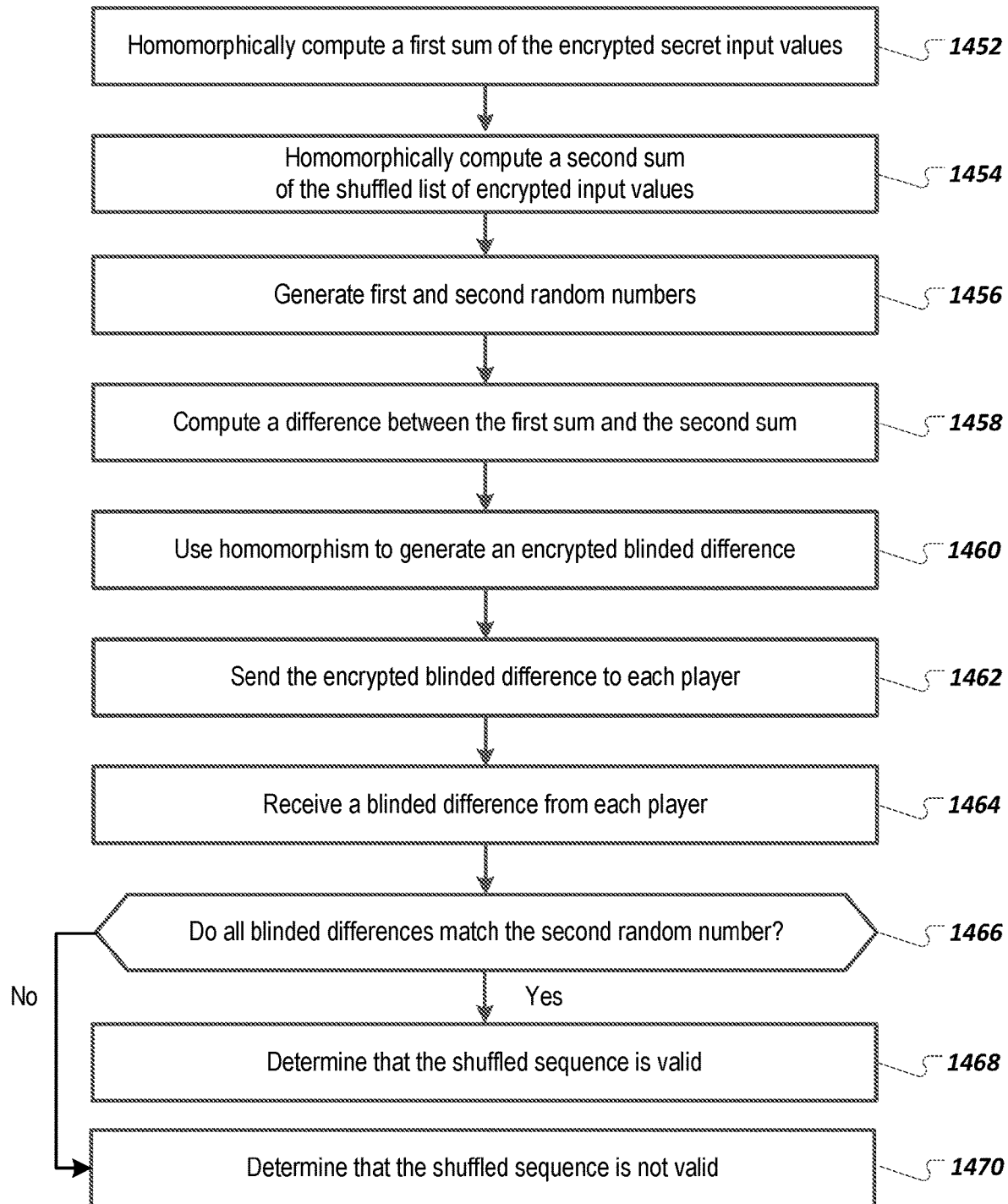

FIGS. 14A-B illustrate a flowchart of a service provider method 1400 for a verifiable secret shuffle protocol for encrypted data based on homomorphic encryption and secret sharing. It will be understood that the method 1400 and related methods may be performed, for example, by any suitable system, environment, software, and hardware, or a combination of systems, environments, software, and hardware, as appropriate. For example, one or more of a client, a server, or other computing device can be used to execute method 1400 and related methods and obtain any data from the memory of a client, the server, or the other computing device. In some implementations, the method 1400 and related methods are executed by one or more components of the system 100 described above with respect to FIG. 1. For example, the method 1400 and related methods can be executed by the server 102 of FIG. 1.

At 1402, the service provider receives an encrypted secret input value from each player. Step 1402 corresponds to the input step 1110 of the protocol 1102 described above with respect to FIG. 11.

At 1404, the service provider receives an encrypted random value from each player. Step 1404 corresponds to the input step 1112 of the protocol 1102.

At 1406, the service provider generates a client-specific random secret-share for each combination of client and secret input value, i.e., $n^2$ secret-shares. At 1408, for each client, the service provider blinds each encrypted secret input value for the client with one of the random secret-shares for the client. The client-specific random secret-shares for one secret input value can add up to zero, for example. At 1410, the service provider sends a list of encrypted blinded secret input values to each client. Steps 1406, 1408, and 1410 correspond to the shuffling step 1114 of the protocol 1102.

At 1412, the service provider randomly permutes the encrypted client-specific random values received from the clients to generate a randomly-permuted list of encrypted random values. At 141, the service provider sends the randomly-permuted list of encrypted random values to each client. Steps 1412 and 1414 correspond to the shuffling step 1116 of the protocol 1102.

At 1416, the service provider receives a client-specific list of randomly-permuted rerandomized encrypted blinded secret input values from each client. Step 1416 corresponds to the shuffling step 1118 of the protocol 1102.

At 1418, the service provider homomorphically adds, for each position of multiple list positions in the lists of randomly-permuted rerandomized encrypted blinded secret input values, position-specific encrypted blinded secret values at the position, to generate, by homomorphically removing the random secret-shares, and by homomorphically dividing the resulting encrypted sum by the number of clients, an encrypted secret input value corresponding to the position. This involves homomorphic division by n for each position. Resulting encrypted secret input values at all positions are rerandomized and in a sequence that is unmapped to an order of receipt by the service provider of the encrypted secret input values. Step 1418 corresponds to the shuffling step 1120 of the protocol 1102.

The server can optionally participate in a verification portion 1450, as shown in FIG. 14B. At 1452, the service provider homomorphically computes a first sum of the encrypted secret input values. At 1454, the service provider homomorphically computes a second sum of the shuffled list of encrypted input values. At 1456, the service provider generates first and second random numbers. At 1458, the service provider computes a difference between the first sum and the second sum. At 1460, the service provider uses homomorphism to generate an encrypted blinded difference. For instance, the service provider can homomorphically blind the difference multiplicatively with the first random number using exponentiation and additively with the second random number using multiplication, to generate the encrypted blinded difference. At 1462, the service provider sends the encrypted blinded difference to each player.

At 1464, the service provider receives a blinded difference form each player. Step 1464 corresponds to the verification step 1124 of the protocol 1102.

At 1466, the service provider determines whether all received blinded differences match the second random number. At 1468, in response to determining that all of the received blinded differences match the second random number, the service provider determines that the shuffled sequence is valid. At 1470, in response to determining that not all of the received blinded differences match the second random number, the service provider determines that the shuffled sequence is invalid.

FIG. 15A is a table 1500 that provides information describing a communication-efficient secret shuffle protocol 1502 based on homomorphic encryption. For instance, the protocol 1502 can be the protocol 206 introduced above with respect to FIG. 2. The protocol 1502 uses homomorphic encryption 1504, among other technologies. Inputs 1506 are provided by clients. Clients can be referred to as players, that communicate with a service provider. Communication complexity 1508 between participants is of an order $O(n^2)$. Computation complexity 1510 for clients is of an order $O(n)$, as is computation complexity 1512 for the service provider. The protocol 1502 can be completed in ten steps in two rounds 1514. While some protocols (e.g., the protocol 204) can provide verifiability of results, in some implementations, the protocol 1502 does not provide verifiability of results 1516. The protocol 1502 can be used when participants want to shuffle inputs with the help of a (potentially and relatively) computationally-weak central service provider but using a strong network (e.g., an on-premise network). The protocol 1502 can be particularly tailored for scenarios with a computationally limited service provider, computationally limited players, and potentially (but not necessarily) large network capacity/bandwidth.

The protocol 1502 can use two cryptosystems 1518. For example, a first cryptosystem $CS_1$ 1520 can include a first key generation algorithm $G_1$ 1522, a first encryption function $E_1$ 1524, and a first decryption function $D_1$ 1526. Similarly, a second cryptosystem $CS_2$ 1528 can include a second key generation algorithm $G_2$ 1530, a second encryption function $E_2$ 1532, and a second decryption function $D_2$ 1534. The first key generation algorithm 1522 can, using a first security parameter $\kappa_1$ 1536 generate a first public key $pk_1$ 1538 and a first secret key $sk_1$ 1540. Similarly, the second key generation algorithm 1530 can, using a second security parameter $\kappa_2$ 1542, generate a second public key $pk_2$ 1544 and a second secret key $sk_2$ 1546. As indicated by a condition 1548, a plaintext space $M_2$ of the second cryptosystem $CS_2$ 1528 can be configured to be a subset of a plaintext space $M_1$ of the first cryptosystem $CS_1$ 1520, (e.g., $M_2 \subseteq M_1$). The condition 1548 can mean that any message that can be encrypted with the second public key $pk_2$ 1544 can also be encrypted with the first public key $pk_1$ 1538.

The protocol 1502 can use n+1 participants 1550, including n players $P_1, \ldots, P_n$ 1552 and a service provider $P_S$ 1554. As indicated by a note 1556, the public key $pk_1$ 1538 is known to the service provider $P_S$ 1554 and the players $P_i$ 1552. A note 1558 indicates that the secret key $sk_1$ 1540 is known only to the players $P_i$ 1552. As indicated by a note 1560, the public key $pk_2$ 1544 is known to the service provider $P_S$ 1554 and the players $P_i$ 1552. A note 1562 indicates that the secret key $sk_2$ 1546 is only known to the service provider $P_S$ 1554.

The protocol 1502 can use random permutations $\pi_1$ 1564 and $\pi_2$ 1566 that are chosen by and known to the service provider $P_S$ 1554. The protocol 1502 can use a cryptographic hash function h 1568. The hashes of the cryptographic hash function h 1568 can be uniformly distributed among a domain dom(h(•)). The protocol 1502 can also use a sort function 1570 that sorts a sequence and a position function 1572 that outputs a position of an item in a sequence.

FIG. 15B illustrates a communication scenario 1580 for the protocol 1502. The communication scenario 1580 can use n players $P_i$. For example, a first player $P_1$ 1582, a second player $P_2$ 1584, a third player $P_3$ 1586, and a fourth player $P_4$ 1588 are illustrated. Other counts of players can be used. Each player $P_i$ can be configured to communicate with a single, central service provider $P_S$ 1590. For example, the communication scenario 1580 can include pairwise secure, (e.g., secret and authentic) channels between the players $P_i$ and the service provider $P_S$ 1590, for example as established using TLS. For instance, communication links 1592, 1594, 1596, and 1598 between respective players and the service provider $P_S$ 1590 are shown.

FIG. 16 illustrates a protocol specification 1600 for a communication-efficient secret shuffle protocol 1602 for encrypted data based on homomorphic encryption. The protocol 1602 includes two rounds—an input round 1604 and a shuffling round 1606. The input round 1604 includes two input steps 1608 and 1610. The shuffling round 1606 includes ten shuffling steps 1612, 1614, 1616, 1618, 1620, 1622, 1624, 1626, 1628, and 1630. The steps of the protocol 1602 are described in detail below with respect to FIGS. 17, 18, and 19.

FIG. 17 illustrates a swim lane diagram for a communication-efficient secret shuffle protocol 1700 for encrypted data based on homomorphic encryption. It will be understood that the protocol 1700 and related methods may be performed, for example, by any suitable system, environment, software, and hardware, or a combination of systems, environments, software, and hardware, as appropriate. For example, one or more of a client, a server, or other computing device can be used to execute the protocol 1700 and related methods and obtain any data from the memory of a client, the server, or the other computing device. In some implementations, the protocol 1700 and related methods are executed by the server 102 and one or more other components of the system 100 described above with respect to FIG. 1.

Corresponding to the input step 1608 of the protocol 1602 described above with respect to FIG. 16, each player $P_i$ encrypts its secret input value $x_i$ and sends the encrypted secret input value to a service provider 1702. For example, a first player 1704 can send a first encrypted secret input value 1706 to the service provider 1702 and a second player 1708 can send a second encrypted secret input value 1710 to the service provider 1702. The players can encrypt secret input values using a first cryptosystem. The sending of the encrypted input values can be denoted by: $P_i \to P_S$: $E(x_i)$.

Corresponding to the input step 1610 of the protocol 1602, each player $P_i$ generates a random value $r_{1_i}$, encrypts it, and sends the encrypted random value (e.g., at 1712 and 1714, respectively) to the service provider 1702. The sending of the encrypted random values can be denoted by: $P_i \to P_S$: $E(r_{1_i})$. The players can encrypt the random values using the first cryptosystem.

Corresponding to the shuffle step 1612 of the protocol 1602, the service provider 1702 sends a randomly-permuted list of encrypted random values to the players (e.g., at 1716 and 1718, respectively). The randomly-permuted list of encrypted random values can be randomly permuted with a random permutation $\pi_1$. Random permutation can prevent players from learning which random value was provided by which player. The sending of the randomly-permuted list of encrypted random values to the players can be denoted by:

$$P_S \to P_i : R'_1 = (\ldots, E_1(r'_{1_i}) = E_1(r_{1_{\pi_1(i)}}), \ldots).$$

Corresponding to the shuffle step 1614 of the protocol 1602, the service provider 1702 sends a randomly-permuted list of blinded encrypted input values to each player (e.g., at 1720 and 1722). The randomly-permuted list of encrypted input values can be randomly permuted using a permutation $\pi_2$ before being sent to the players. To prevent the players from learning the secret inputs, each plaintext $x_{\pi_2(i)}$ can be blinded by a random value $r_{2_i} \in M_1$, chosen individually and at random for each player $P_i$ by the service provider 1702. The sending of the list of randomly-permuted blinded encrypted input values can be denoted by: $P_S \to P_i$: $X'=(\ldots, E_1(x_i'+r_{2_i})=E_1(x_{\pi_2(i)})+r_{2_i})=E_1(x_{\pi_2(i)}) \cdot E_1(r_{2_i}), \ldots)$. The service provider can blind values by multiplying an encryption of a secret input value with an encryption of a random number, both using the first cryptosystem.

Corresponding to the shuffle step 1616 of the protocol 1602, the service provider 1702 sends a list of encrypted first blinding values, to the players (e.g., at 1724 and 1726, respectively). For example, random values previously used for blinding can be encrypted with a second cryptosystem $CS_2$ that is different from the first cryptosystem. The sending of the list of encrypted first blinding values can be denoted by: $P_S \to P_i$: $R_2=(\ldots, E_2(r_{2_i}), \ldots)$.

Corresponding to the shuffle step 1618 of the protocol 1602, the service provider 1702 chooses service provider random value (e.g., a long random value $r_{1_S} \in M_1$), and sends the service provider random value to the players (e.g., at 1728 and 1730, respectively). $M_1$ is a plaintext space of the first cryptosystem. The sending of the service provider random values can be denoted by: $P_S \to P_i$: $r_{1_S}$.

Corresponding to the shuffling step 1620 of the protocol 1602, the players create hashes (e.g., at 1732 and 1734, respectively) using player random values and the service provider random value from the service provider 1702. For example, each player can concatenate each random value plaintext $r_{1_j}'$ with the service provider random value received from the service provider 1702 and compute a hash of each concatenation (e.g., resulting in each of the n players creating n hashes $h_j$, which can be denoted by: $P_i$: $H=(\ldots, h_j=h(r_{1_j}'\|r_{1_S}), \ldots)$. Using $r_{1_S}$ as a seed of the hash function h can prevent any player $P_i$ from selecting a specific $r_{1_i}'$ to obtain a desired hash $h_i$. In some implementations, before creating the n hashes, each player $P_i$ compares the random values $r_{1_j}'$ and may abort the protocol if the random values are not unique.

Corresponding to the shuffling step 1622 of the protocol 1602, each player determines a random index (e.g., at 1736 and 1738, respectively). For example, each player $P_i$ can sort the list of hashes it generated. A position $\rho_i$ can be determined in the sorted list of hashes, for a hash $h_i=h(r_i'\|r_{P_S})$ that corresponds to the player $P_i$'s random value $r_{1_i}$. The position $\rho_i$ can be referred to as the random index of $P_i$. Hence, each player computes an individual, random index $\rho_i$ that is unknown to $P_S$ and not related to the rank of its input $x_i$.

Corresponding to the shuffling step 1624 of the protocol 1602, each player identifies a randomly-selected encrypted blinded input in the randomly-permuted list of encrypted blinded client-specific input values based on the client-specific random index. The player can rerandomize the randomly-selected encrypted blinded input by multiplication with an encrypted zero. The player can then send a client-specific rerandomized randomly-selected encrypted blinded input to the service provider 1702 (e.g., at 1740 and 1742, respectively). The generation and the sending of the client-specific rerandomized randomly-selected encrypted blinded inputs to the service provider can be denoted by:

$$P_i \to P_S : E'_1(x'_{\rho_i} + r_{2_{\rho_i}}) = E_1(x'_{\rho_i} + r_{2_{\rho_i}} + 0) = E_1(x'_{\rho_i} + r_{2_{\rho_i}}) \cdot E_1(0).$$

Corresponding to the shuffling step 1626 of the protocol 1602, each player generates a client-specific encrypted and blinded first blinding value and sends the client-specific encrypted and blinded first blinding value to the service provider 1702. The generation and sending of the client-specific encrypted and blinded first blinding value can be denoted by:

$$P_i \to P_S : E_2(r_{2_{\rho_i}} + r_{3_i}) = E_2(r_{2_{\rho_i}}) \cdot E_2(r_{3_i}).$$

Corresponding to the shuffling step 1628 of the protocol 1602, each player encrypts the client-specific second blinding value and sends a client-specific encrypted second blinding value to the service provider 1702 (e.g., at 1748 and 1750, respectively). The sending of the client-specific encrypted second blinding values can be denoted by: $P_i \to P_S$: $E_1(r_{3_i})$.

Corresponding to the shuffling step 1630 of the protocol 1602, the service provider, at 1752, generates rerandomized encrypted secret input values based on the inputs received in the shuffling steps 1622, 1624, and 1626. The generation of the rerandomized encrypted secret input values can be denoted by:

$$P_S : X = (\ldots,$$
$$E_1'(x_{\rho_i}') = E_1'(x_{\rho_i}' + r_{2_{\rho_i}}) \cdot E_1((-1) \cdot D_2(E_2(r_{2_{\rho_i}} + r_{3_i}))) \cdot E_1(r_{3_i}), \ldots).$$

In further detail, the service provider 1702 can, for each player, decrypt the encrypted and blinded first blinding value $$E_2(r_{2_{\rho_i}} + r_{3_i})$$

received, e.g., at 1744 or 1746. The service provider 1702 can multiply the plaintext resulting from the decryption with −1, and encrypt the product under the first cryptosystem $CS_1$. The resulting ciphertext can be multiplied with the rerandomized encrypted blinded input $$E_1'(x_{\rho_i}' + r_{2_{\rho_i}})$$

(e.g., received at either 1740 or 1742) and with the encrypted second blinding value $E_1(r_{3_j})$ (e.g., received at either 1748 or 1750). Consequently, the random values $$r_{2_{\rho_i}},$$

and $r_{3_i}$ can be eliminated, resulting in rerandomized ciphertexts $x_i = E_1'(x_{\rho_i}')$. The order of the shuffled ciphertexts $x_i$ depends on the input order of the inputs received by the service provider in the shuffling steps 1622, 1624, and 1626, e.g., as received over network(s). In summary, in execution of the protocol 1602, every player $P_i$ sends some $P_j$'s rerandomized, encrypted input, chosen based on the player $P_i$'s random index. The service provider 1702 cannot map between the original input order and the order of the output sequence X. Therefore, $P_S$'s output is a shuffled list. The players do not get an output.

Figure 18B:
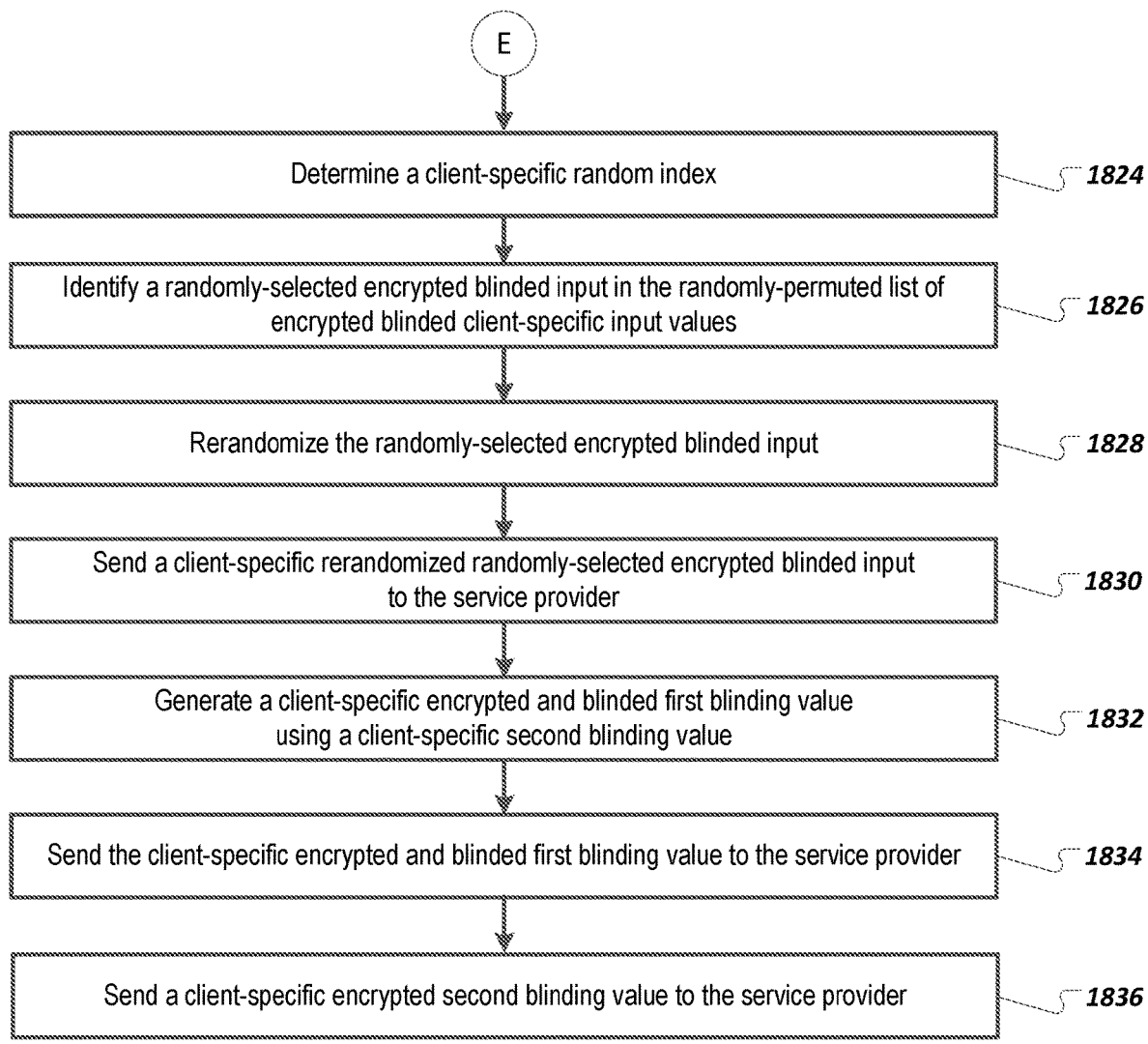

FIGS. 18A and 18B illustrate a flowchart of a participant method 1800 for a communication-efficient secret shuffle protocol for encrypted data based on homomorphic encryption. It will be understood that the method 1800 and related methods may be performed, for example, by any suitable system, environment, software, and hardware, or a combination of systems, environments, software, and hardware, as appropriate. For example, one or more of a client, a server, or other computing device can be used to execute method 1800 and related methods and obtain any data from the memory of a client, the server, or the other computing device. In some implementations, the method 1800 and related methods are executed by one or more components of the system 100 described above with respect to FIG. 1. For example, the method 1800 and related methods can be executed by a client of FIG. 1.

At 1802, the player identifies a secret input value $x_i$. The secret input value can be a value that is to be used in computation(s) with other secret input values provided by other players. At 1804, the player encrypts the secret input value. The player can encrypt the secret input value using a first cryptosystem. At 1806, the player sends the encrypted secret input value to a service provider. Steps 1802, 1804, and 1806 correspond to the input step 1608 of the protocol 1602 described above with respect to FIG. 16.

At 1808, the player generates a client-specific random value. At 1810, the player encrypts the client-specific random value. The player can encrypt the client-specific random value using the first cryptosystem. At 1812, the player sends the client-specific encrypted random value to the service provider. Steps 1808, 1810, and 1812 correspond to the input step 1610 of the protocol 1602.

At 1814, the player receives, from the service provider, a randomly-permuted list of encrypted client-specific random values. The randomly-permuted list of encrypted client-specific random values can be randomly permuted by the service provider before being received by the player. The step 1814 corresponds to the shuffle step 1612 of the protocol 1602.

At 1816, the player receives a randomly-permuted list of blinded encrypted input values from the service provider. The blinded encrypted input values can include encrypted input values blinded by random values selected by the service provider, before being received by the player. The blinded random values can be encrypted by the service provider using the first cryptosystem. The step 1816 corresponds to the shuffle step 1614 of the protocol 1602.

At 1818, the player receives, from the service provider, a list of encrypted first blinding values. The step 1818 corresponds to the shuffle step 1616 of the protocol 1602.

At 1820, the player receives a service provider random value from the service provider. The step 1820 corresponds to the shuffle step 1618 of the protocol 1602.

At 1822, the player creates a list of client-specific hashed values using each of the client-specific random values and the service provider random value. For example, the player can concatenate each random value plaintext $r_{1_1}$ received from another player (and the player's own random value) with the service provider random value received from the service provider and compute a hash of each concatenation (e.g., resulting in creation of n hashes $h_j$, which can be denoted as $P_i$: H=(…, $h_j$=h($r_{1_j} \| r_{1_S}$), …). Using $r_{1_S}$ as a seed of the hash function h can prevent other players from selecting a specific $r_{1_j}$ to obtain a desired hash $h_j$. In some implementations, before creating the n hashes, the player compares the client-specific random value and the client-specific random values $r_{1_j}$ received from the other players and aborts the protocol if the random values are not unique. Step 1822 corresponds to the shuffling step 1620 of the protocol 1602.

At 1824, the player determines a client-specific random player index. For example, the player can sort the list of hashes it generated, and a position $\rho_i$ can be determined in the sorted list of hashes, for a hash $h_i$=h($r_i \| r_{P_S}$) that corresponds to the player's client-specific random value $r_{1_i}$. The position $\rho_i$ can be referred to as the client-specific random index of the player. Notably, the player computes an individual, random index $\rho_i$ that is unknown to the service provider and is not related to the rank of the player's secret input value. The client-specific random index $\rho_i$ for a player can be a value between 1 and n, assuming n players. The step 1824 corresponds to the shuffling step 1622 of the protocol 1602.

At 1826, the player identifies a randomly-selected encrypted blinded input in the randomly-permuted list of encrypted blinded client-specific input values based on the client-specific random index. At 1828, the player rerandomize the randomly-selected encrypted blinded input (e.g., by multiplication with an encrypted zero). At 1830, the player sends a client-specific rerandomized randomly-selected encrypted blinded input to the service provider. Steps 1826, 1828, and 1830 correspond to the shuffling step 1624 of the protocol 1602.

At 1832, the player generates a client-specific encrypted and blinded first blinding value. The client-specific encrypted and blinded first blinding value can be blinded by a client-specific second blinding value (e.g., a random number). At 1834, the player sends the client-specific encrypted and blinded first blinding value to the service provider. Steps 1832 and 1834 correspond to the shuffling step 1626 of the protocol 1602.

At 1836, the player sends the client-specific encrypted second blinding value to the service provider. Step 1836 corresponds to the shuffling step 1628 of the protocol 1602. Remaining portions of the protocol 1602 are performed by the service provider.

Figure 19A:
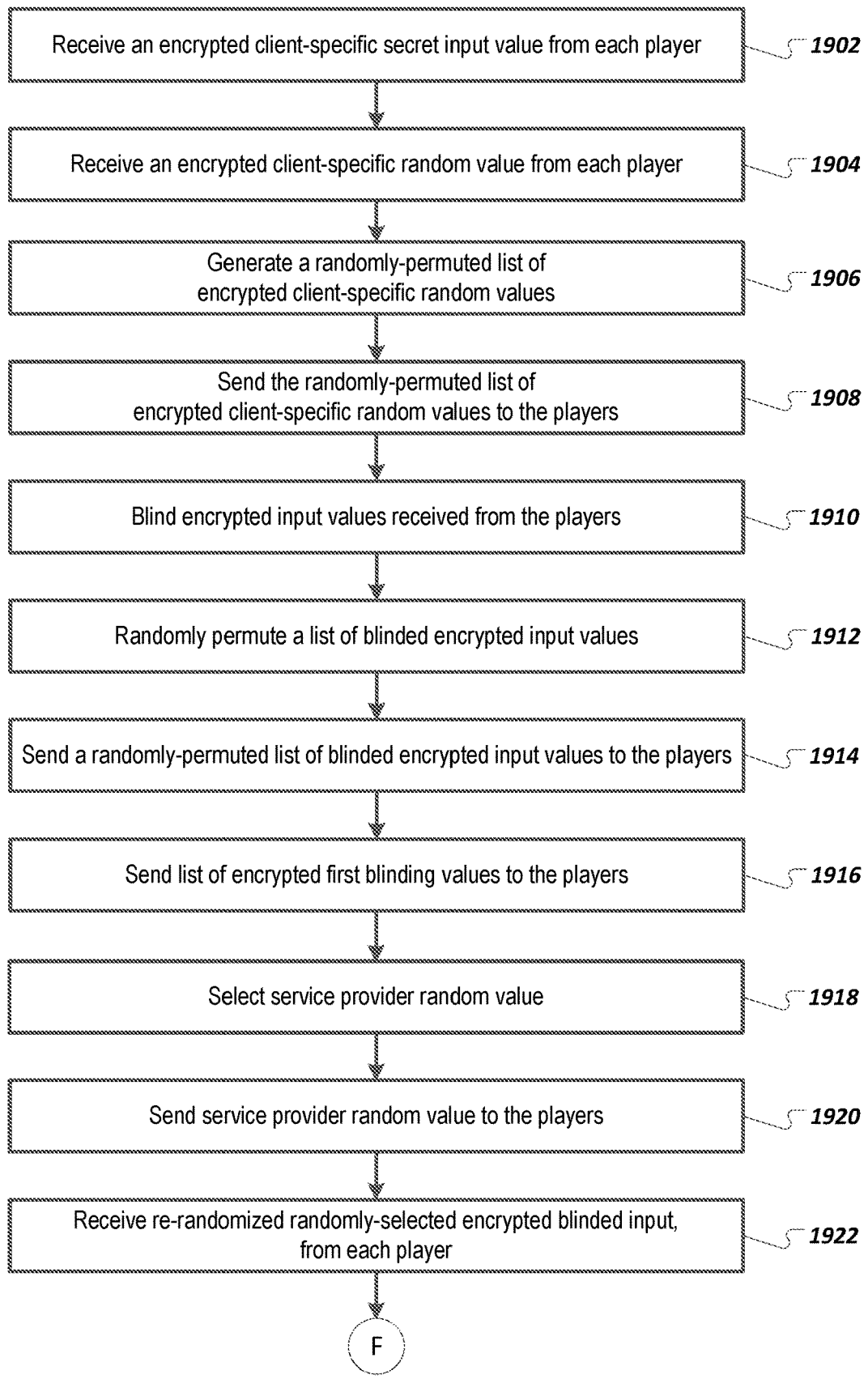
FIGS. 19A-B illustrate a flowchart of a service provider method for a communication-efficient secret shuffle protocol for encrypted data based on homomorphic encryption.
Figure 19B:
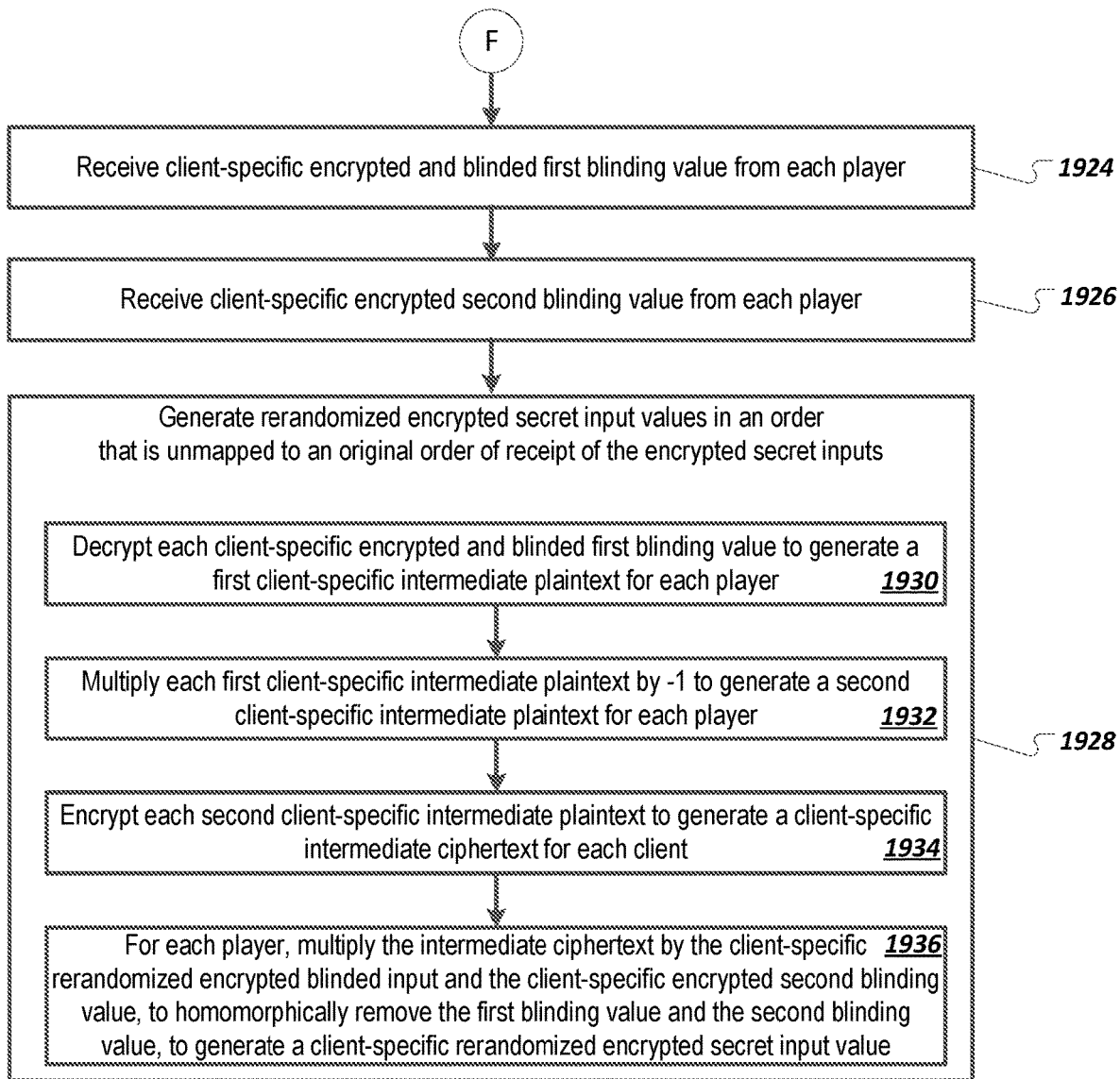

FIGS. 19A and 19B illustrate a flowchart of a service provider method 1900 for a communication-efficient secret shuffle protocol for encrypted data based on homomorphic encryption. It will be understood that the method 1900 and related methods may be performed, for example, by any suitable system, environment, software, and hardware, or a combination of systems, environments, software, and hardware, as appropriate. For example, one or more of a client, a server, or other computing device can be used to execute method 1900 and related methods and obtain any data from the memory of a client, the server, or the other computing device. In some implementations, the method 1900 and related methods are executed by one or more components of the system 100 described above with respect to FIG. 1. For example, the method 1900 and related methods can be executed by the server 102 of FIG. 1.

At 1902, the service provider receives an encrypted client-specific secret input value from each player. Step 1902 corresponds to the input step 1608 of the protocol 1602 described above with respect to FIG. 16.

At 1904, the service provider receives a client-specific encrypted random value from each player. Step 1904 corresponds to the input step 1610 of the protocol 1602.

At 1906, the service provider randomly permutes the encrypted client-specific random values received from the players. The service provider can randomly permute the encrypted client-specific random values using a first random permutation. At 1908, the service provider sends a randomly-permuted list of encrypted client-specific random values to each player. The steps 1906 and 1908 correspond to the shuffle step 1612 of the protocol 1602.

At 1910, the service provider blinds each encrypted input value received from a player. The service provider can blind each encrypted input value with a random value chosen individually for each player. At 1912, the service provider randomly permutes a list of the blinded encrypted input values (e.g., using a second random permutation). At 1914, the service provider sends a randomly-permuted list of blinded encrypted input values to each of the players. Steps 1910, 1912, and 1914 correspond to the shuffle step 1614 of the protocol 1602.

At 1916, the service provider sends a list of encrypted first blinding values to each of the players. The random values previously used for blinding can be encrypted using a second cryptosystem. The step 1916 corresponds to the shuffle step 1616 of the protocol 1602.

At 1918, the service provider selects a service provider random value. The service provider random value can be in a plaintext space of the first cryptosystem. At 1920, the service provider sends the selected long random value to each of the players. The steps 1918 and 1920 correspond to the shuffle step 1618 of the protocol 1602.

At 1922, the service provider receives a re-randomized randomly-selected encrypted blinded input from each player. A randomly-selected encrypted blinded input is selected by the client based on a client-specific random index, and the client-specific random index is based on client-specific random values and the server provider random value.

At 1924, the service provider receives a client-specific encrypted and blinded first blinding value from each player. The client-specific encrypted and blinded first blinding value can encrypt a blinded first blinding value that is blinded by a client-specific second blinding value. Step 924 corresponds to the shuffling step 1622 of the protocol 1602.

At 1926, the service provider receives an encrypted second blinding value from each player. Second blinding values are used by the players to blind the first blinding values. Step 1926 corresponds to the shuffling step 1624 of the protocol 1602.

At 1928, and corresponding to the shuffling step 1626 of the protocol 1602, the service provider generates rerandomized encrypted secret input values in an order that is unmapped to an original order of receipt of the encrypted secret inputs. Accordingly, the service provider has a shuffled list of original inputs that differs from the original inputs in that ciphertexts have both been reordered and rerandomized (although encrypting same plaintexts).

In further detail, at 1930, the service provider decrypts each client-specific encrypted and blinded first blinding value to generate a first client-specific intermediate plaintext for each client. At 1932, the service provider multiplies each first client-specific intermediate plaintext by negative one to generate a second client-specific intermediate plaintext for each client. At 1934, the service provider encrypts each second client-specific intermediate plaintext to generate an intermediate ciphertext for each client. At 1936, the service provider multiplies, for each client, the intermediate ciphertext by the client-specific rerandomized encrypted blinded input and the client-specific encrypted second blinding value, to homomorphically remove the first blinding value and the second blinding value, to generate a client-specific rerandomized encrypted secret input value. The client-specific rerandomized encrypted secret input values are generated in an order that is unmapped to an order of receipt, at the service provider, of the original encrypted secret input values.

FIG. 20A is a table 2000 that provides information describing an efficient distributed secret shuffle protocol 2002 for encrypted database entries using dependent shufflers. For instance, the protocol 2002 can be the protocol 208 introduced above with respect to FIG. 2. The protocol 2002 can be used when a data owner wants to shuffle data with the help of data providers. Data providers can be assumed to have an intrinsic interest in the protocol. The protocol 2002 utilizes multiple shuffling parties who are a subset of clients who originally provided the database entries and are therefore able to decrypt the database entries. The protocol can have additional security requirements from other protocols due to shufflers shuffling data from other data providers. The protocol 2002 can be particularly tailored for scenarios with limited network capacity, a computationally limited service provider, and computationally limited shuffling parties who are able to decrypt the database entries (e.g., since the shuffling parties have possession of a corresponding secret key).

The protocol 2002 uses homomorphic encryption 2004, among other technologies. Inputs 2006 are provided by clients. Clients can be referred to as players, that communicate with a service provider. Communication complexity 2008 between participants is of an order O(n). Computation complexity 2010 for clients is of an order O(n), as is computation complexity 2012 for the service provider. The protocol 2002 can be completed in twelve steps in two rounds 2014. While some protocols (e.g., the protocol 204) provides verifiability of results, in some implementations, the protocol 2002 does not provide verifiability 2016. A database of the service provider can include n encrypted database entries 2017 provided by n players $P_1, \ldots, P_n$.

The protocol 2002 can use two cryptosystems 2018. For example, a first cryptosystem $CS_1$ 2020 can include a first key generation algorithm $G_1$ 2022, a first encryption function $E_1$ 2024, and a first decryption function $D_1$ 2026. Similarly, a second cryptosystem $CS_2$ 2028 can include a second key generation algorithm $G_2$ 2030, a second encryption function $E_2$ 2032, and a second decryption function $D_2$ 2034. The first key generation algorithm 2022 can, using a first security parameter $x_1$ 2036 generate a first public key $pk_1$ 2038 and a first secret key $sk_1$ 2040. Similarly, the second key generation algorithm 2030 can, using a second security parameter $\kappa_2$ 2042, generate a second public key $pk_2$ 2044 and a second secret key $sk_2$ 2046. As indicated by a condition 2048, a plaintext space $M_2$ of the second cryptosystem $CS_2$ 2028 can be configured to be a subset of a plaintext space $M_1$ of the first cryptosystem $CS_1$ 2020, (e.g., $M_2 \subset M_1$). The condition 2048 can mean that any message that can be encrypted with the second public key $pk_2$ 2044 can also be encrypted with the first public key $pk_1$ 2038.

The protocol 2002 can use m+1 participants 2050, including m shufflers $S_1, \ldots, S_m$ 2052 and a service provider $P_S$ 2054. The m shufflers can be a subset of the n players (e.g., $m \subset n$). In some implementations, n is divisible by m (e.g., m|n).

As indicated by a note 2056, the public key $pk_1$ 2038 is known to the service provider $P_S$ 2054 and the shufflers $S_k$ 2052. A note 2058 indicates that the secret key $sk_1$ 2040 is known only to the shufflers $S_k$ 2052. As indicated by a note 2060, the public key $pk_2$ 2044 is known to the service provider $P_S$ 2054 and the shufflers $S_k$ 2052. A note 2062 indicates that the secret key $sk_2$ 2046 is only known to the service provider $P_S$ 2054.

The protocol 2002 can use random permutations $\pi_1$ 2064 and $\pi_2$ 2066 that are chosen by and only known to the service provider $P_S$ 2054. The protocol 2002 can use a random permutation $\pi_{3_k}$ 2067 for each shuffler $S_k$ that is respectively chosen by and only known to each $S_k$. The protocol 2002 can use a cryptographic hash function h 2068. The hashes of the cryptographic hash function h 2068 can be uniformly distributed among a domain dom(h(•)). The protocol 2002 can also use a sort function 2070 that sorts a sequence and a position function 2072 that outputs a position of an item in a sequence.

FIG. 20B illustrates a communication scenario 2080 for the protocol 2000. A service provider 2082 can access a database 2084 that includes n encrypted entries provided by n players. Each shuffler $S_k$ in a set of m shufflers can communicate with the central service provider $P_S$ 2082. For example, a first shuffler $S_1$ 2086, a second shuffler $S_2$ 2087, a third shuffler $S_3$ 2088, and a fourth shuffler $S_4$ 2089 can communicate with the service provider $P_S$ 2082 over communication links 2092, 2093, 2094, and 2095, respectively. Although four shufflers are shown, various numbers of shufflers can be used. The communication links 2092, 2093, 2094, and 2095 can provide secure (e.g., secret and authentic) channels between shufflers and the service provider $P_S$ 2082, for instance as established using TLS.

FIG. 21 illustrates a protocol specification 2100 for an efficient, distributed, secret-shuffle protocol 2102 for encrypted database entries using dependent shufflers. The protocol 2102 includes two rounds—a random value submission round 2104 and a shuffling round 2106. The random value submission round 2104 includes two input steps 2108 and 2110. The shuffling round 2106 includes ten shuffling steps 2112, 2114, 2116, 2118, 2120, 2122, 2124, 2126, 2128, and 2130. The steps of the protocol 2102 are described in detail below with respect to FIGS. 22, 23, and 24.

FIG. 22 illustrates a swim lane diagram for an efficient distributed secret shuffle protocol 2200 for encrypted database entries using dependent shufflers. It will be understood that the protocol 2200 and related methods may be performed, for example, by any suitable system, environment, software, and hardware, or a combination of systems, environments, software, and hardware, as appropriate. For example, one or more of a client, a server, or other computing device can be used to execute the protocol 2200 and related methods and obtain any data from the memory of a client, the server, or the other computing device. In some implementations, the protocol 2200 and related methods are executed by the server 102 and one or more other components of the system 100 described above with respect to FIG. 1.

Corresponding to the submission of random values step 2108 of the protocol 2102 described above with respect to FIG. 21, a service provider 2202 sends a count of ciphertexts that are to be shuffled to each shuffler. For example, the service provider 2202 can send, at 2204 and 2206, a ciphertext count to a shuffler 2208 and a shuffler 2210, respectively. Additionally, the service provider 2202 can send (e.g., at 2212 and 2214) a count of shufflers to each shuffler. The sending of the ciphertext and shuffler counts can be denoted by: $P_S \rightarrow S_k$: n, m.

Corresponding to the random value submission step 2110 of the protocol 2102, each shuffler $S_k$ generates $$\frac{n}{m}$$

random values $$r_{1_1}, \ldots, r_{1_{\frac{n}{m}}},$$

encrypts the generated random values, and sends the encrypted random values (e.g., at 2216 and 2218, respectively) to the service provider 2202. The service provider 2202 can receive n encrypted random values and can refer to the received random values as $E_1(r_{1_1}), \ldots, E_1(r_{1_n})$. The sending of the encrypted random values can be denoted by:

$$S_k \rightarrow P_S : \left( E_1(r_{1_1}), \ldots, E_1\left(r_{1_{\frac{n}{m}}}\right) \right).$$

Shufflers can encrypt the random values using a first cryptosystem.

Corresponding to the shuffling step 2112 of the protocol 2102, the service provider 2202 sends a randomly-permuted list of encrypted random values $E_1(r_{1_j})$ to each shuffler (e.g., at 2220 and 2222). Permutation using a random permutation $\pi_1$ can prevent a given shuffler from learning which encrypted random value was provided by which shuffler. The sending of the randomly-permuted list of encrypted random values can be denoted by:

$$P_S \to S\_k: R_1' = \left( \ldots, E_1(r_{1_{\pi_1(i)}}), \ldots \right) = \pi_1 \left( \ldots, E_1(r_{1_i}), \ldots \right).$$

Corresponding to the shuffling step 2114 of the protocol 2102, the service provider 2202 sends a randomly-permuted list of encrypted and blinded client-specific secret input values (e.g., at 2224 and 2226). For example, the service provider 2202 can send a full list of encrypted database entries $E_1(x_i)$, permuted via a random permutation $\pi_2$. To prevent the shufflers from learning the secret inputs, each plaintext $X_{\pi_{2(i)}}$ can be blinded by a value $r_{2_i} \in M_1$, chosen individually and at random for each i by the service provider 2202. The generating and sending of the randomly-permuted list of encrypted and blinded client-specific secret input values can be denoted as $P_S \to S_k$: $X' = (\ldots, E_1(x_i' + r_{2_i}) = E_1 (x_{\pi_{2(i)}} + r_{2_i}) = E_1 (x_{\pi_{2(i)}}) \cdot E_1(r_{2_i}), \ldots)$.

Corresponding to the shuffling step 2116 of the protocol 2102, the service provider 2202 sends a list of encrypted first blinding values to each shuffler (e.g., at 2228 and 2230). The blinding values can be encrypted with a second cryptosystem. The sending of the list of encrypted first blinding values can be denoted as: $P_S \to S_k$: $R_2 = (\ldots, E_2(r_{2_i}), \ldots)$.

Corresponding to the shuffling step 2118 of the protocol 2102, the service provider 2202 chooses a service provider random value (e.g., a long random value $r_{1_S}$, e.g. $r_{1_S} \in M_1$, and sends the service provider random value to each of the shufflers (e.g., at 2232 and 2234).

Corresponding to the shuffling step 2120 of the protocol 2102, each shuffler decrypts each encrypted random value in the randomly-permuted list of encrypted random values to generate a list of random values (e.g., at 2236 and 2238). Each shuffler generates (e.g., at 2240 and 2242) a client-specific list of hashed values using each random value in the list of random values and the service provider random value. In some implementations, before generating the hashed values, each shuffler determines whether each random value in the list of random values is unique. If the list of random values is not unique, the shuffler can abort the protocol 2102. The generating of the hashed values can be denoted as: $S_k$: $H = (\ldots, h_j = h(r_{1_j}' \| r_{1_S}), \ldots)$.

For instance, in further detail of the shuffling step 2120, each shuffler $S_k$ can decrypt the ciphertexts $E_1(r_{1_i}') \in R'$, $1 \le i \le n$. Each shuffler can concatenate each resulting plaintext $r_{1_i}'$ with the random value $r_{1_S}$ of $P_S$ and compute n hashes $h_i$. Using $r_{1_S}$ as a seed of the hash function prevents any shuffler $S_k$ from selecting a specific $r_{1_i}$ to obtain a desired hash $h_i$.

Corresponding to the shuffling step 2122 of the protocol 2102, each shuffler (e.g., at 2244 and 2246) generates a set of client-specific random indices. For example, each shuffler $S_k$ can sort the client-specific list of hashed values. For each hash $h_i = h(r_{1_i}' \| r_{P_S})$ corresponding to shuffler $S_k$'s random values $$r_{1_1}', \ldots, r_{1_{\frac{n}{m}}}',$$

a position $\rho_i$ in the sorted list of hashes can be identified as one of the $$\frac{n}{m}$$

random indices of $S_k$. Hence, each shuffler can compute $$\frac{n}{m}$$

individual, random indices $(\ldots, \rho_i, \ldots)$ that are unknown to $P_S$. The generation of the random indices can be denoted as: $S_k$: $(\ldots, \rho_i =$ position(H'=sort(H), $h_i$), $\ldots)$.

Corresponding to the shuffling step 2124 of the protocol 2102, each shuffler (e.g., at 2248 and 2250) sends a client-specific randomly-permuted subset of re-randomized, encrypted and blinded secret input values to the service provider 2202. For example, given the $$\frac{n}{m}$$

indices $(\ldots, \rho_i, \ldots)$ for the shuffler, each shuffler sends $$\frac{n}{m}$$

ciphertexts $$(\ldots, E_1(x_{\rho_i}' + r_{2_{\rho_i}}), \ldots), \text{e.g.,}$$

identified using the random indices, to the service provider $P_S$. To prevent the service provider 2202 from learning the random indices $(\ldots, \rho_i, \ldots)$, the shufflers perform rerandomization by multiplication with an encrypted zero. Furthermore, the shufflers can permute, based on a random permutation $\pi_{3_k}$, a rerandomized subset of encrypted and blinded client-specific secret input values to generate the randomly-permuted subset of encrypted and blinded client-specific secret input values. The generation and sending of the randomly-permuted subset of rerandomized, encrypted, and blinded client-specific secret input values can be denoted as:

$$S_k \to P_S: \pi_{3_k} \left( \ldots, E_1'(x_{\rho_i}' + r_{2_{\rho_i}}) = \right.$$
$$\left. E_1(x_{\rho_i}' + r_{2_{\rho_i}} + 0) = E_1(x_{\rho_i}' + r_{2_{\rho_i}}) \cdot E_1(0), \ldots \right).$$

Corresponding to the shuffling step 2126 of the protocol 2102, each shuffler (e.g., at 2252 and 2254) sends a client-specific randomly-permuted list of encrypted first blinding values to the service provider 2202. For instance, encrypted random values of indices $(\ldots, \rho_i, \ldots)$ in $R_2$, i.e., $(\ldots, E_2(r_{2_i}), \ldots)$, are identified, by each shuffler. The underlying plaintexts $(\ldots, r_{2_i}, \ldots)$ can be blinded by random values $(\ldots, r_{3_i}, \ldots)$, and the list of blinded first blinding values can be permuted based on a random permutation $\pi_{3_k}$, before being sent as the client-specific randomly-permuted list of encrypted first blinding values. The generation and sending of the client-specific randomly-permuted list of encrypted first blinding values can be denoted as:

$$S_k \to P_S: \pi_{3_k}( \ldots, E_2(r_{2_{\rho_i}} + r_{3_i}) = E_2(r_{2_{\rho_i}}) \cdot E_2(r_{3_i}), \ldots ).$$

Corresponding to the shuffling step 2128 of the protocol 2102, each shuffler (e.g., at 2256 and 2258) sends randomly-permuted encrypted client-specific second blinding values to the service provider 2202. For instance, random values ( . . . , $r_{3_i}$, . . . ) associated with the shuffler and encrypted under $CS_1$, can be sent to the service provider $P_S$. Before being sent, the values can be permuted based on a random permutation $\pi_{3_k}$. The generation and sending of the randomly-permuted encrypted client-specific second blinding values can be denoted as: $S_k \to P_S: \pi_{3_k}( \ldots, E_1(r_{3_i}), \ldots )$.

Corresponding to the shuffling step 2130 of the protocol 2102, the service provider 2202, at 2260, generates rerandomized encrypted secret input values based on the inputs received in the shuffling steps 2124, 2126, and 2128. The generation of the rerandomized encrypted secret input values can be denoted by:

$$P_S: X = ( \ldots,$$

$$E_1'(x'_{\rho_i}) = E_1'(x'_{\rho_i} + r_{2_{\rho_i}}) \cdot E_1((-1) \cdot D_2(E_2(r_{2_{\rho_i}} + r_{3_i}))) \cdot E_1(r_{3_i}), \ldots ).$$

In further detail, the service provider 2202 can decrypt the ciphertexts $$E_2(r_{2_{\rho_i}} + r_{3_i})$$

received in the shuffling step 2126, multiply the resulting plaintexts with −1, and encrypt the products under cryptosystem $CS_1$. The resulting ciphertexts can be multiplied with the ciphertexts $$E_1'(x'_{\rho_i} + r_{2_{\rho_i}})$$

received in the shuffling step 2124 and $E_1(r_{3_i})$ received in the shuffling step 2128. Consequently, the random values $r_{2_i}$ and $r_{3_i}$ can be eliminated, resulting in rerandomized ciphertexts $\chi_i = E_1(x_{\rho_i}')$. The order of the rerandomized ciphertexts $\chi_i$ of the input values $x_i$ depends on the input order of the values in shuffling steps 2124, 2126, and 2128 as received via network(s). Every $S_k$ sends $$\frac{n}{m}$$

rerandomized, encrypted database entries, chosen based on client-specific random indices. The service provider 2202 cannot map between the original database entry order and the order of X. Therefore, $P_S$'s output is a shuffled list. The shufflers do not get an output.

Figure 23A:
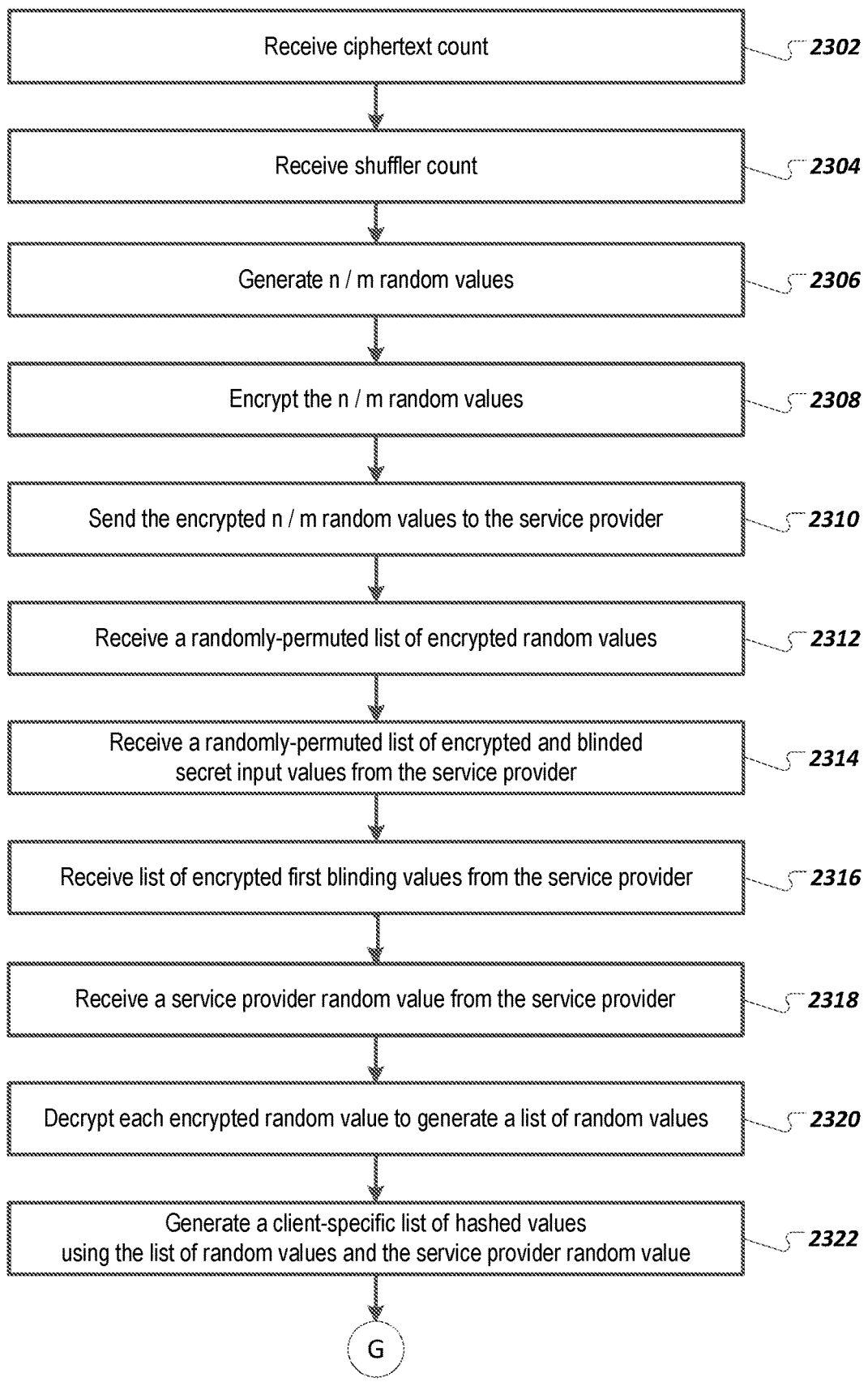

FIGS. 23A-B illustrate a flowchart of a shuffler method 2300 for an efficient distributed secret shuffle protocol for encrypted database entries using dependent shufflers. It will be understood that the method 2300 and related methods may be performed, for example, by any suitable system, environment, software, and hardware, or a combination of systems, environments, software, and hardware, as appropriate. For example, one or more of a client, a server, or other computing device can be used to execute method 2300 and related methods and obtain any data from the memory of a client, the server, or the other computing device. In some implementations, the method 2300 and related methods are executed by one or more components of the system 100 described above with respect to FIG. 1. For example, the method 2300 and related methods can be executed by a shuffler of FIG. 1.

At 2302, the shuffler receives, from the service provider, a count of ciphertexts that are to be shuffled. The count of ciphertext to be shuffled can equal to a total count of clients (shuffling and non-shuffling clients). At 2304, the shuffler receives, from the service provider, a count of shufflers. Steps 2302 and 2304 correspond to the submission or random values step 2108 of the protocol 2102 described above with respect to FIG. 21.

At 2306, the shuffler generates $$\frac{n}{m}$$

random values (e.g., where n is the ciphertext count and m is the shuffler count). At 2308, the shuffler encrypts each generated random value. The shuffler can encrypt the random values using a first cryptosystem. At 2310, the shuffler sends $$\frac{n}{m}$$

encrypted random values to the service provider. Steps 2306, 2308, and 2310 correspond to the random value submission step 2110 of the protocol 2102.

At 2312, the shuffler receives, from the service provider, a randomly-permuted list of encrypted random values (e.g., random values provided by the shuffler and the other shufflers). The randomly-permuted list of encrypted random values can be randomly permuted so that the shuffler won't know which shuffler provided which encrypted random value. Step 2312 corresponds to the shuffling step 2112 of the protocol 2102.

At 2314, the shuffler receives a randomly-permuted list of encrypted and blinded secret input values from the service provider. The service provider can blind each encrypted secret input by a random value to prevent the shuffler from learning the secret inputs (e.g., prevent the shuffler from decrypting other shuffler's encrypted secret input values). Step 2314 corresponds to the shuffling step 2114 of the protocol 2102.

At 2316, the shuffler receives a list of encrypted first blinding values from the service provider. Step 2316 corresponds to the shuffling step 2116 of the protocol 2102.

At 2318, the shuffler receives a service provider random value from the service provider. Step 2318 corresponds to the shuffling step 2118 of the protocol 2102.

At 2320, the shuffler decrypts each encrypted random value in the randomly-permuted list of encrypted random values to generate a list of random values. At 2322, the shuffler generates a client-specific list of hashed values using each random value in the list of random values and the service provider random value. Steps 2320 and 2322 correspond to the shuffling step 2120 of the protocol 2102.

At 2324, the shuffler determines a set of client-specific random indices, with a count equal to the number of random numbers the shuffler previously generated. Step 2324 corresponds to the shuffling step 2122 of the protocol 2102.

At 2326, the shuffler identifiers entries in the randomly-permuted list of encrypted and blinded client-specific secret input values that correspond to the client-specific random indices. At 2328, the shuffler rerandomizes (e.g., by multiplying with an encrypted zero) each identified entry in the randomly-permuted list of encrypted and blinded client-specific secret input values that correspond to the client-specific random indices, to generate a rerandomized subset of encrypted and blinded client-specific secret input values. At 2330, the shuffler randomly permutes the rerandomized subset of encrypted and blinded client-specific secret input values to generate a randomly-permuted subset of rerandomized, encrypted, and blinded client-specific secret input values. At 2332, the shuffler sends the randomly-permuted subset of re-randomized, encrypted and blinded client-specific secret input values to the service provider. Steps 2326, 2328, 2330, and 2332 correspond to the shuffling step 2124 of the protocol 2102.

At 2334, the shuffler identifies first blinding values corresponding to the client-specific random indices. At 2336, the shuffler generates client-specific blinded first blinding values using client-specific second blinding values. At 2338, the shuffler generates a client-specific randomly-permuted list of blinded first blinding values. At 2340, the shuffler sends the client-specific randomly-permuted list of blinded first blinding values to the service provider. Steps 2334, 2336, 2338, and 2340 correspond to the shuffling step 2126 of the protocol 2102.

At 2342, the shuffler encrypts client-specific second blinding values. At 2344, the shuffler randomly permutes encrypted client-specific second blinding values. At 2346, the shuffler sends randomly-permuted encrypted client-specific second blinding values to the service provider. Steps 2342, 2344, and 2346 correspond to the shuffling step 2128 of the protocol 2102. Remaining step(s) of the protocol 2102 can be performed by the service provider.

Figure 24A:
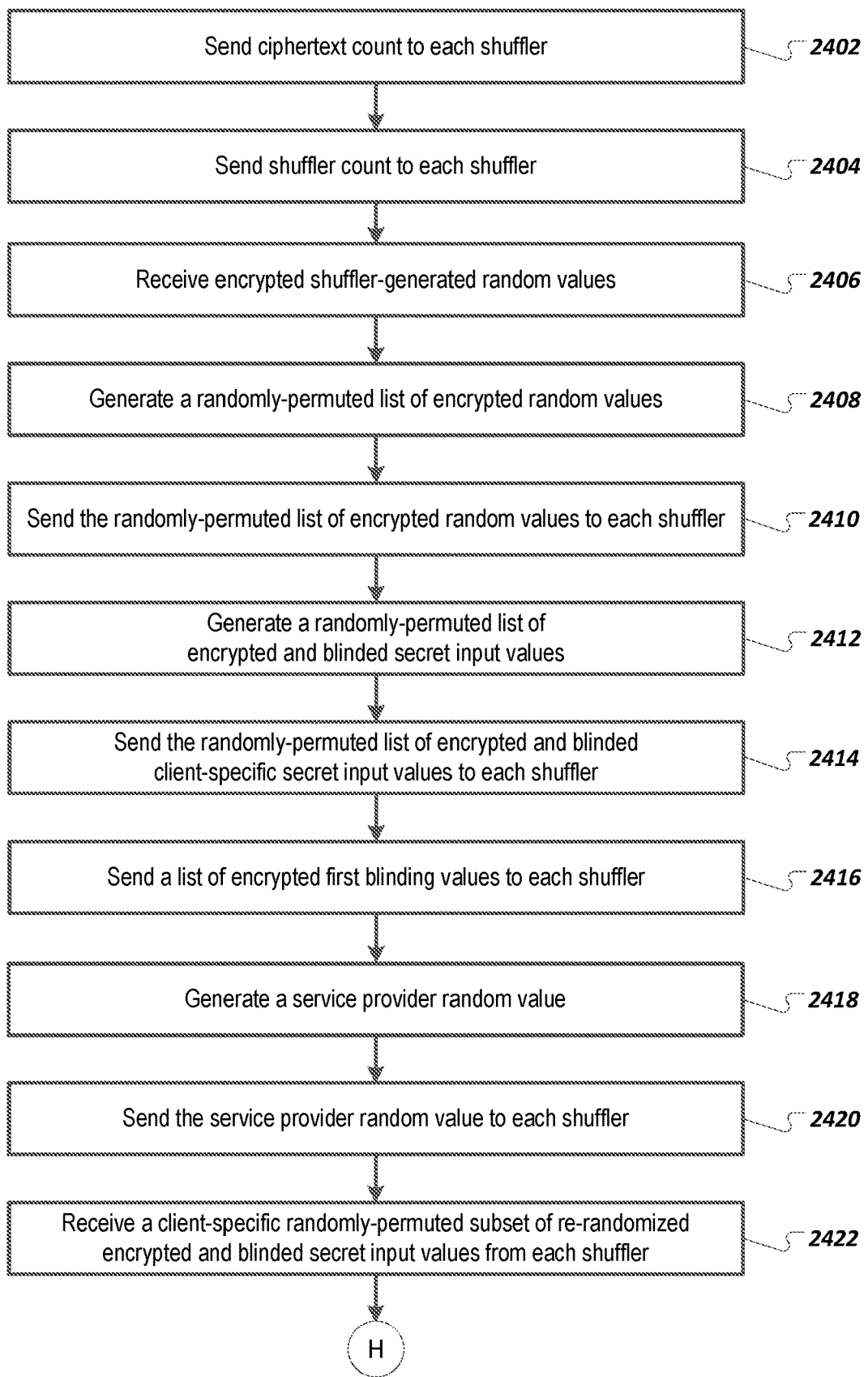
FIGS. 24A-B illustrates a flowchart of a service provider method for an efficient distributed secret shuffle protocol for encrypted database entries using dependent shufflers.
Figure 24B:
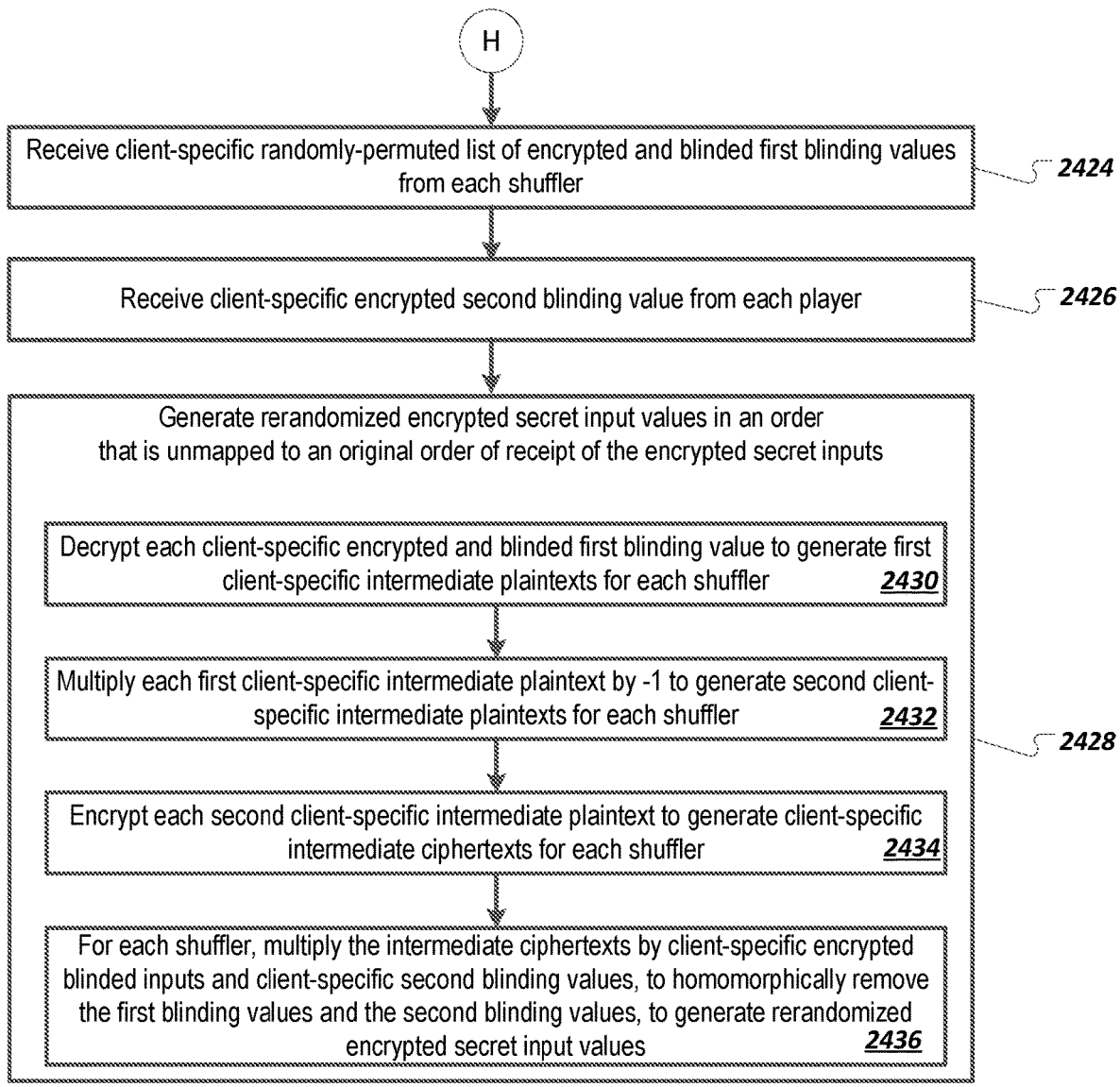

FIGS. 24A-B illustrate a flowchart of a service provider method 2400 for an efficient distributed secret shuffle protocol for encrypted database entries using dependent shufflers. It will be understood that the method 2400 and related methods may be performed, for example, by any suitable system, environment, software, and hardware, or a combination of systems, environments, software, and hardware, as appropriate. For example, one or more of a client, a server, or other computing device can be used to execute method 2400 and related methods and obtain any data from the memory of a client, the server, or the other computing device. In some implementations, the method 2400 and related methods are executed by one or more components of the system 100 described above with respect to FIG. 1. For example, the method 2400 and related methods can be executed by the server 102 of FIG. 1.

At 2402, the service provider sends a count of ciphertexts to be shuffled, to each shuffler. At 2404, the service provider sends a count of shufflers, to each shuffler. Steps 2402 and 2404 correspond to the submission or random values step 2108 of the protocol 2102 described above with respect to FIG. 21.

At 2406, the service provider receives $$\frac{n}{m}$$

encrypted random values from each player (e.g., where n is the ciphertext count and m is the shuffler count). Shufflers can encrypt the random values using a first cryptosystem. In total, the service provider can receive a count of encrypted shuffling-generated random values equal to the count of ciphertexts to be shuffled. Step 2406 corresponds to the random value submission step 2110 of the protocol 2102.

At 2408, the service provider generates a randomly-permuted list of encrypted random values using the encrypted random values received from the shufflers. The randomly-permuted list of encrypted random values has n items. At 2410, the service provider sends the randomly-permuted list of encrypted random values to each shuffler. Steps 2408 and 2410 correspond to the shuffling step 2112 of the protocol 2102.

At 2412, the service provider generates a randomly-permuted list of encrypted and blinded secret input values. At 2414, the service provider sends the randomly-permuted list of encrypted and blinded secret input values to each shuffler. The service provider can blind each encrypted secret input by a random value to prevent the shufflers from learning the secret inputs (e.g., prevent the shufflers from decrypting other shuffler's encrypted secret input values). Steps 2412 and 2414 correspond to the shuffling step 2114 of the protocol 2102.

At 2416, the service provider sends a list of encrypted first blinding values to each shuffler. Step 2416 corresponds to the shuffling step 2116 of the protocol 2102.

At 2418, the service provider generates (or selects) a service provider random value. At 2420, the service provider sends the service provider random value to each of the shufflers. Steps 2418 and 2420 correspond to the shuffling step 2118 of the protocol 2102.

At 2422, the service provider receives a client-specific randomly-permuted subset of re-randomized encrypted and blinded secret input values, from each shuffling client. The subset of encrypted and blinded secret input values can be entries in the randomly-permuted list of encrypted and blinded client-specific secret input values that correspond to client-specific random indices of the shuffler. The shuffler can rerandomize and perform another random permuting, before sending the randomly-permuted subset of encrypted and blinded secret input values to the service provider. Step 2422 corresponds to the shuffling step 2124 of the protocol 2102.

At 2424, the service provider receives a client-specific randomly-permuted list of encrypted and blinded first blinding values from each shuffler. Step 2424 corresponds to the shuffling step 2126 of the protocol 2102.

At 2426, the service provider receives randomly-permuted encrypted client-specific second blinding values, from each shuffler. Step 2426 corresponds to the shuffling step 2128 of the protocol 2102.

At 2428, the service provider generates rerandomized encrypted secret input values in an order that is unmapped to an original order of receipt of the encrypted secret inputs. In further detail, at 2430 decrypts each client-specific encrypted and blinded first blinding value to generate first client-specific intermediate plaintexts for each shuffling client. At 2432, the service provider multiplies each first client-specific intermediate plaintext by negative one to generate second client-specific intermediate plaintexts for each shuffling client. At 2434, the service provider encrypts each second client-specific intermediate plaintext to generate intermediate ciphertexts for each shuffling client. At 2436, the service provider multiplies, for each shuffling client, the intermediate ciphertexts by corresponding client-specific rerandomized encrypted blinded inputs and corresponding client-specific encrypted second blinding values, to homomorphically remove the first blinding values and the second blinding values, to generate client-specific rerandomized encrypted secret input values. The rerandomized encrypted secret input values are generated in an order that is unmapped to an order of receipt, at the service provider, of the encrypted secret input values.

FIG. 25A is a table 2500 that provides information describing an efficient distributed secret shuffle protocol 2502 for encrypted database entries using independent shufflers. For instance, the protocol 2502 can be the protocol 210 introduced above with respect to FIG. 2. The protocol 2502 can be used when a data owner wants to shuffle data with the help of other parties. Independent shufflers in the context of the protocol 2502 can mean that the shufflers do not need to be input data providers. The protocol 2502 can be more efficient than the protocol 2002, but can involve consideration for additional entities (e.g., shufflers, data providers) that may need to be paid (or otherwise motivated) for participating). With the protocol 2502, a data provider can be a data owner (or provided data), but does not need to be known by the shufflers. The protocol 2502 can utilize multiple independent shuffling parties and can be particularly tailored for scenarios with a computationally limited service provider. The set of shuffling parties can be independent of the set of parties that previously provided the encrypted database entries. In fact, input values can come from whatever source and only need to be encrypted under a same public key.

Whether to choose the protocol 2002 (dependent shufflers) or the protocol 2502 (independent shufflers) can depend on a variety of factors. For example, factors can include whether independent shufflers are available, whether computational power of the shufflers is relatively limited, whether data providers are known, or whether input data is provided by a single instance or by multiple data providers). Some of these factors may be incompatible and may lead to selection of either the protocol 2002 or the protocol 2502, based on various factor values.

The protocol 2502 uses homomorphic encryption 2504, among other technologies. Inputs 2506 can be included in a service provider's database (or otherwise accessible to the service provider). The inputs can be previously provided by a set of independent clients. Communication complexity 2508 between participants is of an order O(n). Computation complexity 2510 for shufflers is also of an order O(n), while computation complexity 2512 for the service provider can be constant for cryptographic operations and linear for non-cryptographic operations. The protocol 2502 can be completed in ten steps in two rounds 2514. While some protocols (e.g., the protocol 204) can provide verifiability of outputs, in some implementations, the protocol 2502 does not provide verifiability 2516. The protocol 2502 can use n encrypted entries 2518 previously provided by a set of players.

The protocol 2502 can use two cryptosystems 2520. For example, a first cryptosystem $CS_1$ 2522 can include a first key generation algorithm $G_1$ 2524, a first encryption function $E_1$ 2526, and a first decryption function $D_1$ 2528. Similarly, a second cryptosystem $CS_2$ 2530 can include a second key generation algorithm $G_2$ 2532, a second encryption function $E_2$ 2534, and a second decryption function $D_2$ 2536. The first key generation algorithm 2524 can, using a first security parameter $\kappa_1$ 538 generate a first public key $pk_1$ 2540 and a first secret key $sk_1$ 2542. Similarly, the second key generation algorithm 2532 can, using a second security parameter $\kappa_2$ 2544 generate a second public key $pk_2$ 2546 and a second secret key $sk_2$ 2548.

The protocol 2502 can use m+1 participants 2552, including m shufflers $S_1, \ldots, S_n$ 2554 and a service provider $P_S$ 2556. The number of shufflers m≤n is less or equal to the number of database entries n. In some implementations, n is divisible by m (e.g., m|n). The shufflers can be independent of the players that provided the encrypted entries 2518.

As indicated by a note 2558, the public key $pk_1$ 2540 is known to the service provider $P_S$ 2556 and the shufflers $S_i$ 2554. A note 2560 indicates that the secret key $sk_1$ 2542 is known only to the players (data providers) and not to the shufflers or the service provider. As indicated by a note 2562, the public key $pk_2$ 2546 is known to the service provider $P_S$ 2556 and the shufflers $S_i$ 2554. A note 2564 indicates that the secret key $sk_2$ 2548 is only known to the shufflers $S_i$ 2554.

The protocol 2502 can use a random permutation $\pi_1$ 2566 that is chosen by and known only to the service provider $P_S$ 2556. The protocol 2502 can use random permutations $\pi_{2_k}$ 2567 that are chosen by and known only to the respective shufflers $S_k$. The protocol 2502 can use a cryptographic hash function h 2568. The hashes of the cryptographic hash function h 2568 can be uniformly distributed among a domain dom(h(•)). The protocol 2502 can also use a sort function 2570 that sorts a sequence and a position function 2572 that outputs a position of an item in a sequence.

FIG. 25B illustrates a communication scenario 2580 for the protocol 2500. A service provider 2582 can access a database 2584 that includes n encrypted entries previously provided by n players. Each shuffler $S_k$ in a set of m shufflers can communicate with the central service provider $P_S$ 2582. The shufflers can be independent of the players. For example, a first shuffler $S_1$ 2586, a second shuffler $S_2$ 2587, a third shuffler $S_3$ 2588, and a fourth shuffler $S_4$ 2589 can communicate with the service provider $P_S$ 2582 over communication links 2592, 2593, 2594, and 2595, respectively. Although four shufflers are shown, various numbers of shufflers can be used. The communication links 2592, 2593, 2594, and 2595 can provide secure (e.g., secret and authentic) channels between shufflers and the service provider $P_S$ 2582, for instance as established using TLS.

FIG. 26 illustrates a protocol specification 2600 for an efficient, distributed, secret-shuffle protocol 2602 for encrypted database entries using independent shufflers. The protocol 2602 includes two rounds—a random value submission round 2604 and a shuffling round 2606. The random value submission round 2604 includes two input steps 2608 and 2610. The shuffling round 2606 includes eight shuffling steps 2612, 2614, 2616, 2618, 2620, 2622, 2624, and 2626. The steps of the protocol 2602 are described in detail below with respect to FIGS. 26, 27, and 28.

FIG. 27 illustrates a swim lane diagram for an efficient distributed secret shuffle protocol 2700 for encrypted database entries using independent shufflers. It will be understood that the protocol 2700 and related methods may be performed, for example, by any suitable system, environment, software, and hardware, or a combination of systems, environments, software, and hardware, as appropriate. For example, one or more of a client, a server, or other computing device can be used to execute the protocol 2700 and related methods and obtain any data from the memory of a client, the server, or the other computing device. In some implementations, the protocol 2700 and related methods are executed by the server 102 and one or more other components of the system 100 described above with respect to FIG. 1.

Corresponding to the submission of random values step 2608 of the protocol 2602 described above with respect to FIG. 26, a service provider 2702 sends a count of ciphertexts that are to be shuffled to each shuffler. For example, the service provider 2702 can send, at 2704 and 2706, a ciphertext count to a shuffler 2708 and a shuffler 2710, respectively. Additionally, the service provider 2702 can send (e.g., at 2712 and 2714) a count of shufflers to each shuffler. The sending of the ciphertext and shuffler counts can be denoted by: $P_S \rightarrow S_k$: n, m.

Corresponding to the random value submission step 2610 of the protocol 2602, each shuffler $S_k$ generates $$\frac{n}{m}$$

random values $$r_{1_1}, \ldots, r_{1_{\frac{n}{m}}},$$

encrypts the generated random values, and sends the encrypted random values (e.g., at 2716 and 2718, respectively) to the service provider 2702. The service provider 2702 can receive n encrypted random values and can refer to the received random values as $E_2(r_{1_1}), \ldots, E_2(r_{1_n})$. The sending of the encrypted random values can be denoted by:

$$S_k \rightarrow P_S: \left( E_2(r_{1_1}), \ldots, E_2\left(r_{1_{\frac{n}{m}}}\right) \right).$$

Corresponding to the shuffling step 2612 of the protocol 2602, the service provider 2702 sends a randomly-permuted list of encrypted random values $E_1(r_{1_j})$ to each shuffler (e.g., at 2720 and 2722). Permutation using a random permutation $\pi_1$ can prevent a given shuffler from learning which encrypted random value was provided by which shuffler, for example. The sending of the randomly-permuted list of encrypted random values can be denoted by:

$$P_S \rightarrow S_k := R'_1\left( \ldots, E_2(r'_{1_i}) = E_2(r_{1\pi_{1(i)}}), \ldots \right).$$

Corresponding to the shuffling step 2614 of the protocol 2602, the service provider 2702 sends (e.g., at 2724 and 2726, respectively) a list of encrypted database entries, as denoted by: $P_S \rightarrow S_k$: $X=(E_1(x_1), \ldots, E_1(x_n))$. In contrast to the shuffling protocol 2102, the encrypted secret input values do not need to be blinded, since shufflers, who are independent from the data providers who provided the encrypted secret input values, do not have a secret key with which to decrypt the encrypted secret input values.

Corresponding to the shuffling step 2616 of the protocol 2602, the service provider 2702 chooses a service provider random value (e.g., a long random value $r_{1_S}$, e.g. $r_{1_S} \in M_2$, and sends the service provider random value to each of the shufflers (e.g., at 2728 and 2730).

Corresponding to the shuffling step 2618 of the protocol 2602, each shuffler decrypts each encrypted random value in the randomly-permuted list of encrypted random values to generate a list of random values (e.g., at 2732 and 2734). Each shuffler generates (e.g., at 2736 and 2738) a client-specific list of hashed values using each random value in the list of random values and the service provider random value. In some implementations, before generating the hashed values, each shuffler determines whether each random value in the list of random values is unique. If the list of random values is not unique, the shuffler can abort the protocol 2602. The generating of the hashed values can be denoted as: $S_k$: $H=(\ldots, h_j=h(r_{1_i}' \| r_{1_S}), \ldots)$.

In further detail of the shuffling step 2120, each shuffler $S_k$ can decrypt the ciphertexts $E_2(r_{1_i}') \in R'$, $1 \leq i \leq n$. Each shuffler can concatenate each resulting plaintext $r_{1_i}'$ with the random value $r_{1_S}$ of $P_S$ and compute n hashes $h_i$. Using $r_{1_S}$ as a seed of the hash function prevents any shuffler $S_k$ from selecting a specific $r'_{1_i}$ to obtain a desired hash $h_i$.

Corresponding to the shuffling step 2620 of the protocol 2602, each shuffler (e.g., at 2740 and 2742) generates a set of client-specific random indices. For example, each shuffler $S_k$ can sort the client-specific list of hashed values. For each hash $h_i = h(r_{1_i}' \| r_{P_S})$ corresponding to shuffler $S_k$'s random values $$r_{1_1}, \ldots, r_{1_{\frac{n}{m}}},$$

a position $\rho_i$ in the sorted list of hashes can be identified as one of the $$\frac{n}{m}$$

random indices of $S_k$. Hence, each shuffler can compute $$\frac{n}{m}$$

individual, random indices $(\ldots, \rho_i, \ldots)$ that are unknown to $P_S$. The generation of the random indices can be denoted as: $S_k$: $(\ldots, \rho_i = \text{position}(H' = \text{sort}(H), h_i), \ldots)$.

Corresponding to the shuffling step 2622 of the protocol 2602, each shuffler generates (e.g., at 2744 and 2746, respectively) a client-specific rerandomized subset of encrypted secret input values. For instance, given the $$\frac{n}{m}$$

indices $(\ldots, \rho_i, \ldots)$ of each shuffler, each shuffler identifies $$\frac{n}{m}$$

ciphertexts $(\ldots, E_1(x_{\rho_i}), \ldots)$. To prevent the service provider 2702 from learning the random indices $(\ldots, \rho_i, \ldots)$, the ciphertexts can be rerandomized by multiplication with an encrypted zero. The generation of the client-specific rerandomized subset of encrypted secret input values can be denoted by: $S_k$: ( ..., $E_1'(x_i')=E_1 (x_{\rho_i}+0)=E_1 (x_{\rho_i})\cdot E_1(0)$, ... ).

Corresponding to the shuffling step 2624 of the protocol 2602, each shuffler (e.g., at 2748 and 2750, respectively) randomly permutes the client-specific rerandomized subset of encrypted secret input values to generate a client-specific randomly-permuted rerandomized subset of encrypted secret input values and sends the client-specific randomly-permuted rerandomized subset of encrypted secret input values to the service provider, as denoted by:

$$S_k \to P_S: \left( \ldots, E_1'\left(x_{\pi_{2k(i)}}'\right), \ldots \right).$$

Corresponding to the shuffling step 2626 of the protocol 2602, the service provider collects, at 2752, a sequence of rerandomized encrypted secret input values. The order of the rerandomized encrypted secret input values depends on the input order of the client-specific rerandomized subsets of encrypted secret input values from each shuffler as received via network(s). In summary, every shuffler $S_k$ sends $$\frac{n}{m}$$

rerandomized, encrypted database entries, chosen based on its random indices. The service provider 2702 cannot map between the original database entry order and the order of X. Therefore, $P_S$'s output is a shuffled list. The shufflers do not get an output.

Figure 28A:
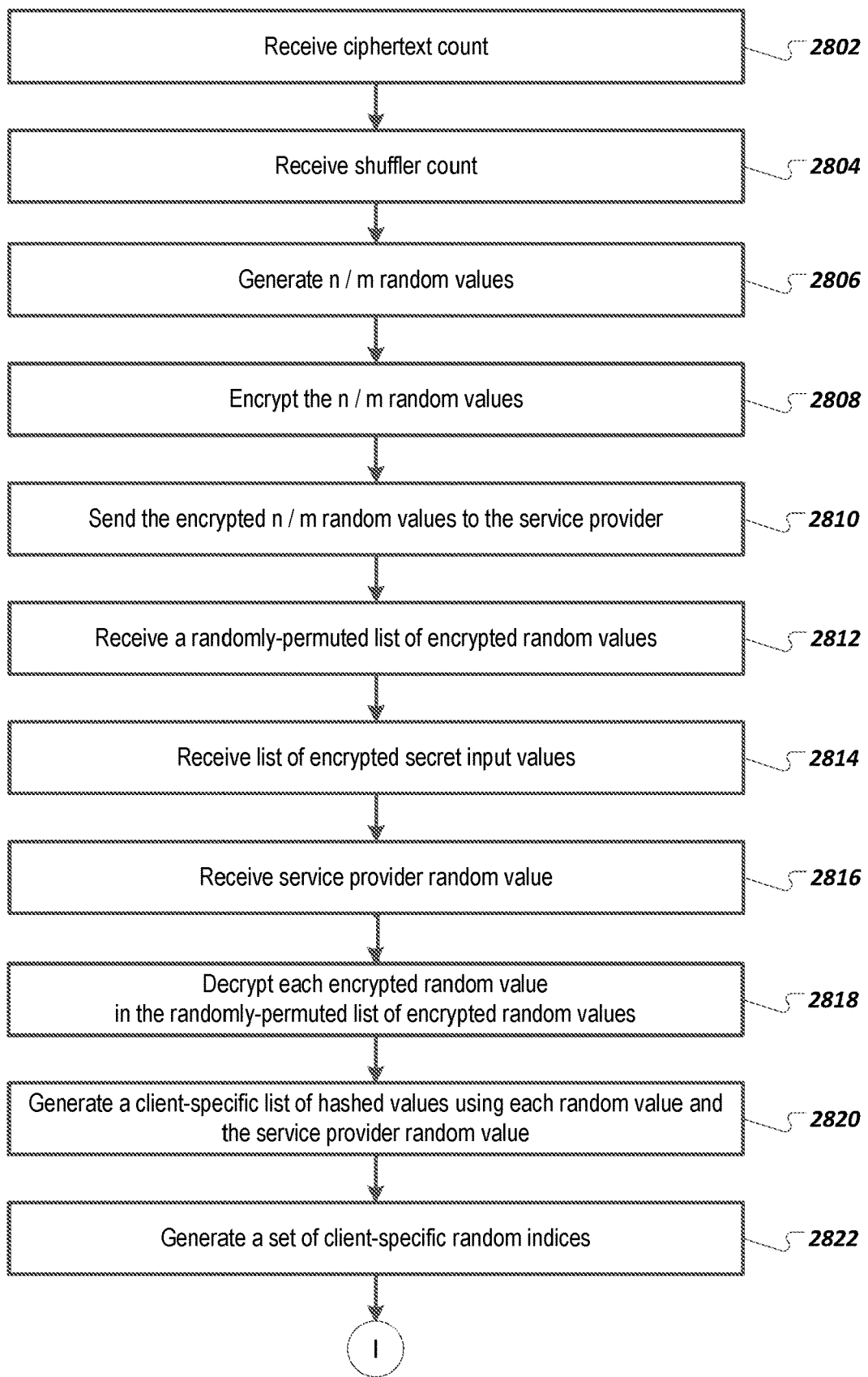
FIGS. 28A-B illustrate a flowchart of a shuffler method for an efficient distributed secret shuffle protocol for encrypted database entries using independent shufflers.
Figure 28B:
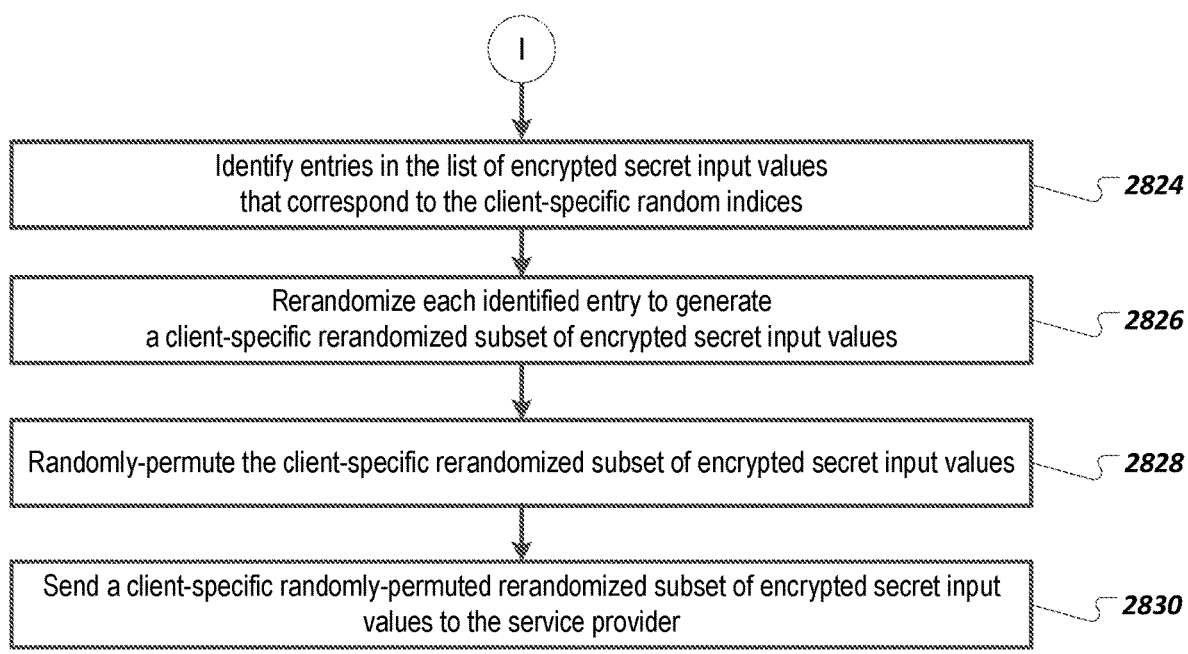

FIGS. 28A-B illustrates a flowchart of a shuffler method 2800 for an efficient distributed secret shuffle protocol for encrypted database entries using independent shufflers. It will be understood that the method 2800 and related methods may be performed, for example, by any suitable system, environment, software, and hardware, or a combination of systems, environments, software, and hardware, as appropriate. For example, one or more of a client, a server, or other computing device can be used to execute method 2800 and related methods and obtain any data from the memory of a client, the server, or the other computing device. In some implementations, the method 2800 and related methods are executed by one or more components of the system 100 described above with respect to FIG. 1. For example, the method 2800 and related methods can be executed by a shuffler of FIG. 1.

At 2802, the shuffler receives, from the service provider, a count of ciphertexts that are to be shuffled. At 2804, the shuffler receives, from the service provider, a count of shufflers. Steps 2802 and 2804 correspond to the submission or random values step 2608 of the protocol 2602 described above with respect to FIG. 26.

At 2806, the shuffler generates $$\frac{n}{m}$$

random values (e.g., where n is the ciphertext count and m is the shuffler count). At 2808, the shuffler encrypts each generated random value. At 2810, the shuffler sends $$\frac{n}{m}$$

encrypted random values to the service provider. Steps 2806, 2808, and 2810 correspond to the random value submission step 2610 of the protocol 2602.

At 2812, the shuffler receives, from the service provider, a randomly-permuted list of encrypted random values (e.g., random values provided by the shuffler and the other shufflers). The randomly-permuted list of encrypted random values can be a list that has been randomly permuted by the service provider (so that the shuffler won't know which shuffler provided which encrypted random value). Step 2812 corresponds to the shuffling step 2612 of the protocol 2602.

At 2814, the shuffler receives, from the service provider, a list of encrypted secret input values. Step 2814 corresponds to the shuffling step 2614 of the protocol 2602.

At 2816, the shuffler receives a service provider random value from the service provider. Step 2816 corresponds to the shuffling step 2616 of the protocol 2602.

At 2818, the shuffler decrypts each encrypted random value in the randomly-permuted list of encrypted random values to generate a list of random values. At 2820, the shuffler generates a client-specific list of hashed values using each random value in the list of random values and the service provider random value. Steps 2818 and 2820 correspond to the shuffling step 2120 of the protocol 2102.

At 2822, the shuffler generates a set of client-specific random indices, with a count equal to the number of random numbers the shuffler previously generated. Step 2822 corresponds to the shuffling step 2620 of the protocol 2602.

At 2824, the shuffler identifies entries in the list of the encrypted secret input values that correspond to the client-specific random indices. At 2826, the shuffler rerandomizes (e.g., using an encrypted zero) each identified entry in the list of the encrypted secret input values that correspond to the client-specific random indices to generate a client-specific rerandomized subset of encrypted secret input values. Steps 2824 and 2826 correspond to the shuffling step 2622 of the protocol 2602.

At 2828, the shuffler randomly permutes the client-specific rerandomized subset of encrypted secret input values to generate a client-specific randomly-permuted rerandomized subset of encrypted secret input values. At 2830, the shuffler sends the client-specific randomly-permuted rerandomized subset of encrypted secret input values to the service provider. Steps 2828 and 2830 correspond to the shuffling step 2624 of the protocol 2602. Remaining step(s) of the protocol 2602 are performed by the service provider.

Figure 29:
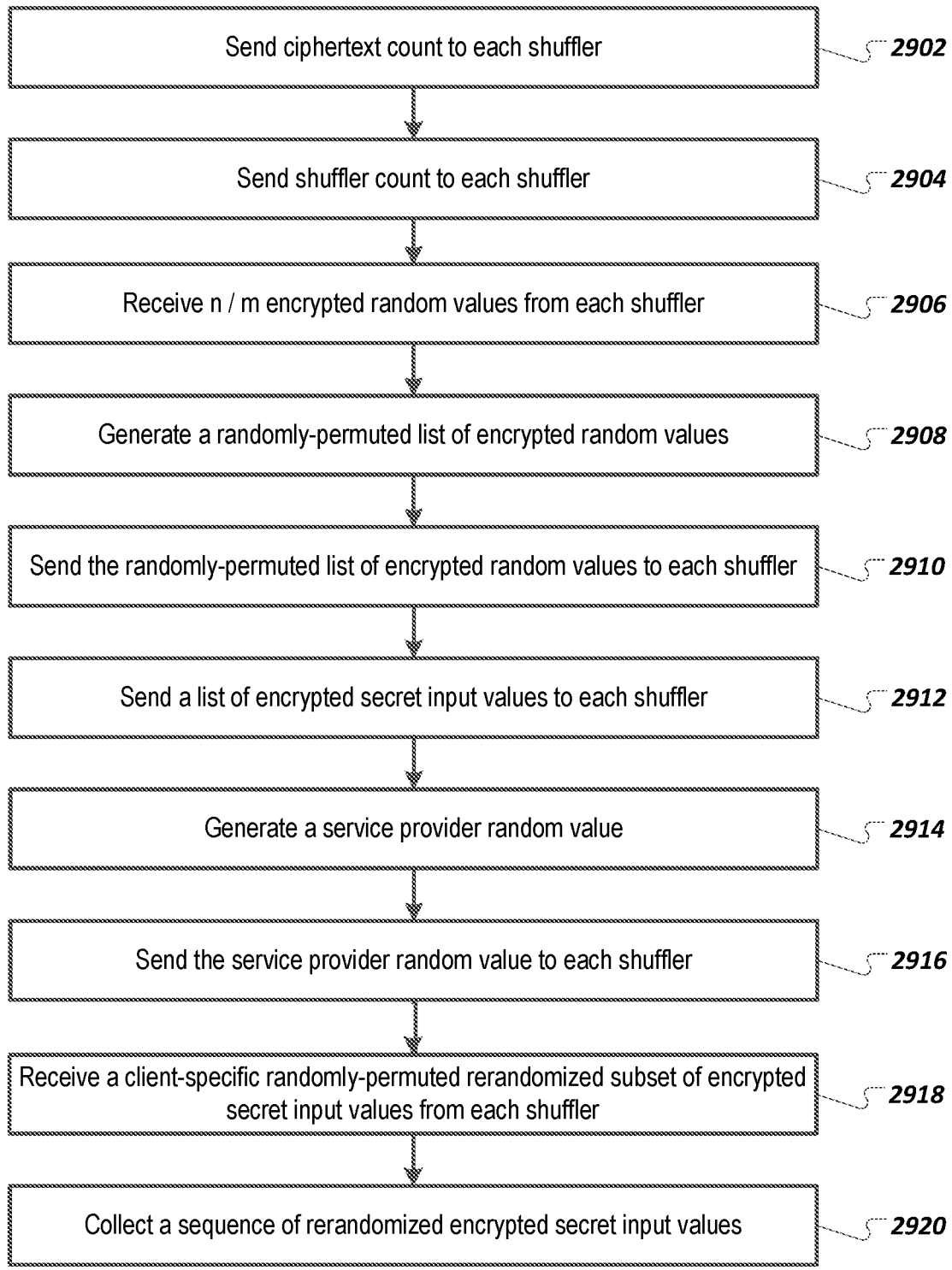
FIG. 29 illustrates a flowchart of a service provider method for an efficient distributed secret shuffle protocol for encrypted database entries using independent shufflers.

FIG. 29 illustrates a flowchart of a service provider method 2900 for an efficient distributed secret shuffle protocol for encrypted database entries using independent shufflers. It will be understood that the method 2900 and related methods may be performed, for example, by any suitable system, environment, software, and hardware, or a combination of systems, environments, software, and hardware, as appropriate. For example, one or more of a client, a server, or other computing device can be used to execute method 2900 and related methods and obtain any data from the memory of a client, the server, or the other computing device. In some implementations, the method 2900 and related methods are executed by one or more components of the system 100 described above with respect to FIG. 1. For example, the method 2900 and related methods can be executed by the server 102 of FIG. 1.

At 2902, the service provider sends a count of ciphertexts to be shuffled, to each shuffler. At 2904, the service provider sends a count of shufflers, to each shuffler. Steps 2902 and 2904 correspond to the submission or random values step 2608 of the protocol 2602 described above with respect to FIG. 26.

At 2906, the service provider receives $$\frac{n}{m}$$

encrypted random values from each shuffler (e.g., where n is the ciphertext count and m is the shuffler count). Step 2906 corresponds to the random value submission step 2610 of the protocol 2602.

At 2908, the service provider generates a randomly-permuted list of encrypted random values using the encrypted random values received from the shufflers. The randomly-permuted list of encrypted random values has n items. At 2910, the service provider sends the randomly permuted list of encrypted random values to each shuffler. Steps 2908 and 2910 correspond to the shuffling step 2612 of the protocol 2602.

At 2912, the service provider sends a list of encrypted secret input values to each shuffler. Step 2912 corresponds to the shuffling step 2614 of the protocol 2602.

At 2914, the service provider generates (or selects) a service provider random value. At 2916, the service provider sends the service provider random value to each of the shufflers. Steps 2914 and 2916 correspond to the shuffling step 2616 of the protocol 2602.

At 2918, the service provider receives a client-specific randomly-permuted rerandomized subset of encrypted secret input values from each shuffler. Step 2918 corresponds to the shuffling step 2622 of the protocol 2602.

The preceding figures and accompanying description illustrate example processes and computer-implementable techniques. But system 100 (or its software or other components) contemplates using, implementing, or executing any suitable technique for performing these and other tasks. It will be understood that these processes are for illustration purposes only and that the described or similar techniques may be performed at any appropriate time, including concurrently, individually, or in combination. In addition, many of the operations in these processes may take place simultaneously, concurrently, and/or in different orders than as shown. Moreover, system 100 may use processes with additional operations, fewer operations, and/or different operations, so long as the methods remain appropriate.

In other words, although this disclosure has been described in terms of certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure.

What is claimed is:

1. A system for executing a secret shuffle protocol, the system comprising a plurality of clients and a service provider, wherein each client comprises at least one computing device and the service provider comprises at least one server computing device, and wherein:

each client is configured to:
    identify a client-specific secret input value;
    encrypt the client-specific secret input value; and
    send the encrypted client-specific secret input value to the service provider; and
the service provider is configured to receive, from each client, the encrypted client-specific secret input value; and
each client is further configured to:
    generate a client-specific random value;
    send the client-specific random value to each of the other clients; and
    receive, from each of the other clients, the client-specific random values of each of the other clients; and
the service provider is further configured to select a service provider random value and send the service provider random value to each of the clients; and
each client is further configured to receive the service provider random value from the service provider; and
the service provider is further configured to randomly permute the encrypted client-specific secret input values using a random permutation; and
each client is further configured to:
    generate a client-specific list of hashed values using each of the client-specific random values generated by each of the clients and the service provider random value;
    determine, using the client-specific list of hashed values, a client-specific random index that is different from client-specific random indices determined by the other clients;
    receive, from the service provider, a randomly-determined encrypted blinded input selected based on the client-specific random index; and
the service provider is further configured to:
    provide a randomly-determined encrypted blinded input to each client, wherein each randomly-determined encrypted blinded input is selected based on the client-specific random index of the client; and
    provide, to each client, a client-specific encrypted first blinding value, wherein the client-specific encrypted first blinding value is an encryption of a client-specific first blinding value included in the randomly-determined encrypted blinded input received by the client; and
each client is further configured to:
    receive, from the service provider, the client-specific first encrypted blinding value;
    rerandomize the randomly-determined encrypted blinded input to prevent the service provider from learning the client-specific random index of the client;
    send, to the service provider, a client-specific rerandomized encrypted blinded input;
    generate, using a client-specific second blinding value, a client-specific encrypted and blinded first blinding value; and
    send, to the service provider, a client-specific encrypted and blinded first blinding value;
    encrypt the client-specific second blinding value; and
    send, to the service provider, a client-specific encrypted second blinding value; and the service provider is further configured to:
receive, from each client, the client-specific rerandomized encrypted blinded input, the client-specific encrypted and blinded first blinding value, and the client-specific encrypted second blinding value; and
decrypt each client-specific encrypted and blinded first blinding value to generate a first client-specific intermediate plaintext for each client;
multiply each first client-specific intermediate plaintext by negative one to generate a second client-specific intermediate plaintext for each client;
encrypt each second client-specific intermediate plaintext to generate an intermediate ciphertext for each client;
multiply, for each client, the intermediate ciphertext by the client-specific rerandomized encrypted blinded input and the client-specific encrypted second blinding value, to homomorphically remove the first blinding value and the second blinding value, to generate a client-specific rerandomized encrypted secret input value, wherein the client-specific rerandomized encrypted secret input values are generated in an order that is unmapped to an order of receipt, at the service provider, of the encrypted secret input values.

2. The system of claim 1, wherein the service provider comprises a cloud-based service executed on one or more servers.

3. The system of claim 1, wherein each client creates the client-specific list of hashed values by:
concatenating each of the client-specific random values generated by each of the clients with the service provider random value; and
creating a hash value of each concatenation.

4. The system of claim 3, wherein each client is further configured to, before generating the client-specific list of hashed values:
determine whether each of the client-specific random values generated by the clients is unique; and
in response to determining that at least two of the client-specific random values generated by the clients are not unique, abort the secret shuffling protocol.

5. The system of claim 1, wherein each client determines the client-specific random index by:
sorting the list of client-specific hashed values to create a sorted list of hashed values;
determining, as the client-specific random index for the client, a position in the sorted list of hashed values that corresponds to the client-specific random value generated by the client.

6. The system of claim 1, wherein the randomly-determined encrypted blinded input received by a respective client is provided to the client using a first oblivious transfer.

7. The system of claim 6, wherein the first oblivious transfer of a randomly-determined encrypted blinded input to a respective client comprises the client receiving only one encrypted blinded input from among a set of encrypted blinded inputs having a count equal to the number of clients.

8. The system of claim 7, wherein the service provider does not learn, from the first oblivious transfer of the randomly-determined encrypted blinded input to a respective client, which encrypted blinded input of the set of encrypted blinded inputs is received by the client from the first oblivious transfer.

9. The system of claim 1, wherein the client-specific encrypted first blinding value is received by a respective client using a second oblivious transfer.

10. The system of claim 1, wherein each client encrypts the client-specific secret input value using a first cryptosystem.

11. The system of claim 9, wherein the service provider selects, as the service provider random value, a first random value from a plaintext space of the first cryptosystem.

12. A computer-implemented method for executing a secret shuffle protocol, comprising:
receiving, from each of multiple clients, an encrypted client-specific secret input value;
selecting a service provider random value;
sending the service provider random value to each of the clients;
randomly permuting the received encrypted client-specific secret input values using a random permutation;
providing, to each client, a randomly-determined encrypted blinded input from the received encrypted client-specific secret input values, wherein each randomly-determined encrypted blinded input is selected for a client based on a random index of the client;
providing, to each client, a client-specific encrypted first blinding value, wherein the client-specific encrypted first blinding value is an encryption of a client-specific first blinding value included in the randomly-determined encrypted blinded input received by the client;
receiving, from each client, a client-specific rerandomized encrypted blinded input, wherein the client-specific rerandomized encrypted blinded input is a rerandomization of the randomly-determined encrypted blinded input provided to the client;
receiving, from each client, a client-specific encrypted and blinded first blinding value, wherein the client-specific encrypted and blinded first blinding value encrypts a blinded first blinding value that is blinded by a client-specific second blinding value;
receiving, from each client, a client-specific encrypted second blinding value;
decrypting each client-specific encrypted and blinded first blinding value to generate a first client-specific intermediate plaintext for each client;
multiplying each first client-specific intermediate plaintext by negative one to generate a second client-specific intermediate plaintext for each client;
encrypting each second client-specific intermediate plaintext to generate a client-specific intermediate ciphertext for each client; and
multiplying, for each client, the intermediate ciphertext by the client-specific rerandomized encrypted blinded input and the client-specific encrypted second blinding value, to homomorphically remove the first blinding value and the second blinding value, to generate a client-specific rerandomized encrypted secret input value, wherein the client-specific rerandomized encrypted secret input values are generated in an order that is unmapped to an order of receipt, at the service provider, of the encrypted secret input values.

13. The method of claim 12, wherein the randomly-determined encrypted blinded input is provided to a respective client using a first oblivious transfer.

14. The method of claim 13, wherein the first oblivious transfer of a randomly-determined encrypted blinded input to a respective client comprises the client receiving only one encrypted blinded input from among a set of encrypted blinded inputs having a count equal to the number of clients.

15. The method of claim 14, wherein the first oblivious transfer of the randomly-determined encrypted blinded input to a respective client is performed without revealing to any party other than the client which encrypted blinded input of the set of encrypted blinded inputs is received by the client.

16. The method of claim 12, wherein the client-specific secret input values are encrypted using a first cryptosystem.

17. The method of claim 16, wherein the client-specific encrypted first blinding value is encrypted using a second cryptosystem that is different from the first cryptosystem.

18. A computer program product comprising a non-transitory storage medium to store computer readable instructions for causing one or more processors to perform operations comprising:
   receiving, from each of multiple clients, an encrypted client-specific secret input value;
   selecting a service provider random value;
   sending the service provider random value to each of the clients;
   randomly permuting the received encrypted client-specific secret input values using a random permutation;
   providing, to each client, a randomly-determined encrypted blinded input from the received encrypted client-specific secret input values, wherein each randomly-determined encrypted blinded input is selected for a client based on a random index of the client;
   providing, to each client, a client-specific encrypted first blinding value, wherein the client-specific encrypted first blinding value is an encryption of a client-specific first blinding value included in the randomly-determined encrypted blinded input received by the client;
   receiving, from each client, a client-specific rerandomized encrypted blinded input, wherein the client-specific rerandomized encrypted blinded input is a rerandomization of the randomly-determined encrypted blinded input provided to the client;
   receiving, from each client, a client-specific encrypted and blinded first blinding value, wherein the client-specific encrypted and blinded first blinding value encrypts a blinding of the first blinding value by a client-specific second blinding value;
   receiving, from each client, a client-specific encrypted second blinding value;
   decrypting each client-specific encrypted and blinded first blinding value to generate a first client-specific intermediate plaintext for each client;
   multiplying each first client-specific intermediate plaintext by negative one to generate a second client-specific intermediate plaintext for each client;
   encrypting each second client-specific intermediate plaintext to generate an intermediate ciphertext for each client; and
   multiplying, for each client, the intermediate ciphertext by the client-specific rerandomized encrypted blinded input and the client-specific encrypted second blinding value, to homomorphically remove the first blinding value and the second blinding value, to generate a client-specific rerandomized encrypted secret input value, wherein the client-specific rerandomized encrypted secret input values are generated in an order that is unmapped to an order of receipt, at the service provider, of the encrypted secret input values.

19. The computer program product of claim 18, wherein the randomly-determined encrypted blinded input is provided to a respective client using a first oblivious transfer.

20. The computer program product of claim 19, wherein the first oblivious transfer of the randomly-determined encrypted blinded input to a respective client is performed without revealing to any party other than the client which encrypted blinded input of the set of encrypted blinded inputs is received by the client.

* * * * *